United States Patent
Bratt et al.

(10) Patent No.: US 9,507,745 B1
(45) Date of Patent: Nov. 29, 2016

(54) LOW LATENCY DYNAMIC ROUTE SELECTION

(71) Applicants: Ian Rudolf Bratt, Castle Rock, CO (US); Carl G. Ramey, Westborough, MA (US); Matthew Mattina, Boylston, MA (US)

(72) Inventors: Ian Rudolf Bratt, Castle Rock, CO (US); Carl G. Ramey, Westborough, MA (US); Matthew Mattina, Boylston, MA (US)

(73) Assignee: EZ Chip Technologies Ltd., Yokneam ( * ) Notice: Subject to any disclaimer, the term of this patent is extended or adjusted under 35 U.S.C. 154(b) by 0 days.

(21) Appl. No.: 14/594,299

(22) Filed: Jan. 12, 2015

Related U.S. Application Data

(63) Continuation of application No. 12/886,346, filed on Sep. 20, 2010, now Pat. No. 8,934,347.

(60) Provisional application No. 61/244,440, filed on Sep. 21, 2009.

(51) Int. Cl.
   *G06F 15/16*    (2006.01)
   *G06F 13/40*    (2006.01)
   *G06F 13/42*    (2006.01)

(52) U.S. Cl.
   CPC ....... *G06F 13/4068* (2013.01); *G06F 13/4221* (2013.01)

(58) Field of Classification Search
   CPC .................. G06F 13/4068; G06F 13/4221
   USPC ........................................ 370/237
   See application file for complete search history.

(56) References Cited

U.S. PATENT DOCUMENTS

| | | |
|---|---|---|
| 4,441,162 A | 4/1984 | Lillie |
| 4,933,933 A | 6/1990 | Dally et al. |
| 5,105,424 A | 4/1992 | Flaig et al. |
| 5,533,198 A | 7/1996 | Thorson |
| 5,917,820 A | 6/1999 | Rekhter |
| 6,665,495 B1 | 12/2003 | Miles et al. |
| 6,785,277 B1 | 8/2004 | Sundling et al. |
| 7,394,288 B1 | 7/2008 | Agarwal |
| 7,461,236 B1 | 12/2008 | Wentzlaff |
| 7,539,845 B1 | 5/2009 | Wentzlaff et al. |
| 7,693,167 B2 | 4/2010 | Koenck et al. |
| 7,818,725 B1 | 10/2010 | Agarwal et al. |
| 8,095,701 B2 | 1/2012 | Tarui et al. |

(Continued)

FOREIGN PATENT DOCUMENTS

WO    WO 2004/072796    8/2004

OTHER PUBLICATIONS

Adve, Vikram et al., "Performance Analysis of Mesh Interconnection Networks with Deterministic Routing." IEEE: Transactions on Parallel and Distributed Systems, vol. 5, No. 3, Mar. 1994, pp. 225-246.

(Continued)

*Primary Examiner* — Melvin H Pollack
(74) *Attorney, Agent, or Firm* — Fish & Richardson P.C.

(57) ABSTRACT

Communicating among cores in a computing system comprising a plurality of cores, each core comprising a processor and a switch, includes: routing a packet from a core or from a device coupled to at least one core to a destination over a route including one or more cores, with an order of dimensions associated with the route being selected dynamically upon construction of the packet; routing the packet to a first core in the route over the first selected dimension; and routing the packet from the first core to the destination over the second dimension.

25 Claims, 30 Drawing Sheets

(56) References Cited

U.S. PATENT DOCUMENTS

| | | |
|---|---|---|
| 8,161,268 B2 | 4/2012 | Faraj |
| 8,242,802 B2 | 8/2012 | Gaskins et al. |
| 8,407,167 B1 | 3/2013 | Abts et al. |
| 2004/0250046 A1 | 12/2004 | Gonzalez et al. |
| 2004/0268286 A1 | 12/2004 | New et al. |
| 2005/0068946 A1 | 3/2005 | Beshai |
| 2005/0201356 A1 | 9/2005 | Miura et al. |
| 2006/0179429 A1 | 8/2006 | Eggers et al. |
| 2006/0198508 A1 | 9/2006 | Delaney et al. |
| 2008/0244150 A1 | 10/2008 | Sharma |
| 2009/0052444 A1 | 2/2009 | Ringen |
| 2012/0036296 A1 | 2/2012 | Wingard et al. |
| 2013/0019082 A1 | 1/2013 | Pechanek et al. |
| 2013/0064091 A1 | 3/2013 | Gratz et al. |

OTHER PUBLICATIONS

USPTO Non-Final Office Action in U.S. Appl. No. 11/404,207, mailed Nov. 13, 2008, 9 pages.

USPTO Non-Final Office Action in U.S. Appl. No. 11/404,187, mailed Feb. 5, 2009, 15 pages.

USPTO Non-Final Office Action in U.S. Appl. No. 11/404,655, mailed Mar. 23, 2009, 14 pages.

USPTO Non-Final Office Action in U.S. Appl. No. 12/130,462, mailed Mar. 3, 2009, 8 pages.

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov., 2002.

Wentzlaff, David and Anant Agarwal, "A Quantitative Comparison of Reconfigurable, Tiled, and Conventional Architectures on Bit-Level Computation," *MIT/LCS Technical Report LCS-TR*-944, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM*-599, Aug. 1999.

Dally et al., "Deadlock-free Message Routing in Multiprocessor Interconnection Networks," *IEEE Transactions on Computers*, C-36(5) (May 1987).

Standard mode

Low-Overhead mode

FIG. 14A
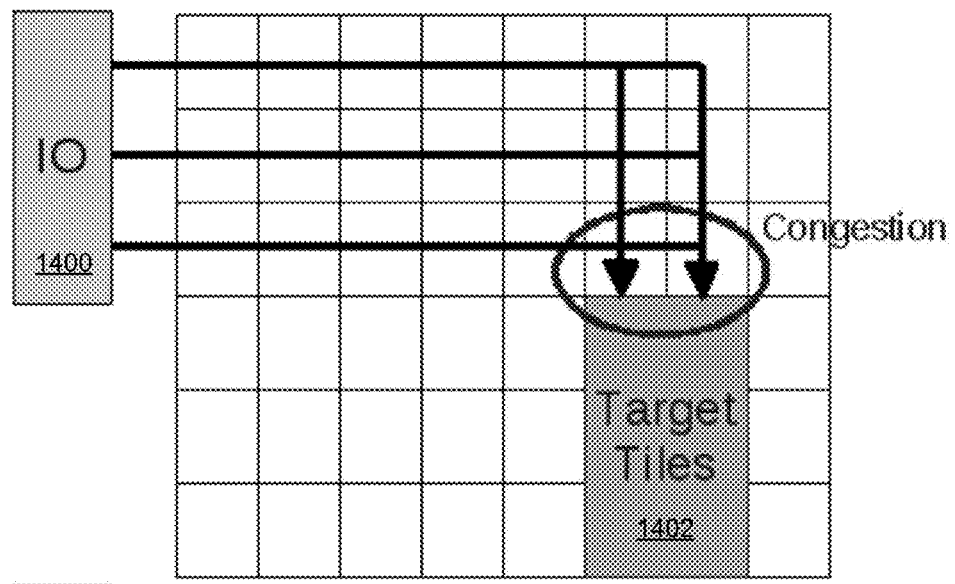
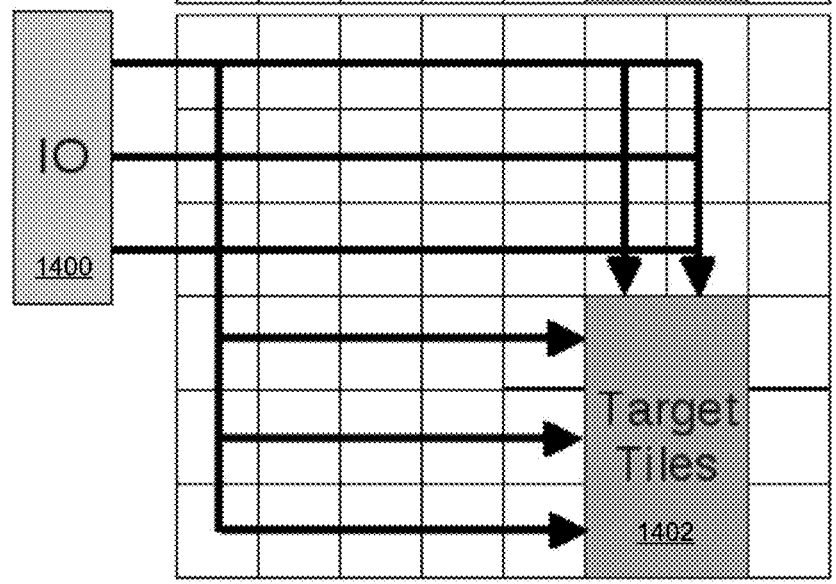
FIG. 14B

LOW LATENCY DYNAMIC ROUTE SELECTION

CLAIM OF PRIORITY

This application claims priority from U.S. application Ser. No. 12/886,346, (now U.S. Pat. No. 8,934,347) filed Sep. 20, 2010, which claims the benefit of U.S. Provisional Application No. 61/244,440, filed Sep. 21, 2009, which are incorporated in their entirety.

BACKGROUND

This description relates to low latency dynamic route selection, and managing processes, data access, and communication in a parallel processing environment.

FPGAs (Field Programmable Gate Arrays) and ASICs (Application Specific Integrated Circuits) are two exemplary approaches for implementing customized logic circuits. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs typically consume more power for performing comparable functions as an ASIC and their performance can be 10 to 20 times worse than that of an ASIC.

Multicore systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software.

SUMMARY

In one aspect, in general, communicating among cores in a computing system comprising a plurality of cores, each core comprising a processor and a switch, includes: routing a packet from a core or from a device coupled to at least one core to a destination over a route including one or more cores, with an order of dimensions associated with the route being selected dynamically upon construction of the packet; routing the packet to a first core in the route over the first selected dimension; and routing the packet from the first core to the destination over the second dimension.

Other features and advantages of the invention will become apparent from the following description, and from the claims.

DESCRIPTION OF DRAWINGS

FIGS. 14A and 14B are schematic diagrams of traffic on a tiled processor.

DESCRIPTION

In some multicore processors, multiple processor cores are on one chip. Other multicore systems may include multiple cores on more than one chip. Each core in a given computing system can include a processor and optionally any other supporting circuitry, such as the switch of a tile on a tiled processor. In this description, the terms "multicore processor" are used interchangeably with terms such as "tiled processor," or a "chip multiprocessor" (CMP), unless otherwise indicated in their context.

A packet as used herein means, in the context of the switched network of the multicore processor, a message that includes a header portion that includes processor address information and/or destination information (e.g., if the destination of the packet is not a processor of one of the cores) and control information for a message body, and the message body that includes a payload, e.g., data.

1 Tiled Circuit Architecture Overview

Figure 1:
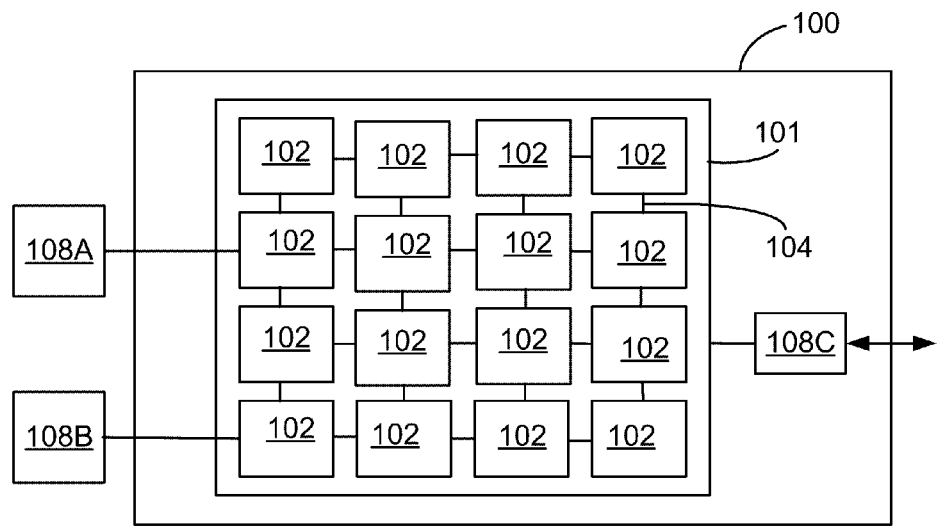
FIG. 1 is a block diagram of a tiled integrated circuit.

Referring to FIG. 1, an integrated circuit 100 (or "chip") includes an array 101 of interconnected cores, called "tiles" 102. Each of the tiles 102 includes a processor and a switch (not shown) that forwards data from other tiles to the processor and to switches of other tiles over data paths 104. In each tile 102, the switch is coupled to the processor so that data is sent to or received from processors of other tiles over a communication fabric formed by the switches and data paths. The integrated circuit 100 includes other on-chip circuitry such as input/output (I/O) interface circuitry to couple data in and out of the circuit 100, and clock distribution circuitry (all not shown) to provide clock signals to the processors of the tiles.

The example of the integrated circuit 100 shown in FIG. 1 includes a two-dimensional array 101 of rectangular tiles with data paths 104 between neighboring tiles to form a mesh network. The data path 104 between any two tiles can include multiple conductors (or "wires") (e.g., serial, parallel or fixed serial and parallel signal paths on the IC 100) to support parallel channels in each direction. Specific subsets of wires between the tiles (with different respective dedicated switches) can be dedicated to different mesh networks that can operate independently. For example, one subset of wires and corresponding switches can be dedicated to a "user network" for access by user programs running on tiles, and another subset of wires and corresponding switches can be dedicated to a "memory network" for access by cache management processes that store and fetch data to and from external memory.

In some examples, the network includes paths that extend to diagonal neighbors or to tiles that are multiple rows or columns away. Other examples include higher dimensional mesh topologies. Examples of higher dimensional mesh topologies include multiple layered integrated circuits or other three-dimensional configurations configured to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
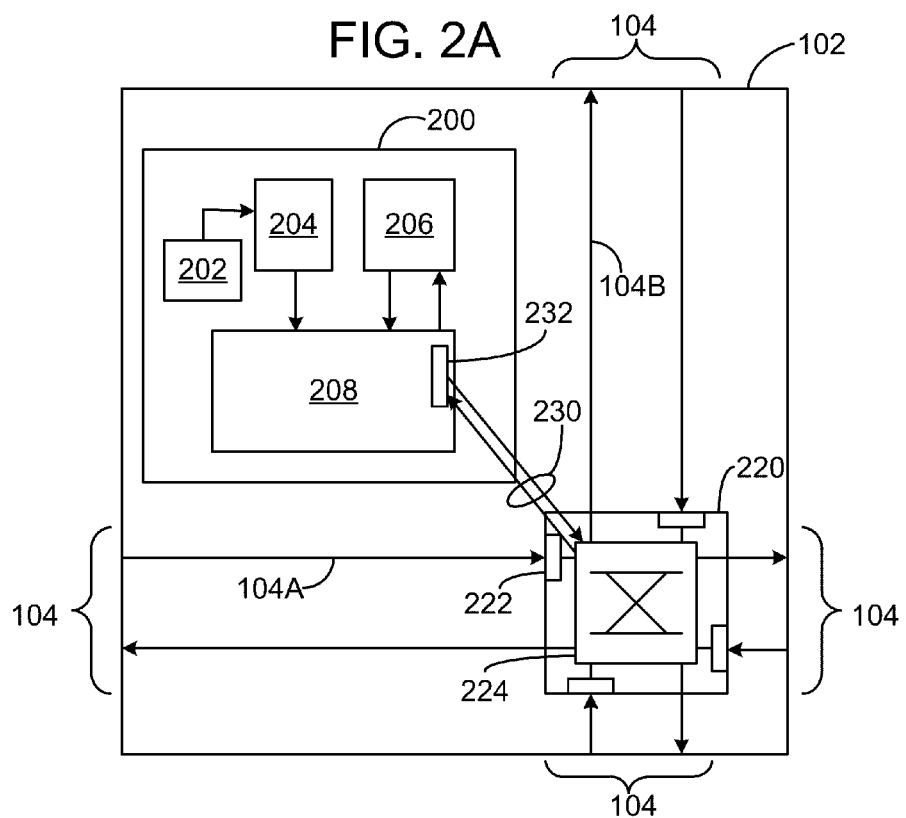
FIG. 2A is a block diagram of a tile.

Referring to FIG. 2A, a tile 102 includes a processor 200, a switch 220, and sets of incoming conductors/wires 104A and outgoing conductors/wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file (not shown). The stages in the pipeline 208 include, for example, instruction fetch and decode stages, a register fetch stage, instruction execution stages, and a write-back stage (not shown). Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit, and so forth.

The processor 200 can be multithreaded and/or have capabilities of a Very Long Instruction Word (VLIW) processor, a superscalar processor, or a vector processor. A VLIW processor issues multiple instructions based on a stream of macro instructions including sub-instructions designated to be executed concurrently by a compiler. A superscalar processor issues multiple instructions by partitioning one or more instruction streams at runtime to multiple functional units. A vector processor executes instructions using multiple functional units to operate on respective components of data. A multithreaded processor executes multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on a network port. In some examples, the processor 200 is a fine grain multithreaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in a predetermined number of clock cycles (e.g., a single clock cycle). Such pipelined data transport enables the integrated circuit 100 to be scaled to a large number of tiles without the need to limit the clock rate to account for effects due to conductor/wire lengths such as propagation delay or capacitance. (Alternatively, the buffering could be at the output of the switching circuitry 224 instead of, or in addition to, the input.)

1.1 Switch Operation

Continuing to refer to FIG. 2A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 200 receives a stream of compound instructions that includes a first instruction for execution in the pipeline 208 and a second instruction for controlling the switching circuitry 224.

The switch instructions can be used to configure the switch 220 to enable efficient communication among the tiles for communication patterns that are known at compile time. This type of routing is referred to as "static routing." An example of a type of data transfer that would typically use static routing is transfer of operands of an instruction for execution on a neighboring processor.

The switch 220 can also be configured in response to the data being transferred to provide a form of routing called "dynamic routing." Dynamic routing is used for communication patterns that are not necessarily known at compile time. In dynamic routing, circuitry in the switch 220 determines which input and output ports to connect based on information included in or derived from the data to be transferred, such as header information. A tile can send a message to any other tile by generating the appropriate address information in the header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 includes dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, static and dynamic networks operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling conductors/wires 230. For fast (e.g., low latency) communication between tiles of neighboring processors, the coupling conductors/wires 230 can be integrated directly into the pipeline 208. The processor 200 can communicate with the switch 220 using distinct op-codes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
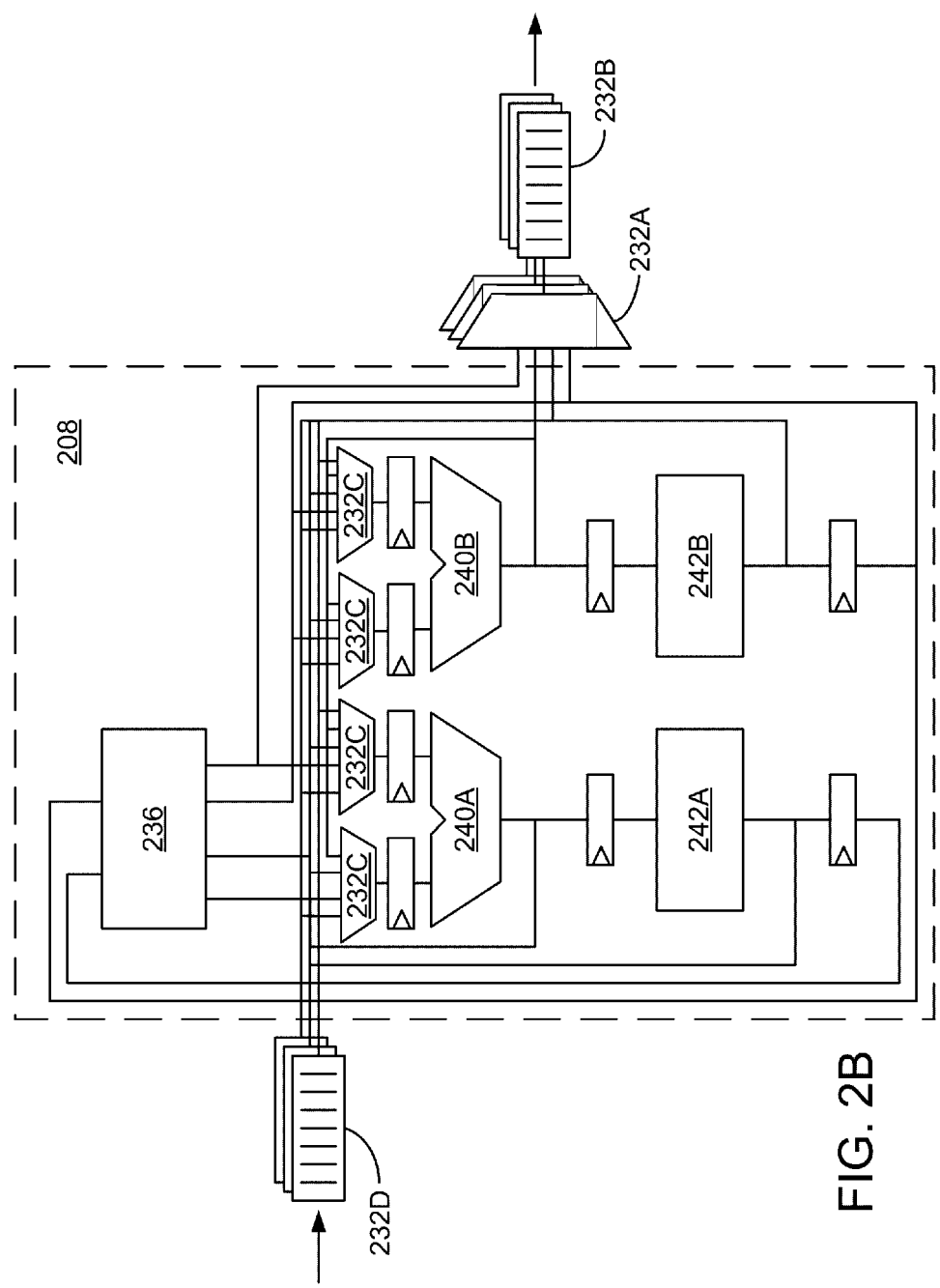
FIG. 2B is a block diagram of a pipeline.

Referring to FIG. 2B, a register mapped pipeline integrated switch interface 232 (FIG. 2A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (see FIG. 2A) reads from a register name mapped to a given switch port, data is taken from the corresponding input buffer 232D. When the processor 200 writes to a register name mapped to a given switch port, data is inserted into the corresponding output buffer 232B. The processor 200 is able to control the multiplexers 232A to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
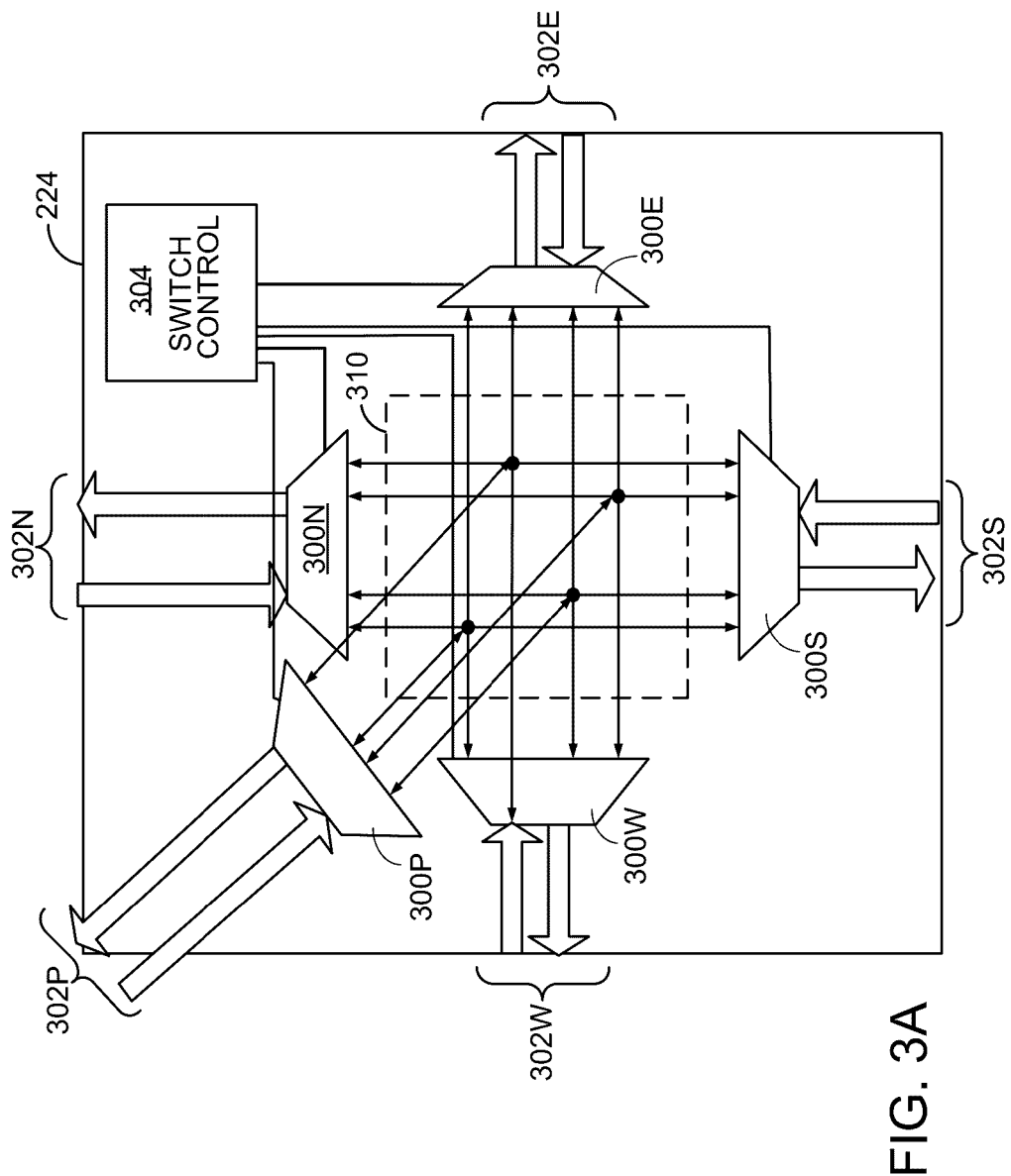
FIGS. 3A and 3B are block diagrams of switching circuitry.

Referring to FIG. 3A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 3B:
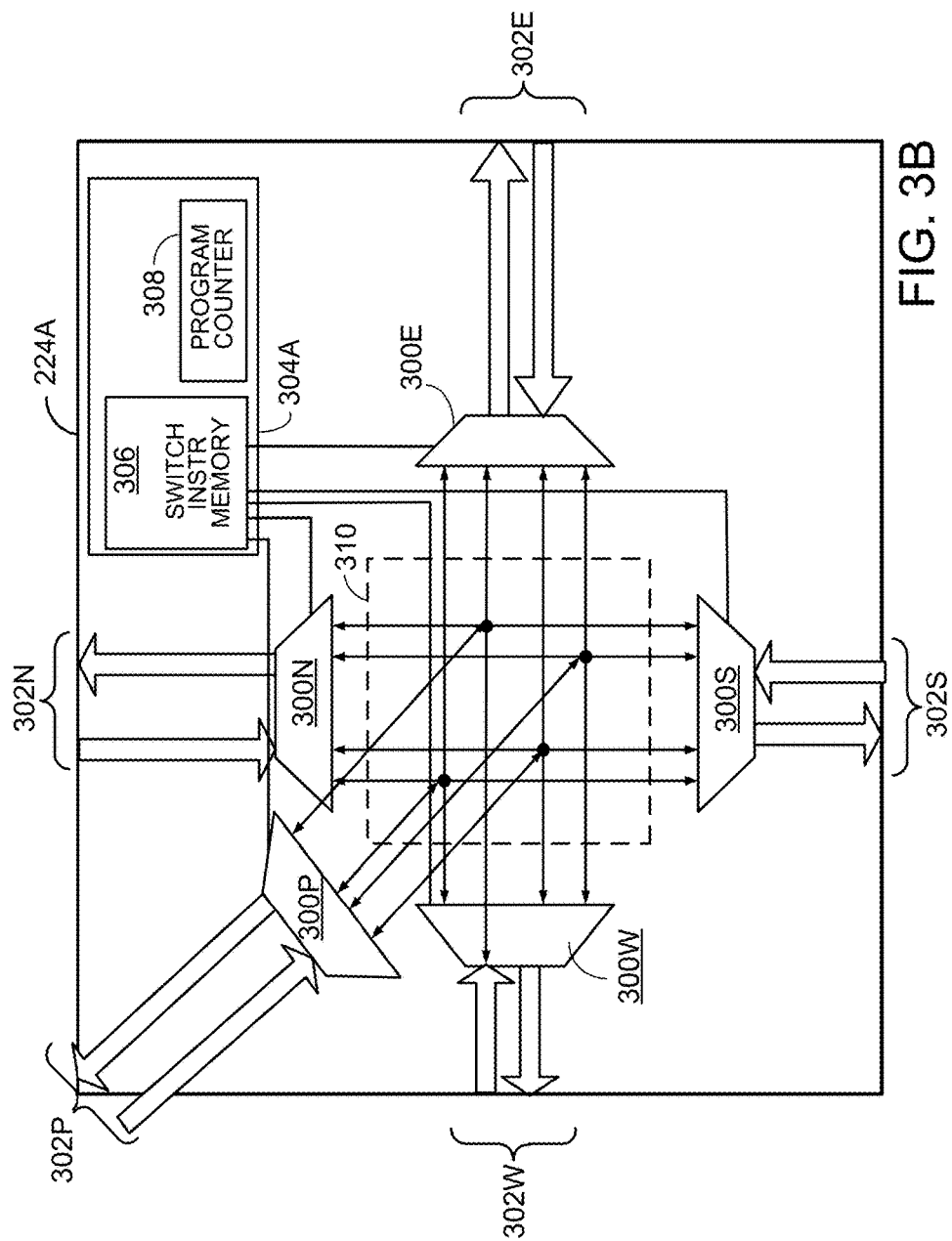

Referring to FIG. 3B, for the static network, the switch control module 304A of switching circuitry 224A includes a switch instruction memory 306 storing switch instructions that indicate which input and output ports should be connected. A switch instruction stored in the switch instruction memory 306 includes a sub-instruction for each output port (in this case, five sub-instructions). Each sub-instruction represents a multiplexer select value which routes one of five input ports to the corresponding output port.

A program counter 308 steps through the switch instructions and the switch control module 304A interprets control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A includes other components such as a floating point arithmetic unit, or bit shifter, for example, to perform additional functions. In some examples, the switch control module 304A can be a VLIW-type processor and can be multithreaded.

2 Process and Data Management Techniques

A class of multicore cache coherence techniques described in U.S. patent application Ser. No. 11/754,118, incorporated herein by reference, do not require implementing an entire cache directory (including directory state and directory controller) off-chip near main memory, or buses and frequent broadcasts. In this class of techniques, some or all of the information in one or more cache directories is stored at an intermediate location that is not a location in main memory.

The storage for directory state includes directory entries that track the state of data from main memory that may be cached in various locations in the multicore processor. Each directory entry may store state information for a single cache line or, in some implementations, for multiple cache lines. A given memory line from main memory may have one or more copies that are each stored as a cache line in different respective caches. These caches can be in multiple distinct tiles or cores. Multiple "copies" of a given cache line refers to lines in different caches that both store a memory line at the same main memory address. In some implementations, a system includes a hierarchical (or "multi-level") cache that includes multiple levels of cache of increasingly larger size that provide different trade-offs between latency (which is better for smaller caches) and hit rate (which is better for larger caches). A processor may first check a smaller level cache for the presence of a cache line (a hit), but if the cache line is not present (a miss) then the next largest level of the cache is checked, and if not present the line is retrieved from external memory or storage if necessary. A given level is not necessarily limited to a single physical memory device, but can reside in a portion of a memory device, or can be distributed over multiple memory devices in a system. For example, in the tiled processor described above, an L1 cache for a given tile may be integrated into the processor 200, an L2 cache for a given tile may be a portion of the data memory 206, and an L3 cache shared by multiple tiles may be distributed over respective portions of the data memory 206 of multiple tiles. The coherence protocols ensure that the various copies of a cache line are updated appropriately, as described herein.

A cache line typically includes multiple data values that can be individually updated. For example, when a data value in a cache is updated a new value is written into one of multiple locations in a cache line, and the other locations in the cache line, called "background data," may retain their previous values. In some cases, when data is written into a cache line, the background data is updated as well. For example, if the copy of the cache line being updated is not the most recent version, the background data may be obtained from the corresponding memory line in main memory or from a dirty copy of the cache line (a different more recently updated cache line corresponding to the same memory line) in another cache. The address of a data value includes the address of the cache line containing the value and additional bit(s) to indicate which word (e.g., byte or some other unit) within the cache line corresponds to the value.

The directory can be located at a variety of places. One of the places at which the directory for a given portion of main memory is located is at an on-chip memory interface or "shim" adjacent to an on-chip memory controller. This scheme is called shim cache coherence or the SCC scheme as described in U.S. Pat. No. 7,774,553 assigned to the assignee of the present application and incorporated herein by reference. In SCC, there can also be a higher level cache (e.g., L3 cache) which fronts the portion of main memory controlled by that shim. This cache could also be centralized and front all of main memory. Alternatively, a directory can be located on a node (e.g., a core or tile) in the multicore system. The directory can be associated with that node's higher level cache or the directory can be standalone by itself. This second scheme is called proxy cache coherence or PCC.

Another aspect of implementing cache coherence protocols in multicore architectures is managing levels of a hierarchical cache structure. A scheme for providing private local and shared global cache levels in a hierarchy leverages mechanisms such as a shared singly cached scheme for load and store operations, and translation look-aside buffer (TLB)-based redirecting of home cache locations of cache lines. In the shared singly cached scheme, a set of physical memory pages is cached locally in a "home cache" that is the local cache of a particular core (the "home core"). Other cores ("remote cores") are configured to access addresses in those memory pages by communicating with the home core's cache. If there is a cache miss in the home core's cache, then the home core accesses the addresses from a copious memory backing store. Additional details of the scheme are described in U.S. Pat. No. 7,577,820, incorporated herein by reference. The scheme uses write-through core caches and optional coalescing write buffers to achieve high performance while at the same time keeping the circuit complexity relatively low in comparison to other schemes. This scheme exploits the relaxed memory consistency model of the architecture to simplify the handling of writes, and treats the existing cache memory simultaneously as both a private local L2 cache and a distributed shared L3 cache. Shared addresses and memory locations are optionally allocated using a special memory allocation function such as shared malloc.

Other portions of a multicore processor that can potentially modify shared memory can also participate in the cache coherence protocols. For example, an I/O module coupled to the periphery of the interconnection network that connects the processor cores can be configured to participate in the SCC or PCC protocols.

Some of the exemplary techniques described herein include mechanisms to improve performance of cache coherence protocols.

A "skin effect" may occur in some mesh networks using dimension-ordered routing. In some implementations, a mesh network can allow processors of a processor array to send multi-word messages or scalar values through the network. The mesh network can be a static network or a dynamic network. Static networks switch according to switch instructions determined at compile time, whereas dynamic networks switch according to headers determined at runtime. In a dynamic network, a processor can directly send packets having packet headers and payload data to the mesh network, and the mesh network will take care of delivering the packet to the appropriate receiver, which can be, e.g., a different processor or an input/output device.

Various other input/output devices, such as memory controllers are able to be integrated into the multicore processor. An input/output device can be connected to the multicore array through multiple networks. A message based protocol can be used so that any processor can communicate with the input/output device. For example, a message based protocol used by a dynamic network is described in U.S. Pat. No. 7,577,820, incorporated herein by reference.

Figure 4:
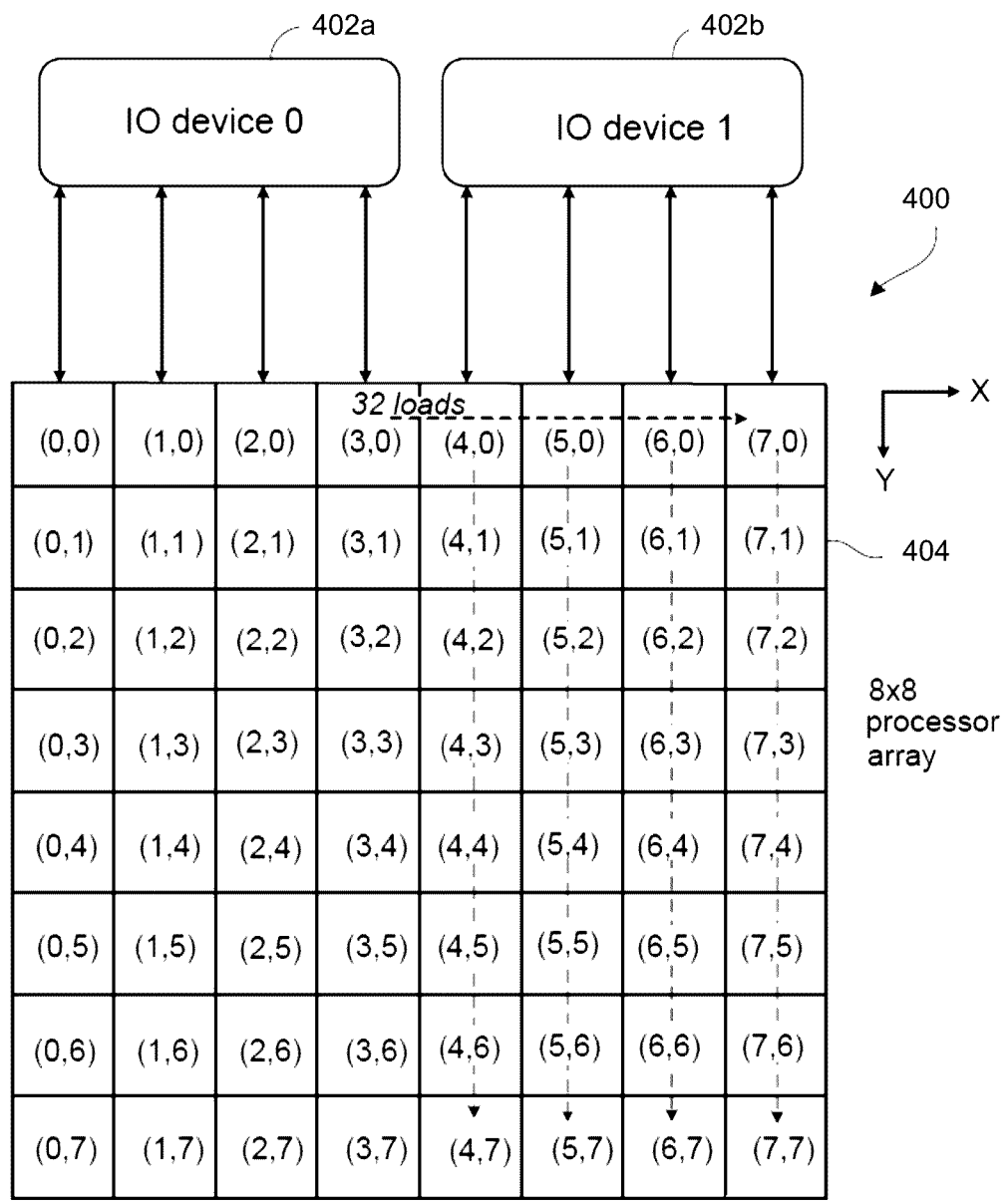
FIG. 4 is a schematic diagram of a processor array and coupled devices.

FIG. 4A depicts an exemplary 8×8 tiled processor array 400, with processor cores labeled from (0,0) to (7,7). The processor array 400 includes an array of processor tiles 404, each tile including a processor core. Input/output devices 402a and 402b (collectively 402) are attached at the top of the processor array 400 through a two-dimensional mesh network. In this example, each device has four ports connected to the array 400, in which each port is connected to a different one of four tiles across the top of the array. In other examples, some devices may have a single port connected to a single tile, or a single device may be connected to any number of tiles over different ports.

In this example, dimension ordered routing is used, with X being the first direction in which a message is routed, and Y being the second direction in which a message is routed. In dimension ordered routing, requests from the processor array 400 destined for an input/output device travel in the X direction until the requests are vertically below one of the ports of a given one of the input/output devices 402a or 402b. Once a request is below a destination port of a given input/output device, the request is routed vertically to the input/output device. Responses coming from the input/output devices 402 travel in the processor array 400 in the X direction first, then the Y direction. This may result in the case where responses for the entire processor array 400 are first routed across a one dimensional array of links (the horizontal links that connect the eight cores from core(0,0) to core(7,0) directly below the input/output device 402), having the network performance similar to a pipelined bus. This is referred to as the "skin effect". The skin effect can become significant when large amounts of data are exchanged between the input/output devices 402 (e.g., memory controllers) and the processor cores.

The terms "horizontal", "vertical", "top", "bottom", "left", and "right" are used to illustrate relative directions or positions as shown in the figure and are not meant to be limited to those illustrated.

For an input/output device 402 connected to the first-dimension (X-dimension in FIG. 4A) at the top of the processor array 400, most of the packets originating from the input/output device 402 tend to stay on the skin of the mesh network (e.g., the edge of the mesh network), especially the congested connection between core(3,0) and core(4,0), which carries traffic for the 32 processor cores on the right half of the processor array 400. All traffic sourced from any of the ports of the input/output device 0 (402a) and destined to the right half of the processor array 400 go through the connection between core(3,0) and core(4,0), assuming X-first dimension ordered routing.

A traditional single core processor or a multicore processor with a traditional bus architecture may not have the skin effect problem.

Some of the exemplary techniques described herein include mechanisms to mitigate the performance impact of the skin effect in dimension ordered networks. Additional mechanisms are also described in U.S. patent application Ser. No. 12/169,436, incorporated herein by reference.

3 Low-Overhead Operating Systems

Figure 5A:
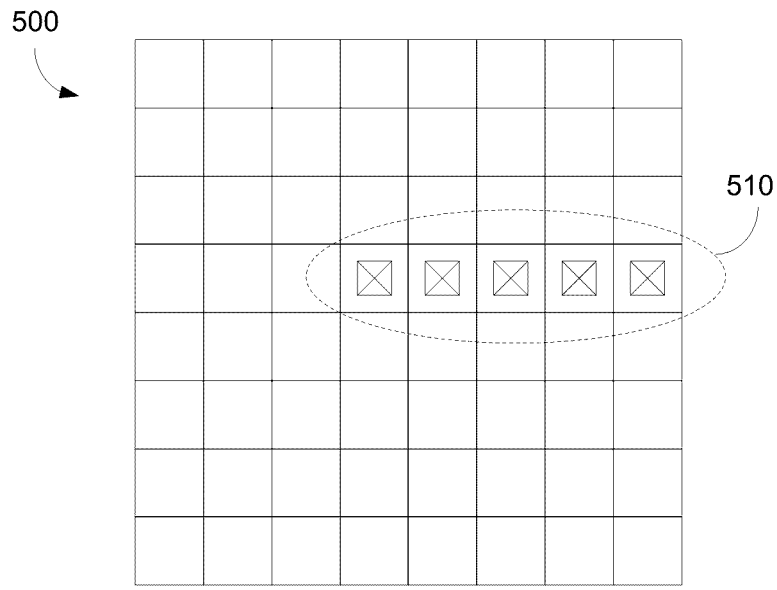
FIG. 5A is a schematic diagram of a processor array.

Referring now to FIG. 5A, a tiled processor array 500 is configured to enable an operating system to place the processors of selected tiles, such as the set of tiles 510 in this example, into a low-overhead mode of operation (called "Low-Overhead mode"). For example, a processor is placed into Low-Overhead mode to enable a process running on the processor to execute more efficiently. The operating system may be running on the processors of all of the tiles in the array 500 or of a subset of the tiles, and is able to place any of the processors on which it is running into Low-Overhead mode, whereas the processors of other tiles run the operating system in standard mode. In Low-Overhead mode, operating system overhead is reduced to meet certain predetermined latency requirements, for example.

In the Low-Overhead mode, the operating system operates in conjunction with software or hardware features that reduce overhead for the processors operating in Low-Overhead mode compared to processors operating in the standard mode. Overhead is reduced, by disabling an operating system task that would otherwise be executed by the operating system (e.g., a task that the operating system would perform on a processor that could take resources, such as instruction execution cycles, away from a process running on that processor, including a task that involve regularly scheduled actions or a task that involves certain actions for responding to events). One task that can be disabled is processing of interrupts. For example, the operating system can maintain a table stored in a memory within a tile that indicates to which other tiles interrupts can be issued. If a processor of a given tile is in Low-Overhead mode, then the table indicates that interrupts cannot be issued to the processor of the given tile. When the operating system initiates a request (e.g., a request received from a user process) for a given processor to go into Low-Overhead mode, the operating system can instruct the processors (e.g., by sending a message or issuing a store operation to a special address) to write into the table that the given processor is not to be registered to receive interrupts. Some tasks that can be disabled are based on timers. For example, an operating system operates in conjunction with software or hardware timers that can be disabled by the operating system in response to a request for a given processor to operate in Low-Overhead mode, as described in more detail below. A processor can enter Low-Overhead mode at different times. In some cases information that is loaded at boot time specifies that the operating system should start with given processors in Low-Overhead mode. In some cases, a program specifies which processors should run in Low-Overhead mode, for example, using a configuration file, or a command line argument. Some processes are statically configured (before runtime) to initiate requests for a processor to enter Low-Overhead mode, and some processes dynamically respond (during runtime) to initiate a request for a processor to enter Low-Overhead mode. In some cases, a process requests the processor on which it is executing to enter Low-Overhead mode in response to a condition, e.g., when that process is the only process running on that processor, or if a process has been running without invoking kernel services for some period of time. When a processor receives a request to enter Low-Overhead mode, it performs a procedure, described in more detail below, to enter Low-Overhead mode and stops accepting requests to perform work from other processors.

Typically, operating systems provide different portions of a memory scheme (e.g., a virtual memory scheme) for different purposes, such as a "kernel-space" for processes associated with the kernel and a "user-space" for processes associated with user programs (having user-level access). Some techniques for managing Low-Overhead mode relate generally to removing operating system induced overheads and latencies from user-space applications, for example, when they are run under operating systems such as Linux.

Many applications of processors, particularly embedded processors, that are configured to perform a few dedicated functions, as opposed to general purpose processors that are commonly found in computers, can gain increased reliability and throughput by having low latency guarantees for low level tasks performed by the processor including kernel tasks and tasks associated with managing a runtime stack (which stores information associated with an executing process). For example, a typical 10 Gbs networking application may have a latency budget of only hundreds of cycles per packet, and any operating system interrupt, or other slowdown, may cause the budget to be exceeded, and concomitant therewith packets to be dropped. At the same time, it may be inconvenient to require latency-intolerant applications to run in special environments that provide low latency guarantees by selectively limiting portions of the runtime infrastructure, such as on dedicated processors without support for the runtime infrastructure for file system or terminal access, tracing, debugging, profiling, etc.

Figure 5B:
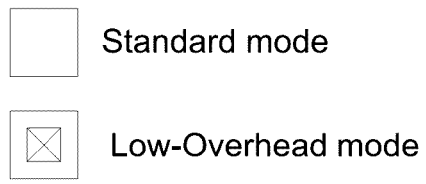
FIG. 5B is a flowchart of a method for managing processes in a computing system.
Figure 5B:
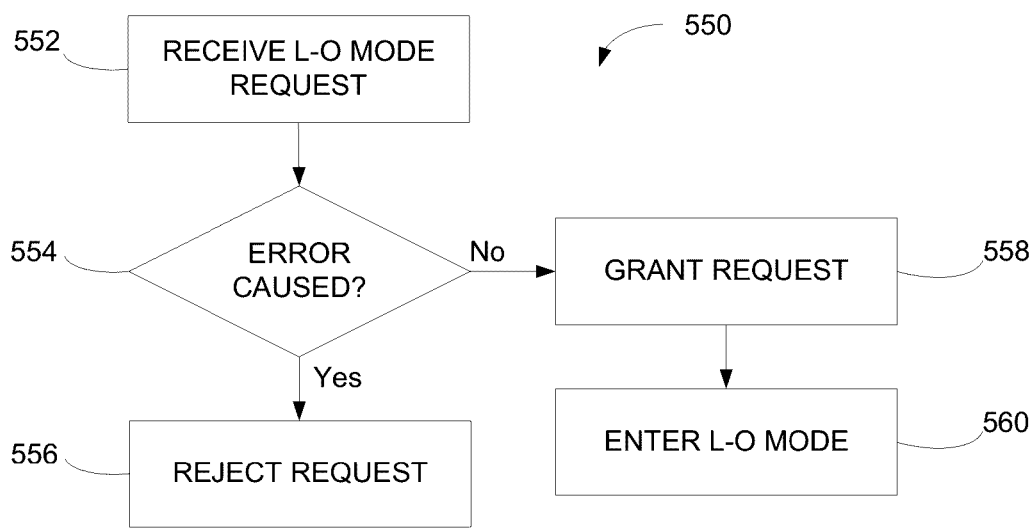

Referring now to FIG. 5B, an exemplary method 550 for managing processes in a computing system (e.g., in a core of a multicore system). The method 550 includes receiving (552) a request for a first process on a first core to execute on the first core in Low-Overhead mode (with at least one predetermined task of the operating system disabled). At the time the request is received, there may be one or more processes other than the first process executing on the first core. In response to the request, the operating system determines (554) whether any potential errors in execution of those one or more executing processes would be caused by disabling the predetermined task on the first core. The request is granted or rejected in response to the determining (554). If any errors in execution could potentially result from disabling the predetermined task, then the request is rejected (556). The potential errors could be detected, for example, based on conditions associated with the executing processes (such as conditions that would require use of the predetermined task). If no potential errors are detected, then the request is granted (558), and the first core enters (560) Low-Overhead mode.

A core whose processor runs in Low-Overhead mode is shielded from the overhead that would have been caused by disabled tasks, such as the interruptions (or "interrupts") by the kernel that may exist on a multi-tasking operating system. For example, in Low-Overhead mode the operating system can disable timer ticks.

Timer Ticks

A portion of the operating system (e.g., the kernel) includes a scheduler that manages a set of processes (e.g., including a process or thread of a multi-threaded process), for example, using a queue structure stored on the processor that includes processes that are load balanced among a set of processors. The scheduler may use regularly scheduled timer interrupts called "timer ticks" that facilitate scheduling and various timer-based interruptions for a user application such as lock protocols. Timer-based interruptions such as timer ticks on a given processor can be disabled when a particular process is running alone on that processor and has not requested any timer-based interruptions. The appropriate portion of the operating system (e.g., the kernel) is configured to avoid scheduling any kind of timer-based interruptions to that processor for the duration of the process. This enables that process to run without the processor being required to handle interruptions by the operating system, enabling that process to possibly meet real time constraints.

There are several ways in which timer ticks can be disabled. One way is for the operating system to write into a hardware register a value that blocks timer ticks from interrupting the processor. Another way is to set the timer interval (the interval between successive timer ticks) to a very large value, which can also done by writing into a special purpose register. An approach to disable timer ticks includes providing the operating system with an option that can be set to isolate a given processor (e.g., by removing the processor from being managed by a kernel scheduler), for example, using the "isolcpus" option in Linux.

One aspect of the Low-Overhead mode has the operating system disable timer ticks on a processor while an application is running on the processor and still have the application execute correctly. For example, one way to preserve correct execution when the kernel receives a request from a user application to enter Low-Overhead mode has the kernel (or other portion of an operating system) disable timer ticks after the user application passes control to the kernel. The kernel, before passing control back to the user application (e.g., a user-space process), checks for various conditions associated with another executing process running on the processor (e.g., another process waiting to run, lock holding, etc.) that can lead to incorrect operation of that process without timer ticks being enabled. If none of the conditions associated with the other process require timer ticks, then the kernel enables Low-Overhead mode on the processor and allows the executing process to run without timer ticks. If any of the conditions require timer ticks, then the kernel enables timer ticks and rejects the request to enter Low-Overhead mode. By disabling timer ticks while checking for the various conditions, a timer-based interrupt during the checking can be avoided. Alternatively, in some implementations, timer ticks can be disabled after checking for the various conditions.

When a processor is running in Low-Overhead mode, the interrupts (e.g., timer interrupts or other regularly scheduled interrupts) that could otherwise cause unexpected latency for applications that cannot tolerate such latency can be suppressed on that processor. There are various types of interrupts that can be suppressed in different ways.

A timer interrupt can be a primary source of latencies for normal general-purpose applications. A timer interrupt may fire, for example, either to allow the kernel to check for pre-emption of one task by another, or to trigger a time-deferred event. In response to determining that in some cases pre-emption will not occur, a timer interrupt can be avoided by removing the kernel time-deferred events that might cause a timer interrupt to be scheduled, as described in more detail below.

Device interrupts are normally requested by particular processors and dispatched to those processors as device activity is reported. The operating system can generally avoid registering any processor that should run latency-sensitive code for such interrupts, as described in more detail below.

Inter-process interrupts (IPIs) can cause undesired interruptions. A common cause of IPI is waking up a process that is waiting on an event, but in a typical latency-sensitive application tasks will not enqueue themselves in the kernel at all. On some systems, additional causes for these interrupts are TLB and cache flush requests. By deferring TLB flushes for kernel addresses, and avoiding common situations where a cache flush would be necessary, the operating system can avoid IPIs, as described in more detail below.

Set forth below are ways that latency can be added to an application by the kernel and runtime stack, and how Low-Overhead mode is able to mitigate or avoid these sources of latency.

Another aspect of mitigating sources of latency involves scheduling interrupts.

Enabling the Low-Overhead mode on a given processor, uses an option such as the Linux "isolcpus" option for that processor. (The same thing can be done using similar isolation mechanisms in other operating systems.) The isolcpus option available in Linux isolates a given processor from the Linux scheduler such that the given processor is not managed by the scheduler. This is useful, for example, since otherwise it might be necessary for Linux to periodically interrupt a user application running on a local processor to check other processors' queues to see if any tasks should be "stolen" and run on the local processor instead (e.g., for load balancing). In "isolcpus" mode, the "isolated" processors neither try to obtain work from other processors, nor do other processors try to obtain work from them. With a given processor isolated in this manner in Low-Overhead mode, the operating system can reliably examine only the local scheduler queue for that isolated processor to make decisions about when it is valid to disable the scheduler timer tick.

In general, a single process may start to run and it may still not be possible to immediately disable the scheduler timer tick. For example, if RCU (read-copy update, a low-overhead locking protocol used in Linux) locking is being done in Linux, it may be necessary to wait for an additional timer tick or two before the scheduler timer interrupt can be properly disabled. However, when a process is running in user-space exclusively, nothing can happen to the processor that would require it to start issuing scheduler timer ticks. Accordingly, the operating system is able to test for enabling the scheduler timer tick only on each return from kernel-space to user-space. For a processor in Low-Overhead mode, the operating system is able to decide whether or not to enable the scheduler timer ticks by checking a predetermined set of one or more conditions, and if the conditions are satisfied, the OS can disable the scheduler timer ticks. An example of such a set of conditions is the following:

No reschedule IPI has been received by the processor
Exactly one task is runnable in the scheduler queue
The current runnable task is a user task, not a kernel thread
No (deferred software interrupts (e.g., softirqs) are pending
The RCU subsystem does not need the processor One additional aspect of configuring Low-Overhead mode is that in some systems when processors disable the scheduler timer tick (e.g., in tickless operation), one processor is nominated as the "idle load balancer" so that idle processors can be woken up as needed. This behavior isn't needed when Low-Overhead mode has arranged for a processor to run a single task, so a computing system is configured to ensure that the Low-Overhead mode processors are not chosen to become the "idle load balancer," which would call for them to run periodic scheduler timer ticks to check for load balancing. Also, when a task is explicitly moved onto a Low-Overhead mode processor, the operating system can send it an IPI so that it discovers it needs to re-enable scheduler timer ticks.

Because an OS in Low-Overhead mode does not run the timer tick while the task is executing, the OS does not accrue "user time" in the normal manner. Instead, the kernel is configured to monitor attempts to read the "user time," and to add an appropriate number of "virtual user-space timer ticks" to the result before reporting it back to user-space. Otherwise, tools like "ps" would report Low-Overhead mode processors as idle rather than running at 100% utilization.

Other approaches for reducing overhead in Low-Overhead mode configure the operating system such that TLB flushes for kernel pages are deferred by the operating system while the application is running in user space, until such time as another event requires the processor to enter kernel-space. In another approach the operating system avoids allocation of physical pages whose "home cache" was previously on processors that are being shielded from kernel interrupts. In addition, some kernel constructs that normally induce context-switching or timer-based wakeups on processors that are to be shielded from kernel interrupts are disabled. Device I/O interrupt handlers can be registered on processors that are not being shielded from kernel interrupts.

In some implementations, there are sufficient processors available on a system such that some or most of the processors can be configured to run in Low-Overhead mode, while still leaving one or more processors in standard mode to perform the normal "book-keeping" operating system chores, without any particular latency requirement. This mode of configuring processors avoids the need to hold every processor and every kernel path to an absolute minimum latency period, an approach that tends to be more challenging to code correctly, and may not entirely remove the requirement of interrupts executing even on processors that are running latency-sensitive application code. A processor that has been configured to operate in Low-Overhead mode is called a "Low-Overhead mode processor."

This approach allows latency-sensitive applications to take advantage of the more complete operating system infrastructure when they need it, such as the full range of system calls, tracing, debugging, and profiling, and other Application Programming Interfaces (APIs). During usage of such full-featured APIs of the Linux operating system, for example, the processors operate in standard mode, but as soon as the application running on a processor stops using the full-featured Linux APIs, the processors revert to running in Low-Overhead mode.

TLB Flush Requests

Another aspect of mitigating sources of latency involves deferring kernel TLB flush requests. In some implementations, if the kernel needs to change the attributes of a page of memory that is mapped into the kernel's own address space, in addition to updating the kernel portion of the page table, the kernel also issues a TLB flush to all the processors in the system, in the event that any of the processors potentially try to access the page and find it in its TLB and access it incorrectly. This TLB flush is performed as a type of IPI (inter-processor interrupt) that could cause potentially unacceptable latency on a Low-Overhead mode processor.

Alternatively, in some implementations, the TLB flush requests can be passed through a single function in the kernel that checks whether a target processor is running a Low-Overhead mode application, and if so defers any kernel-space TLB flushes. In this implementation, each processor maintains a corresponding indicator (e.g., a value stored in a register in the processor) of whether that processor has a deferred TLB flush pending, and is in one of three states: KERNEL, USER, or PENDING.

If a kernel-space TLB flush is destined for a particular processor and that processor is in the KERNEL state that means it is running kernel code. The TLB flush IPI is delivered as normal. This arrangement does not compromise operation in the Low-Overhead mode, because the remote processor is already out of the user application, so is presumably in a latency-insensitive part of the application. In this implementation, processors that are not running in Low-Overhead mode are always in the KERNEL state.

If the remote processor is in the USER state, however, the kernel atomically sets the state to PENDING, indicating that a TLB flush event is pending for that processor. If the remote processor is already in PENDING state, it is left in that state.

When the application leaves user-space (e.g., due to an external interrupt, page fault, system call, or for any other reason) the application checks its deferred TLB flush state indicator relatively soon after leaving user-space. It will find it either in the USER state (in which case no action needs to be taken), or the PENDING state (in which case the processor performs a full kernel address space TLB flush). Either way, it also atomically resets the state to KERNEL. On return to user-space, the kernel atomically resets the state back to USER again.

Avoiding Cache-Flush Interrupts

Another aspect of mitigating sources of latency involves avoiding cache-flush interrupts on processors in Low-Overhead mode. The cache architecture described above includes a notion of a software-controlled "home cache" (that is located on a "home tile" in a tiled processor) for each page of memory. If a Low-Overhead mode processor frees a page back into the kernel's page allocator system, and a different processor later allocates it, the computing system is obliged to flush the first processor's cache to avoid incoherence. This may be a relatively infrequent event, but the computing system can be configured to ensure that such cache flushes (performed via IPI) are not performed on a Low-Overhead mode processor, at least while in user mode, avoiding a potentially substantial interrupt.

To avoid this cost, in some implementations, the kernel page allocator is configured to query whether a given page that is a candidate for allocation would in fact require a cache flush IPI to a Low-Overhead mode processor. If so, the page is instead "sequestered" onto a linked list that the kernel maintains. In normal operation, this linked list does not grow to any great size; however, if there is high demand for memory, the kernel will place the pages on the sequestered list back into the page allocator system and perform a global cache flush to ensure cache coherence.

Timer-Using Constructs

Another aspect of mitigating sources of latency involves disabling timer-using constructs. A variety of kernel constructs set up explicit timers, create tasks that need to be scheduled based on timers, or in some other way require periodic code to be run. Some or all of these can be disabled on the Low-Overhead mode processors. The following are examples of such constructs:

The "soft lockup" kernel thread, which in some systems runs on every processor by default, attempts to wake up and access a per-processor word every 10 seconds or so. If a timer interrupt finds it has not updated the word, it concludes that the scheduler is hung and generates a message to the console. This kernel thread can be suppressed on Low-Overhead mode processors.

The kernel's "slab" allocator uses a "cache_reap" function that, in some systems, is queued on every processor and runs periodically. This work item can be suppressed on Low-Overhead mode processors.

The "vmstat" subsystem, in some systems, periodically runs a "vmstat_update" function to collect information about each processor. This can also be suppressed on Low-Overhead mode processors.

Avoiding Device Interrupts

Another aspect of mitigating sources of latency involves avoiding Low-Overhead mode processors for device interrupts. Normally, the computing system allows device interrupts (such as from an Ethernet device) to be handled on any processor, and may by default distribute such interrupts across all the processors (e.g., in a round-robin distribution). However, Low-Overhead mode processors can be configured to avoid registering for any device interrupts, and thus ensuring such processors do not receive device interrupts (e.g., device I/O interrupts).

4 Managing Shared Resources in an Operating System

Some techniques relate generally to how a general-purpose operating system, like Linux, can handle application requirements for shared resources including multi-processor components (e.g., components of a multicore system that are configured to be accessible to processes running on the processors of multiple cores) such as user-space inter-processor networks, or other resources of a system (e.g., hardware resources available to multiple processors). The resources sharing techniques can also be applied to single core systems that have resources that are configured to be accessible to multiple processes.

Computing systems such as the tiled processors or multiple server blades in a cloud or data center environment can contain hardware that is accessible to processes of multiple processors, such as user-space inter-processor message routers (e.g., the tiled processor switches described herein). Several unrelated applications may use the user-space network simultaneously, and a given processor may support tasks accessing the network as well as tasks not accessing the network. If any task tries to misuse the network, or as soon as all the tasks using the network exit, the operating system drains the network of any messages in the process of being transmitted (e.g., removing messages in queues of switches) and resets the network so the next application can start up and use the network properly.

A number of techniques can be used to support controlling access to resources such as multi-processor components. Examples of such techniques include the following:

An operating system mechanism or other management system API can be used to allow applications to partition a multi-processor component on demand, atomically and safely.

Access to a component can be represented as a single open instance of a file descriptor that is duplicated or passed to other tasks to give them access to it.

Access to the component can be controlled based on whether a task has bound itself to the processor and suitably requested access from the operating system.

The computing system can allow multiple tasks to be scheduled on a processor, but with only the task(s) associated with the multi-processor component having access to it.

Violations of the requested use of the multi-processor component can be converted into fatal signals for the tasks associated with the component.

The lifespan of a given use of a portion of a multi-processor component can be managed by tracking the tasks associated with it, and releasing the reservation and resetting the portion of the multi-processor component when all the tasks exit.

In a multicore system there might be resources such as a user network (or for example, a device, or other components of a system to which the system is to give some processes user-level access and some processes no access) to which the system is to give a process or a set of processes user-level access to a resource (e.g., to a user network).

Figure 6A:
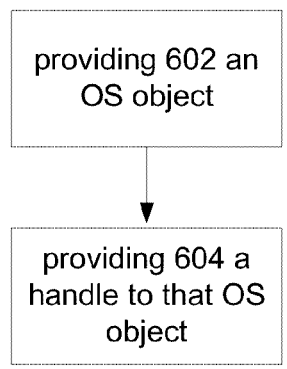
FIGS. 6A and 6B are flowcharts of procedures for managing access to resources.
Figure 6B:
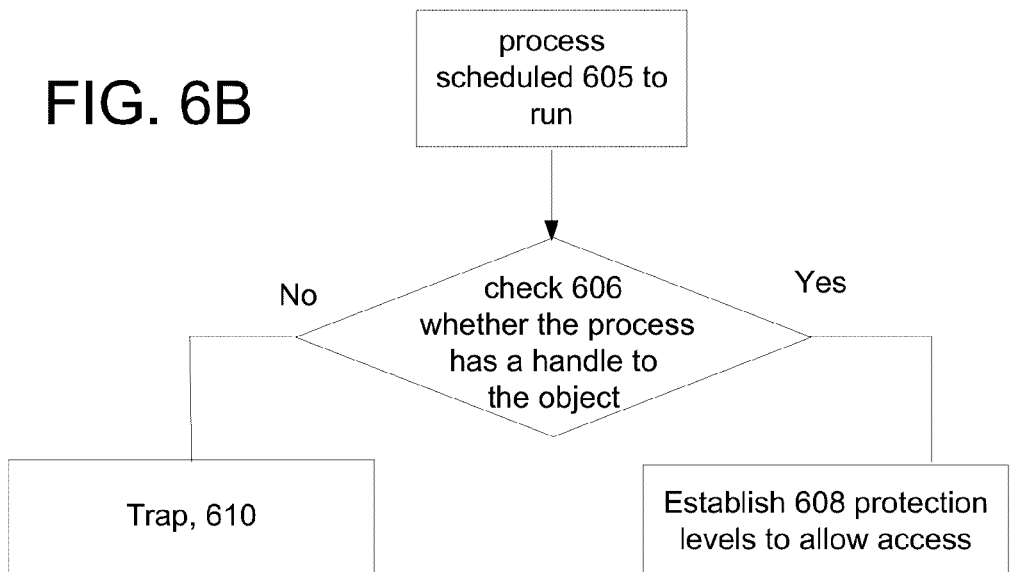

Referring now to FIGS. 6A and B, an example of managing resources includes, the system providing 602 an OS object and providing 604 a handle to that OS object (e.g., a file handle) to the processes that are to have user-level access. Now with respect to FIG. 6B, when a particular process of those processes is scheduled 605 to run on the processor of a core, the OS checks 606 to see whether the particular process has a handle to the object, and if the particular process has a handle, the OS establishes 608 protection levels in the hardware such that the particular process can access the resource. If the process does not have the handle, then the protection hardware is set so that the process will trap 610 if the process tries to access the resource.

The protection levels can be configured, for example, as described in U.S. Pat. No. 7,577,820, incorporated herein by reference. In some implementations, resources that are managed by the protection system are associated with a minimum protection level (MPL) register. The MPL register contains a value (e.g., a value from 0-3) which is the minimum protection level that is needed to complete a desired action using the protected resource without faulting. Storing the minimum protection levels associated with different resources in respective MPL registers enables the minimum protection levels to be set independently for different resources.

A process that has been given a handle to the OS object is assigned a protection level greater than or equal to the minimum protection level, and a process that has not been given a handle to the OS object is assigned a protection level less than the minimum protection level.

Another example of a resource is an I/O device to which the system is to give a process user-level access. Multi-processor components such as a network or I/O device are a common feature of some multicore processors. For example, the user network on tiled processors (which is accessible to the processors of multiple tiles by static or dynamic messages, as described herein) provides a low-latency, efficient mechanism for applications to move data from the processor of one tile to the processor of another tile, with register-mapped reads and writes. Access to such multi-processor components can be controlled, so that a given application can use the component without interference from another application. In some implementations, mechanisms are provided so that if an application crashes when using a multi-processor component (or, in general, erroneously leaves the multi-processor component containing unread or incomplete state), another application is able to start up and use the multi-processor component without needing to use complex reset mechanisms.

In some implementations, an application maintains control over which tasks have access to the multi-processor component. At the same time, access may, in some cases, not be dependant on the particular processor, but rather may be dependent on the user task, so that processes or threads that are not using the multi-processor component can time-share the processors as necessary.

The operating system can be configured to enforce proper use of the multi-processor component, and manage cleanup of a resource, e.g., memory when use of the resource is complete. This can be achieved, for example, by one or more of: requiring processes to be bound to a single processor before accessing the multi-processor component (to avoid application confusion due to migration); requiring that all use of the component is suitable according to predetermined criteria (for example, that all messages on a user network stay within the requested portion of the network); and performing multi-processor component reset after all the tasks exit.

An exemplary use of a multi-processor component (a user network in this example) may include one or more of the following techniques. A first technique includes reserving a portion of the multi-processor component. In one example, the operating system reserves a portion of the multi-processor component, in this example the user network, to ensure there is no denial of service possible by unknown user processes. The operating system represents a "token" that confers the right of a user process to use part of the network as a file descriptor. The user process opens a pseudo-file and perform a system call (e.g., an "ioctl" or equivalent call) to request a particular subset of the multi-processor component be partitioned and reserved.

This approach allows the operating system to ensure that the partitioning of the multi-processor component makes sense. In one example, for a Cartesian routing mesh network connecting processors laid out in a grid, a full rectangle's worth of processors is requested in a partitioning since packets can be sent anywhere within the rectangle using the Cartesian routing. At the same time, the operating system can ensure that the partitioning of the multi-processor component is atomic, by suitable use of locks on the data structures within the operating system.

The same pseudo-file can also be used to display the current set of partitions and the tasks that are associated with them. To do so, a user-space process can, for example, issue read( ) operations against the file descriptor, rather than using an "ioctl" to make it the "token" discussed above.

Another technique includes allowing multiple tasks to access a single partition. In general, a multi-processor component is shared by multiple processes. For example, a user network in a tiled processor is shared by processes so that they can communicate data efficiently between them. A partition of the multi-processor component is initially reserved by one task (e.g., a process) by opening a pseudo-file and using an ioctl on it to make the file descriptor a "token" representing a portion of the multi-processor component. In one example, tasks then have that file-descriptor "token" available to them to access the multi-processor component. In some implementations, threaded applications access the multi-processor component using any thread, since threads share the set of file descriptors.

Some applications use a "fork" operation to copy a parent process to generate a child process. In a multithreading environment a thread of execution is duplicated, creating a child thread from the parent thread. Under Unix and Unix-like operating systems, the parent and the child processes or threads are distinguished by the return value of the fork( ) system call. In the child process, the return value of fork( ) is 0, whereas the return value in the parent process is the process ID of the newly-created child process. Multiple processes can also access the multi-processor component using any child of the original parent process that opened the pseudo-file, because the forked child processes share the file descriptors of the original parent process.

Alternatively, arbitrary sets of tasks can be linked together by passing the file descriptor token over sockets (e.g., as implemented in Linux or operating systems including other Unix type operating systems) using "SCM_RIGHTS" file-descriptor passing, so that unrelated processes can still collaborate within the same partition of a multi-processor component.

Another technique includes using a multi-processor component token to access the multi-processor component.

An available token for a task does not necessarily automatically confer to that task the ability to access the multi-processor component. Rather, access to the multi-processor component may not be desired by the task. For example, a task may be a "server" process that returns "tokens" for other "client" processes to access to the multi-processor component, but without wanting to access that component itself. In one example, getting access to a multi-processor component may require a task to perform three steps:

1. Acquire a token (as discussed above).
2. Bind itself to a single processor. In general, a multi-processor component will be sensitive to the actual processor used to access that component, so the system can be configured so that there is no possibility that the task will change processors partway through an access operation. This is, for example, true of some tiled processor user networks, in which messages are injected a word at a time until a complete message has been composed.
3. Request access from the operating system. In the case of a file-descriptor "token", this could be a simple ioctl( ) system call using the file descriptor.

The operating system allows the specified task direct access to the multi-processor hardware; for example, with the tiled processor user networks, direct access to the network via the read/write registers, and to the special-purpose registers is used to control aspects of the user network.

In one example, the operating system is also able to revoke access, either if requested explicitly by the task, or if the task changes its affinity so that it is no longer bound to the same single processor. Similarly, in one example, the operating system is signaled when the task exits so that the operating system keeps track appropriately of the set of tasks accessing the network.

By making access on-demand and task-specific, it is possible to run some tasks on a processor that have access to the multi-processor component, and some tasks that do not have such access, as desired. The operating system can record which tasks have correctly requested access and which have not, so that at context-switch time the hardware-level access privilege can be granted or denied.

Another technique includes providing dynamic error notification to accessing tasks.

If a task attempts to misuse the multi-processor component in a way detectable by the operating system, the operating system terminates that task, and/or all the tasks that are currently accessing the multi-processor component. For example, in some tiled processor user networks, the operating system can configure the hardware for the network (e.g., the switches or other hardware) to generate an interrupt if a packet attempts to cross out of a partitioned rectangle of processors. The operating system can then trap that interrupt, identify the particular partition of the user network in question, and send a fatal signal to all the tasks that are accessing that partition (since in this case it may not be known which task was responsible for the message, and since the user network may now have one or more messages in it that can't be received by any processor).

Terminating all the associated tasks using a multi-processor component is typically the appropriate action if it is not possible to determine which task was responsible for the error generated by the attempted misuse. Terminating all the tasks using the component may be plausible for a multi-processor component that is tightly coupled into the execution of an application.

Another technique includes tracking task lifetime for multi-processor component cleanup.

As long as one or more access "tokens" are in use by application tasks, the operating system maintains the requested partition of the multi-processor component for those tasks. However, when the file-descriptor "tokens" are closed, or (equivalently) all the tasks holding the tokens exit, the operating system determines that it is no longer possible to access that partition of the multi-processor hardware, and thus resets that partition.

While in principle this can be done by the user process itself, it is often easier and more appropriate for the operating system itself to perform this work. For example, the cleanup code may require running code on every processor attached to the multi-processor component (as is the case with some tiled processor user networks). In this case, it may be simpler to have an operating system process run this code than it is to have user-space process do it. In addition, a fully-reset component may be a cleaner component to present to user-space, rather than one that requires a reset. Information leakage between tasks can be prevented by having the operating system do the cleanup of the component.

5 Managing Cache Coherence

Described are techniques related to using software-managed cache coherence efficiently in an operating system (e.g., Linux).

In a multicore system with multiple cores coupled to an external memory, some cache management schemes are able to provide a shared distributed cache that is distributed over respective memories of multiple cores that share the cache, while also ensuring that overhead does not grow as the number of cores participating increase, by choosing a "home cache" for each cache line. The shared distributed cache can be one level in a hierarchical cache (e.g., L3). The memory of a given core can have a portion that is reserved for storing cache lines of a private local L2 cache and a portion that is reserved for storing cache lines of a shared distributed L3 cache. Alternatively, the memory for the L2 and L3 caches can be separate physical memory circuits coupled to a core. In the shared distributed L3 cache, the memory that is being cached is mapped to multiple cores and a given core is selected as the home cache for a given line or page of memory stored in the external memory.

The home cache location (including a home cache and a location of a cache line within the home cache) of the set of memory lines in a given page can be chosen in several ways. In a "hash-for-home" approach, each of the memory lines in a page is assigned to a different core. In a "locally-homed approach," all the memory lines in a given page are assigned to a given core. In the hash-for-home approach, various techniques can be used to perform mapping of the memory lines to home core locations. For example, a hash table or a round-robin distribution approach can be used. For the locally-homed approach, a TLB can be used to make a per-page assignment. In some implementations, a home cache for a given page or memory line is chosen to be in the memory of the core on which is located the directory information for that page or cache line. The home cache for a given page or memory line is generally chosen to be in the memory of the core that will take coherence actions for that page or memory line such as invalidating other caches. By distributing the home caches appropriately, the various processors of the cores efficiently manage cache coherence among the memories of the cores. In a tiled processor, the cores are the tiles, the processor of a given core is the processor 200, and the memory of a given core is the data memory 206.

An operating system is configured to manage the choice of a home cache for the memory that a process uses (e.g., memory pages in an associated address space such as a stack or heap associated with the process). For example, a single-threaded process with no shared memory sets the home cache of the memory pages that it uses to the processor on which it is executing. If the process migrates to execute on a different processor, the home cache for the memory pages are changed as well. In other scenarios the process being migrated is a thread of a multithreaded process.

Techniques for managing cache coherence include choosing which memory pages of a process's address space to migrate to different home caches when the process that accesses those pages migrates to a different processor. The migration of the memory pages is performed in a manner that is safe in the presence of operating system activity on other processors. For example, individual memory pages may be shared widely across multiple processors. The migration of such pages needs to take into consideration changes in how the pages are cached due to operating system decisions or application requests. For example, cached data on pages that are being migrated are invalidated in the caches the processors sharing those pages, so that those processors do not access old data from their caches. One set of considerations in migration of such pages includes handling operations that generate a copy of a process (e.g., a fork( ) and/or vfork( ) system calls) in a way that results in efficient setting of the home caches of the memory pages of the resulting process that is generated. Some techniques take advantage of "non-coherent" hardware modes to improve the caching performance of pages that are effectively immutable (e.g., not mapped shared writable by any process).

Some techniques optimize operations such that expensive cache flushing or TLB flushing is not necessarily required when dealing with freed pages. Examples of functions provided by different management techniques include functions that enable automatic choice of home caching of pages in various contexts to optimize performance (e.g., non-coherent pages, copy-on-write pages, and migration). Other functions include modifying the home cache of a group of private pages within an address space and migrating the pages together. Another function changes the home cache of an individual memory page that is potentially shared across multiple address spaces. Another function provides a method of safely integrating memory page migration with the operating system kernel's use of temporary and processor-private mappings for memory pages that do not have fixed kernel mappings. Some functions optimize the allocation and deallocation of memory pages from the operating system's page allocator. The home caches for the user stack memory pages of a given process can be assigned for locality of access to the local cache of the same core on which the process is running. This type of memory page having the local cache as the home cache is called a locally-homed page. When the process is migrated to another core, the user-space stack page(s) and kernel stack page associated with that process are migrated when the stacks are locally-homed. The pages associated with a process can also be migrated (by having their home cache locations re-assigned) in response to other input, including user input such as a parameter set by a user or a request from a user. When locally-homed pages are present for a given process and when the operating system scheduler or other scheduler has to make a scheduling decision involving migrating that process to execute on the processor of a different core, the scheduler takes into account that process has locally-homed pages in making scheduling decisions. In one approach, the scheduler does not migrate the process if it has more than a given number of locally-homed pages. Similarly, in another approach, when the scheduler has to start running a process, it preferentially runs the process on the core on which that process has locally-homed pages.

The migration process can be handled by the operating system, or in some implementations, by a software layer above or below the operating system (e.g., by a hypervisor layer on which the operating system runs).

The management of "home caching" in the operating system includes various techniques, including the following.

Non-Coherent Caching of Read-Only Pages

Non-coherent caching offers substantial performance gains over coherent caching when the backing pages (memory pages stored in the external memory) are not being modified (e.g., stored as "read-only"). On some tiled architectures, for example, this is because it is possible to cache the contents of the page freely on multiple tiles without regard for coherence. In some implementations, this is because any local copies (stored in the L2 cache portion) of the data being cached in the home cache (stored in the L3 cache portion) do not need to be invalidated when the data being cached in the home cache is invalidated.

Figure 7A:
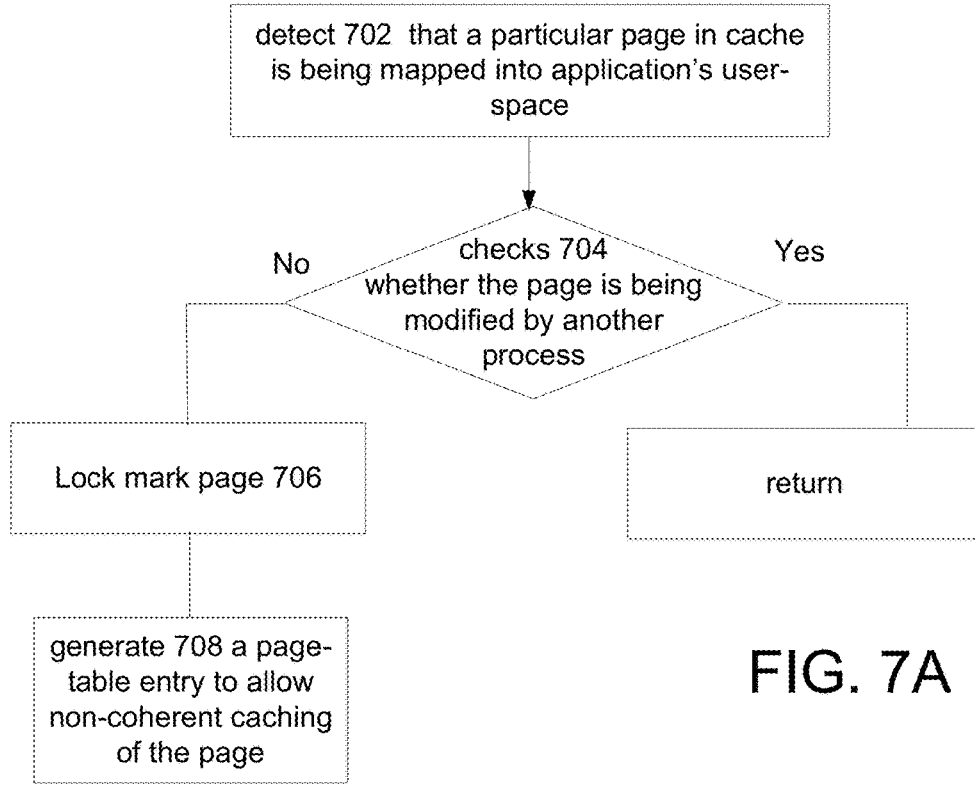
FIGS. 7A and 7B are flowcharts of procedures for managing cache coherence.

Referring now to FIG. 7A, the operating system detects 702 that a particular page in the file system page cache is being mapped into an application's user-space using the "read-only" or "private" flags in the Unix mmap( ) API, for example. The operating system checks 704 whether the particular page is currently being modified by any process running on the system (as a "shared writable" mapping). If not, the operating system can lock mark 706 the page as "immutable" in the page metadata and generate 708 a page-table entry for the page that allows it to be cached non-coherently.

Figure 7B:
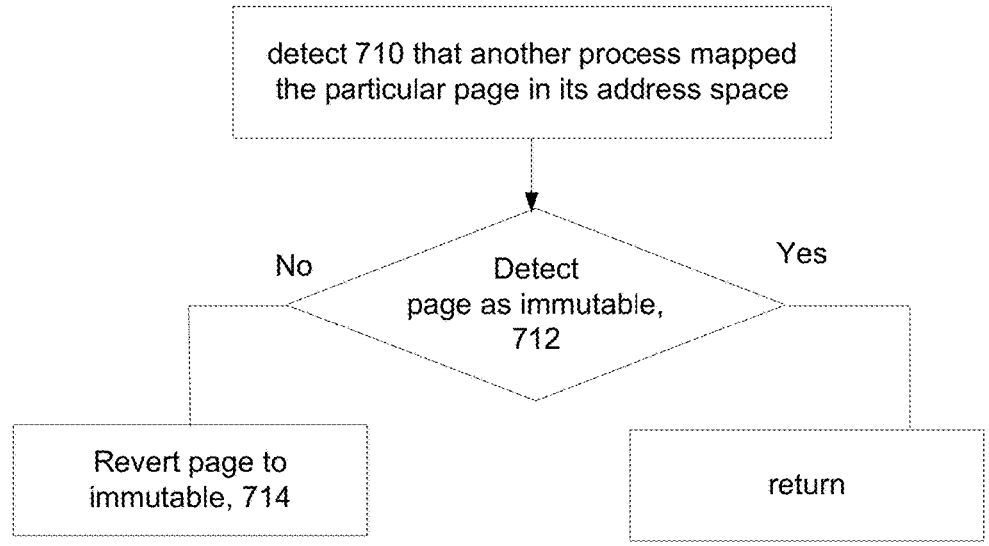

Referring to FIG. 7B, the operating system guards against such pages being modified. If another process maps 710 the immutable page into its address space using the "writable shared" flags of the mmap( ) API, the operating system detects 712 at fault time that the page is immutable, and reverts 714 the page to non-immutable. Alternatively, if a "write" operation is performed to the page, the operating system likewise detects that the write is to an "immutable" page, and revert the page to non-immutable. Additional details of the process of converting a page between these states are described below as part of the description of how to change the home cache of a page.

Adjustment of Home Caches for Migrating Processes

When processes are moved (or "migrated") from being executed on one processor to being executed on another processor (e.g., between processors of different cores), the operating system migrates the home cache of some of the pages that are mapped into the address space of the processes being migrated. For example, when a process is migrated from a first processor to a second processor, the home cache of a page associated with the process is migrated from a home cache in a memory coupled to the first processor to a home cache in a memory coupled to the second processor. Additional details of techniques for performing the migration are described below.

One or more of the following exemplary rules can be used for determining which memory pages to migrate (changing the home cache for those migrated pages) in response to migrating a process associated with the memory pages. Pages that are shared between multiple processes are not migrated by default. This avoids the risk of making performance better for one process at the cost of making performance worse for another process. Higher-level mechanisms can be used to make the appropriate decisions for shared pages. For example, the operating system can be configured to determine a frequency at which a given shared page is accessed by different processes, and then make a migration decision that will favor a process that accesses data from the given shared page more often (e.g., migrating the given page only if a process on a different cores accesses data more frequently). Pages that have explicit markings (e.g., set by a user) for identifying their home cache are not by default migrated, unless the explicit marking is "follow process N", where N is ID of the migrating process. The pages in the address space of a process being migrated that are locally-homed are migrated by default. For example, the user-space stack page(s) and kernel stack page of a process being migrated are migrated by default, in a default configuration in which stacks are locally-homed. However, for the kernel and/or user stacks a "hash-for-home" mechanism can be used to distribute the pages across multiple processor caches, in which case the operating system does not migrate the pages in response to process migration by default.

The home cache of the set of memory lines in a given page can be chosen in several ways. The so called "hash-for-home" approach assigns each of the memory lines to a different core, for example, in a round robin distribution. In another approach, "locally-homed" approach all the memory lines in a given page are assigned to a given core. When assigning each of the memory lines to a different core, a hash table is used to perform the mapping. Other techniques could be used. For the latter approach, a TLB can be used to make a per-page assignment. The home caches for the stack pages of a given process can all be assigned to the same core on which the process is running. This is because stack pages are usually not shared by other processes and so assignment of the home cache to the memory on the core on which the process is running may reduce the likelihood of remote cache misses. A threaded process can include multiple threads running on one or more cores. The operating system can migrate some or all of the threads that are included in the threaded process. Each thread may have access to various memory pages within an address space including stack pages, which are typically accessible to a single thread, and heap pages, which may be accessible to multiple threads. In some implementations, when a thread is migrated, the operating system migrates that thread's stack pages, but the operating system does not by default migrate other pages in the address space that are shared by other threads (e.g., heap pages) since this may benefit one thread at the expense of others. Child processes that are generated by an operation that duplicates a parent process (e.g., the vfork( ) system call) are not migrated by default, because the generated child processes are effectively "borrowing" the pages from the parent process.

Management of Heap Pages

Functions of a runtime library (e.g., the libc runtime library) are able to cooperate with the kernel when allocating pages for a process's heap. If the process is marked to use the "hash-for-home" mode on its heap pages, no special action needs to be performed. However, if the process is marked to use the "locally-homed" mode on its heap pages, then the runtime library will produce a thread-specific heap for each thread, and mark the pages in each heap as "follow thread N." The result is that any data returned from memory through the heap APIs is guaranteed to remain cached on the same processor on which the allocating thread is executing, even if the thread migrates to another processor after performing the allocation.

Management of Copy-on-Write Pages

In some implementations, when the operating system copies a process (e.g., by performing a fork( ) operation), all the pages in the process are set to read-only and tagged as "copy on write" such that a copy-on-write operation occurs in response to a process attempting to write data to a page. When a copy-on-write operation occurs, a copy of a page is made for the process that accessed the page (either one of the two processes), and the copy is placed in the process's page table, marked as "writable." If the other process issues a "write" to its page after the copy of the page was made, the other process will find that there is no longer any other process sharing that page and can immediately mark the page as "writable." The operating system intervenes at both points to ensure that the pages have their home cache set properly. If one or both processes have migrated to other processors, the shared copy-on-write pages may have had a home cache that is optimal for at most one of those processes. After the copy-on-write, the new copied page is set to the default home caching mode for that page (e.g., on the local processor).

The other copy of the page, when the copy of the page is subsequently written to by the other process, may need the operating system to adjust its home cache. In this case the operating system marks the page as writable and the operating system modifies the home cache of the page in the same way as the operating system modified the home cache of the other copy of the page.

Migrating the Home Cache of a Process's Pages

To migrate a set of pages from the "old" processor where the process was previously running to a "new" processor requires interaction with other activities of the operating system. For example, a "swapper" daemon could also be running and attempting to swap out the pages of the process. In addition, other threads that are running at the same time may be sharing the pages that are being migrated. Under one of the exemplary rules discussed above, the operating system does not change the home cache of pages that are shared with other processes. However, the home cache of various other pages may be migrated in a thread-safe manner.

Routines that update the home cache of a memory page that is being migrated use a procedure that includes locking the page (e.g., by having an agent acquire a lock using a locking protocol). One step of the home-cache migration procedure may include safely locking all the pages that are chosen to be migrated in response to a given process migration. The operating system uses any of the rules discussed above (or other rules) to choose which pages to migrate. The locking of the page by the operating system would be coordinated with procedures present in the operating system that involve locking memory pages (e.g., a swap procedure), so that the home-cache migration procedure avoids potential deadlock with other locking protocols.

For example, the locking protocol for an agent such as a swapper daemon typically locks a given page before locking the corresponding page table. However, in some implementations, the home-cache migration procedure traverses the page table of the process being migrated to find the pages that are to be migrated. In these implementations, the home-cache migration procedure locks the page table before locking the corresponding pages themselves (e.g., to guarantee that it is safe to inspect the page table entries). This potentially allows an "ABBA deadlock" (in which one agent holds a lock on A and is waiting to lock B and another agent holds a lock on B and is waiting to lock A), where the swapper daemon locks a page at the same time as the home-cache migration procedure locks the page table corresponding to that page, then each tries to lock the other required object.

The following is an exemplary locking algorithm for a home-cache migration procedure of the OS that works correctly (avoiding this potential ABBA deadlock) with a swapper daemon that locks a page before locking the page table:

The OS locks the page table for the process being migrated (or the sub-page-table, as appropriate for the particular operating system). The OS reads the page table to find a group of pages to migrate. After the OS finds a page that is chosen to be migrated, the OS attempts to lock the page using a "trylock" operation. If this operation fails, it's possible that a potential deadlock condition may exist. In response to the failure of the trylock operation, the OS increments a reference count on the page to guard against a race with freeing the page, unlocks the page table to avoid the potential deadlock, locks the page (waiting if necessary), then locks the page table. After locking the page, the OS checks if the page table entry is still the same as prior to the lock because the entry may have changed while the OS was relocking the page. If the entry is not the same, the OS releases the locks on the page and page table and retries the operations. If the entry is the same, the OS has successfully locked both the page and page table, and continues by migrating the first page of the group of pages being migrated.

After the first page has been migrated, there is a potential for another potential deadlock, where another agent in the kernel is trying to lock page A then page B, and the home-cache migration procedure is trying to lock page B then page A. So after the OS has one page locked and ready, subsequent lock attempts (on pages or page tables) are treated as "trylock" operations, and if one fails, the OS ends the sequence of lock acquisitions, and returns to the main loop, to perform the home-cache migration procedure, and release all the locks. The OS restarts at the point where it first failed to acquire a lock, but now the target page or page table is the first one in a new group, so the OS can follow the procedure described above for migrating the first page. As the OS is acquiring locks, there exists a possibility that a lock the OS needs is already held by the OS. This situation is relatively straightforward; for page tables this happens whenever the OS is moving two pages both referenced through the same part of the page table. In this case, the OS tracks the first page that caused the lock to be acquired and does not attempt to reacquire the lock later.

Another potential situation for the OS to account for is that the OS can migrate the kernel stack page, but the code for the home-cache migration procedure may be running on that same stack page. The OS is able to handle this by calling an assembly helper routine that carefully updates the stack page table entry and issues the necessary hypervisor calls to flush the appropriate remote TLBs and caches, without needing to use the current stack.

An exemplary sequence of memory operations (e.g., cache and TLB flushing) used to migrate a group of pages (not shared by another process) from having one home cache to another is as follows, after the OS has locked the appropriate pages and page table entries as described above: The OS traverses through the page table entries for a given page table, clearing their "present" bit (indicating the page is present in a given home cache), and setting a "migrating" bit. The OS issues TLB flushes to clear any cached page translations. In particular, the OS flushes the mappings for the address space ID of the threads using the given page table, on each processor on which such threads are running, and the OS flushes any kernel mappings for pages that are visible in the kernel address space (including the kernel stack). At this point no process can validly map the physical page, so the OS issues a cache flush to the previous home cache(s) of the pages that are being migrated. Since the OS is likely moving multiple pages, the OS simply evicts the entire cache on the processor(s) that stored the previous home caches. The OS flips the "present" bit back on for all the page table entries that have moved, adjusting the page table entries to reflect the new home cache. The OS unlocks the pages and page tables that were locked in the home-cache migration procedure.

The home-cache migration procedure is performed on return to user-space when the kernel detects that the user process is no longer executing on the same processor that it was executing on last time it ran. In some implementations, portions of the home-cache migration procedure are performed by different processes or threads from a primary migration thread that manages the home-cache migration procedure. For example, in some operating systems, the page table locks can only be acquired by the process that is migrating (and other restrictions may exist, such as not performing certain operations from an interrupt context).

If another process (other than the process that is migrating) tries to access a page of the process that is migrating, for example a word on the stack of the migrating process, the another process will find a page table entry in which the "present" bit is not set, causing a page fault; in response, the page fault handler detects that the "migrating" bit is set, and suspends (e.g., using a spinlock, a type of lock where an executing thread simply waits in a loop ("spins") repeatedly checking to see whether the lock becomes available)) until the migrating process sets the "present" bit (e.g., when updating the home-cache information).

Migrating a Shared Page

On occasion it may be necessary to migrate a page that may be shared among multiple processes. For example, as discussed above, sometimes the operating system decides to migrate a page from being "immutable" to being coherently cached, as when a shared writable mapping is produced for a page that was previously mapped as read-only.

This procedure is similar in concept to the home-cache migration procedure discussed above for migrating the non-shared pages of a single process, but to the OS scans for and handles cases in which other processes have the page present in their address space. The OS can take advantage of the swapper daemon in the operating system. The swapper daemon cleans up all references to a page that is being swapped in a virtual memory procedure (e.g., being paged out to disk). For example, one shared-page home-cache migration procedure is implemented by extending the swapper daemon's algorithm (e.g., driven by the "try_to_unmap( )" function in Linux). The first set of page-table updates (where the OS clears the present bit and sets the "migrating" bit) can be done with one modified call to the swapper daemon, and the second set of updates (where the OS sets the "present" bit as it updates the home-cache information) can be done with another modified call to the swapper daemon.

Integrating Home-Cache Migration with Temporary Kernel Mappings

Another aspect of updating kernel and user page table entries, as discussed above, is that on a 32-bit machine, the operating system will sometimes produce temporary memory mappings for pages. Often those mappings remain coherent with the user-space mappings. One class of mapping is global temporary mappings that are used when the kernel needs to map a page, but may lose control of the page because of a context-switch of the kernel to another processor before the kernel's work is complete. On Linux, such mappings are set up with the kmap( ) call. To support such mappings, an additional spinlock is added into the path for setting up and releasing such mappings. This lock allows for the addition of an extra function, which traverse through the table of current global temporary mappings looking for any page-table entry that maps the page that is migrating. If the added function finds one, it can adjust it—either by clearing the present bit, for the first part of the algorithm, or re-producing the page-table entry, for the second part. In addition, this routine returns the virtual address (VA) at which the page is mapped, so it can be added to the set of VA translations that are flushed by the TLB flush.

The other class of mappings is per-processor "atomic" mappings, which are only held briefly, and are dedicated to a particular type of operation. In some cases, such mappings are used on the processor that sets them up. On Linux, such mappings are set up with kmap_atomic( ). To support safe use of these mappings, a lock is added into the path used to set up and release such mappings. When setting up a mapping, information is added about the mapping to a global table of mappings that includes information on the processor, the physical page, and the virtual address used. An additional function can acquire the lock and scan the table for active mappings, clear the present bit on any page table entries, and issue remote TLB flushes for those mappings. The OS issues multiple remote TLB flushes to each processor that has the page mapped, because unlike with global mappings a page may be represented with a different virtual address on each processor.

Optimizing Cache Flushes During Page Allocation

The OS is configured to ensure that when a page is allocated by the kernel from the kernel's page allocation function, its home cache is set to the proper default, which in some cases means that its home cache is on the current processor. (Alternatively, the OS can request "hash-for-home" behavior from the page allocator itself, as an alternative approach for certain kernel-intensive workloads.)

Since in general, when the OS frees a page back into the kernel allocator, its home cache is not adjusted, the OS can be configured to take some action at the time of allocation. Since no other reference to the page exists yet, the OS can be configured to flush the cache on the previous home processor, and for a page with a permanent kernel mapping, adjust the kernel page table entry and issue a global TLB flush.

One type of optimization is to include a "generation counter" associated with each page (e.g., using metadata for the page), and track a matching generation on each processor. Whenever the OS flushes the cache on a processor, the OS can increment the processor generation counter of each processor. When the OS frees a page, it copies the current generation counter into the page's metadata. Then, when the OS allocates a page from the page allocator, the OS can check to see if the page's "free stamp" is older than the current processor stamp.

In some cases, having a single check can introduce subtle race conditions. For correctness, the OS is configured to use a two-phase marking algorithm. The OS increments and saves the counter value before beginning the cache eviction on the processor. The increment operation means that any pages freed later than this time do not assume they are clean based on the eviction that is to occur. When the cache eviction is complete, the OS writes the saved counter value to the processor's generation count. Writing the saved counter value after the eviction is complete means any pages re-allocated prior to this time will not assume they are clean based on an ongoing eviction.

Avoiding Excessive Cache-Flush Overhead

If the OS placed pages in the page allocator that were widely distributed in the kernel's free page pool, such as pages that had been non-coherent, or pages that were "hash-for-home," then when the OS re-allocated the pages the OS could issue cache flushes to many (if not all) of the processors on the system. However, this operation could be computationally expensive due to the large amount of operations and the time waiting for the cache flushes to complete and to re-load the caches.

Instead, the OS can be configured to place such pages on a special list of "sequestered pages." These pages are isolated and cannot be re-allocated until the page pool itself is empty. At that point the OS issues a cache flush to every processor on the system and returns all the sequestered pages back into the page allocator.

Another use of the "sequestered pages" list is for pages whose home cache is a Low-Overhead mode processor (as described above, a special mode used on a per-processor basis to minimize interference of user-space processes by the kernel). Such processors should not be interrupted if possible to keep interference low, so at allocation time the OS recognizes that a "bad" cache flush would be required, and the OS instead places the page on the "sequestered" list, and attempts to allocate another page instead.

6 Supporting Secondary Atomic Operations Using Primary Atomic Operations

Some techniques enable transparent support for providing secondary atomic operations, such as compare-exchange and other complex and/or high-level atomic operations that are not directly supported in the hardware of a computing system, using a primary atomic operation such as test-and-set, which is directly supported in the hardware of a computing system. An atomic operation includes one or more actions that are performed in way that ensures that the one or more actions are not left in an inconsistent state or interrupted by other actions on the portion of the computing system being operated upon (e.g., a memory location), so that either atomic operation is performed successfully with all of the actions completing, or the atomic operation leaves the computing system in the initial state with none of the actions completed. To the rest of the computing system/operating system other than the portion executing the atomic operation, the effects of the atomic operation are only observable after completion of the atomic operation.

Figure 8A:
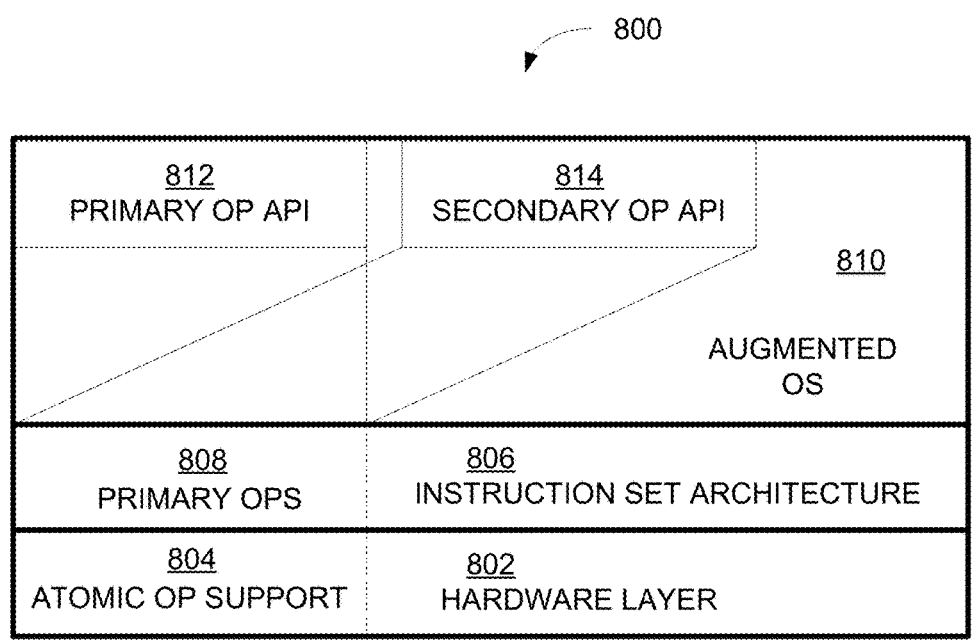
FIG. 8A is a schematic diagram of a computing system.

Referring to FIG. 8A, a computing system 800 includes a hardware layer 802 with circuitry 804 that provides support for primary atomic operations. The system 800 includes an instruction set architecture (ISA) 806 that has instructions 808 for performing the primary atomic operations using the circuitry 804. The system 800 includes an augmented operating system 810 that provides application programming interfaces (APIs) that include both primary atomic operation APIs 812 and secondary atomic operation APIs 814. The primary atomic operation APIs 812 directly access the hardware supported instructions 808. The augmented operating system 810 implements system calls for the secondary atomic operation APIs 814 using the primary atomic operation instructions 808, as described in more detail below. From the perspective of programs running on the augmented operating system 810, both primary and secondary atomic operations are fully supported. From the perspective of the hardware layer 802, only the primary atomic operations have direct hardware support by the circuitry 804.

Some instruction set architectures (ISAs) provide atomic instructions for performing primary atomic operations on a computing system, based on which other atomic operations can be performed. For example, one such primary atomic operation is called "tns," which atomically sets a memory location to a predetermined value (e.g., a "one" value in predetermined bit length, such as a 32-bit one value) and returns the previous value stored in the memory location.

However, some operating systems and language libraries that use the ISAs (e.g., Linux and libc) may require support for secondary higher-level atomic operations, such as 32-bit compare-and-exchange, exchange, addition, binary "and", and binary "or" atomic operations. For example, a mutual exclusion ("mutex") operation is used to implement a lock that ensures that multiple entities (e.g., processes or threads) are mutually excluded from accessing the same resource at the same time (e.g., at a time at which the resource is in an inconsistent state while it is being modified by another entity). The "futex" (fast user-space mutex) API that provides support for pthread mutex operations uses a variety of these higher-level atomic operations.

Support for these secondary atomic operations can be provided using the atomic instruction of the ISA (e.g., the "tns" instruction). The computing system is configured to address issues that may be encountered when support for secondary atomic operations is provided. For example, the system allows the kernel-space and user-space to update memory atomically with respect to each other and avoids denial-of-service to the kernel from user-space applications. The system ensures that mutual exclusion is performed efficiently but correctly across atomic operations for multiple instruction lengths (e.g., both 32-bit and 64-bit atomic operations) and between processes mapping the same physical page at different virtual addresses. The system support atomic instructions on memory addresses that have not yet been mapped by the page fault handler. The system reports attempted user-space atomic instruction accesses to kernel, unmapped, or unaligned memory with suitable user-space signals. The system can provide good performance using the hash-for-home home cache assignment technique described herein. In addition, a specialized form of 32-bit atomic operations are provided directly on "tns" if the full range of values for 32-bit atomic operations do not need to be supported.

Techniques to provide atomic support for tiled processor architectures include providing a user system call (e.g., using "syscall" functions provided by the operating system) to access the kernel's atomic support, to allow proper mutual exclusion and prevent user-space denial-of-service. In addition, an interrupt mechanism provides fast memory access for user system calls, while still providing full privilege separation and page table checking, and generating suitable user-space signals. A cycle-efficient algorithm for implementing compare-and-exchange, exchange, atomic "add", atomic "and", and atomic "or" operations can be used to perform multiple operations within the same few processor cycles. A fast hashing scheme can be used to choose among multiple locks for the atomic operation while still guaranteeing mutual exclusion, both between 32-bit and 64-bit operations, and between accesses to the same physical memory mapped at different virtual addresses. The lock is held as briefly as possible via cache-aware programming, and faster atomic operations if the full range of 32-bit atomic operations is not needed.

The kernel provides an efficient technique for choosing one of a pool of simple spinlocks implemented via the "tns" instruction), with the memory that is used for each homed in the cache of a different processor, to provide high throughput and low latency for locks. The kernel uses this pool directly to implement a "lock, read-modify-write, unlock" protocol for performing atomic operations. An "interrupt critical section" mode is enabled during these operations to lock out all interrupts, even non-maskable ones (such as performance-counter interrupts), since the handlers for any type of interrupt could themselves try to use atomic operations, and, as a result, could self-deadlock on the same lock that is already locked in the atomic lock pool.

The kernel provides support for the "futex" syscall using this mechanism, where the kernel supports more complex fault handling (such as allocating a page of anonymous memory the first time it is accessed). In this case, the kernel identifies that the fault is in the futex code, releases the atomic lock while still staying in the "interrupt critical section" mode, and resets the program counter (PC) to a stub routine that returns a suitable "restart" error to the calling kernel function. The kernel continues with the normal page-fault interrupt flow so that the user-space page can be mapped, etc., as appropriate, then returns to modified PC to return the "restart" error, at which point the OS re-acquires the appropriate lock from the atomic pool and retries the atomic operation.

The kernel also provides support for a fast user syscall that multiplexes a variety of different atomic operations into one short code path (compare-and-exchange, exchange, "add", "and", and "or"), and executes with a minimum of register-save or interrupt bookkeeping, instead co-operating with the normal page fault handler such that any interrupt causes the atomic lock to be released and the kernel to be recursively re-entered, setting up the heavier-weight register save/restore mechanisms as if the fast syscall instruction executed by the user had directly caused the page fault itself. The page fault can proceeds as normal, makes the page available, and returns and re-issues the fast syscall instruction. If the page fault indicates a bad address, a signal handler is invoked, pointing to the fast syscall instruction as the "culprit" memory operation that caused the signal.

If the full range of atomic operations is not needed, a specialized use of the "tns" instruction can provide faster support for a restricted range of values.

Figure 8B:
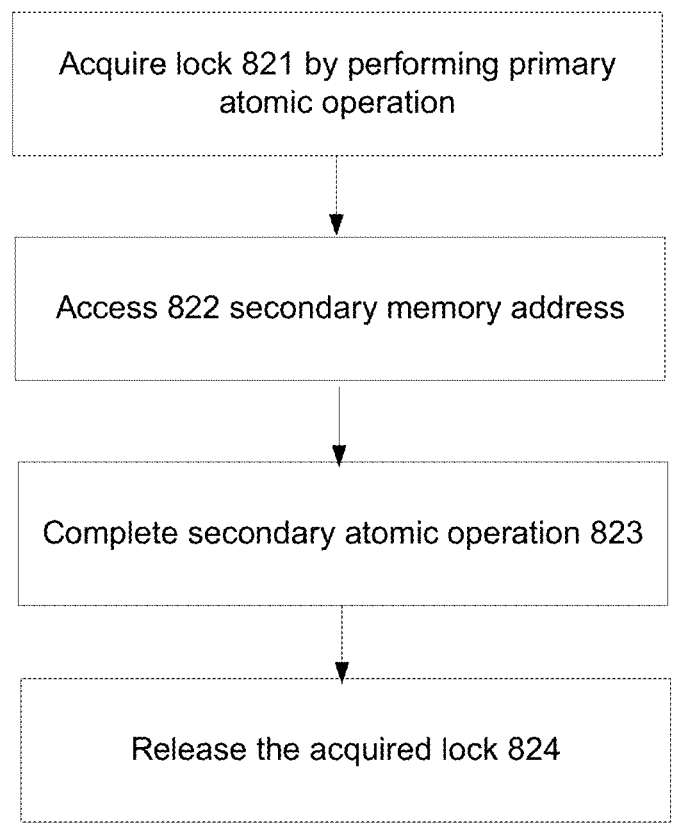
FIG. 8B is a flow chart of a procedure for performing a secondary atomic operation.

Referring to FIG. 8B, in an exemplary procedure for performing a secondary atomic operation in the computing system 800, the operating system acquires a lock 821 by performing a primary atomic operation that is directly supported in circuitry of the computing system on a first memory address in a memory of the computing system. The operating system accesses 822 a second memory address in the memory of the computing system after the lock has been acquired. The secondary atomic operation is completed 823 based on accessing the second memory address. The acquired lock is released 824 after the secondary atomic operation has been completed.

Various aspects of providing the secondary atomic operations will now be described.

Fast and Reliable Mutual Exclusion

Fast and reliable mutual exclusion is provided based on virtual addresses. When a virtual address (VA) for a portion of memory (e.g., a word) is presented to the atomic routines, the system is configured to exclude any other processor from concurrently accessing the word. However, the same page of physical memory that includes the word is mapped by the kernel at multiple different virtual addresses VAs. Each word in the page therefore may have multiple VAs, (called "multiple aliasing."). The system is configured to perform proper mutual exclusion to protect access to a given word even if given word has multiple aliasing VAs.

To protect 32-bit operations from 64-bit operations; for example, an atomic 32-bit operation at address 0x1004 can be configured to properly mutually exclude a 64-bit operation at address 0x1000 by taking into account the different lengths of the operations.

One approach to handle the issue of multiple aliasing VAs is to use the page table to map the VA to the physical address (PA). Alternatively, another approach avoids the slow page-table lookup and instead uses the bits of the VA that are guaranteed to be distinct in any mapping of the given VA. These are the bits starting with bit 3 up to the page size, in one example bit 15 (inclusive), for 64 KB pages. Ignoring bit 2 means that 32-bit and 64-bit operations will be treated as referring to the same underlying 64-bit address. And ignoring bits 16 and up means any possible VA mapping of a given PA is treated the same way, since the VA is the same as the PA for the low 16 bits. These 13 bits can then be used to choose a suitable atomic lock for implementing the mutual exclusion operation.

The hash-for-home technique described above can be used for choosing the home cache for a given cache line, distributing the home cache locations for multiple cache lines in a page across multiple respective processors. By placing an array of locks in memory whose home cache location is chosen using hash-for-home, the OS can map each of the 2^13=8192 possible VA bits into a separate lock, with the locks distributed to caches across multiple cores of a multicore system. References to distinct addresses will likely run in parallel. The lookup to find the lock is also efficient, because the lookup uses a shift and mask operation on the VA, and an addition of the base of the page at which all the locks are stored.

Mutual exclusion is provided safely between kernel-space and user-space.

Hardware Atomic Operations

Hardware atomic operations are essentially unaware of whether they are issued by a user process running in user-space or by the kernel. This means that some locking protocols, such as the kernel's "futex" protocol, can provide mutual exclusion with user-space on one core that is performing memory operations at the user's privilege level at the same time as the kernel is performing memory operations at the kernel's privilege level on another core.

The secondary synthesized atomic operations can also have this property. One way to enable this property is to use the existing hardware operations, for example to have a "tns" based lock associated with every 32-bit value, or (as discussed above) an array of such locks. In this case both a user process and the kernel can lock an atomic lock and perform the operation.

However, if both the kernel and a user process can acquire and release such locks, the kernel is then exposed to denial of service attacks by a user process. For example, the user process can lock all the atomic locks and then the kernel will deadlock the first time it tries to perform an atomic operation itself. To avoid this situation, mutual exclusion is implemented in the kernel and provided to user processes as a service using techniques described below.

Cache-Aware Programming

Cache-aware programming is used for providing fast atomic operations. When an atomic lock is used by a process running on a core, the process is able to lock out processes running on other cores trying to operate on the same address (as well as potentially other addresses that alias to the same lock). Accordingly, it may be useful to reduce the total time a lock is held. The following are examples of ways to reduce the total time a lock is held by a process that executes code for performing an atomic operation using an atomic lock.

The computing system cache-line aligns the code executed with the lock held. Instructions corresponding to a portion of executed code are cache-line aligned by storing the instructions in an instruction cache such that they occupy a small number of cache lines. This can be done, for example, by storing the first instruction at the beginning of a cache line, as opposed at the middle of a cache line or towards the end of a cache line. In some cases, all of the code may be able to fit in a single cache line and cache-line alignment may not be necessary. In other cases, the code does not fit in one cache line.

When an instruction is not present in the instruction cache a miss occurs when the cache line corresponding to that instruction is accessed, causing a time delay while the instruction is retrieved from main memory or a different cache level to that cache line. When the code includes instructions that correspond to a range of multiple cache lines, touch operations can be used to ensure that the instructions are present in the instruction cache before the atomic operation begins. For example, if code for an atomic operation takes up two cache lines, a process may first miss when executing an instruction corresponding to the first cache line, and may miss again when executing an instruction corresponding to the second cache line. Time delays during an atomic operation can be reduced by avoiding the possibility of acquiring a lock in an instruction of the first cache line and triggering a cache miss when accessing an instruction of the second line while the lock is held. Just before the lock is acquired, the atomic operation touches the second cache line, so that the instruction of the second cache line is stored in the cache. Touch operations can be performed, for example, by executing a code fragment (e.g., a branch instruction) that is placed at the end of the second cache line. The code fragment is located at the end of the second cache line to avoid executing the instructions at the beginning of the second cache line, which need the lock to be held before being executed. After performing this touch operation the atomic operation executes the instruction of the first cache line to acquire the lock, and by the time the atomic operation gets to the instructions of the second cache line, the second cache line is already in the cache, avoiding the potential delay of a miss while the lock is held.

In another example, an appropriate load instruction can be issued for the user address as early as possible, potentially even before the operating system has validated the address fully. This load instruction may fault, but the fault handler will detect that case appropriately.

Multiple User-Space Atomic Operations

Efficient code is used for multiple user-space atomic operations.

The code that implements the atomic operations can be configured to have a short code path. In some implementations, the code can issue the instructions necessary to execute a number of common atomic idioms in a small number of cycles. Two examples of atomic operations implemented directly in the kernel path include "cmpxchg" and "atomic_update". The "cmpxchg" operation is a "compare and exchange" operation, an atomic operation that replaces a value in memory with a new value, but only if the old value in memory matches a specified "old value" provided as an operand to the cmpxchg operation. The semantics of "atomic_update" are to write "(oldvalue & mask)+ addend" to memory, and return "oldvalue". Using atomic_update, a number of atomic operations can be implemented using different values of the "mask" and "addend" operands, as follows:

> An implementation of an "exchange" operation uses the following values: mask=0, addend=value.
> An implementation of an "add" operation uses the following values: mask=−1, addend=value.
> An implementation of an "and operation uses the following values": mask=value, addend=0.
> An implementation of an "or" operation uses the following values: mask=~value, addend=value.

Optimistic Low-Overhead Fault Management

Low-overhead fault management is used for user-space atomic operations.

An exemplary procedure for initiating a system call in the kernel (e.g., in response to an exception) sets up a kernel-space stack (the base address for which is saved in a special-purpose register), saves the user registers on that stack, saves the PC the exception came from, releases the "interrupt critical section" mode so that additional interrupts can be handled in the kernel, runs various bookkeeping functions, and finally branches to the appropriate system call implementation. By contrast, when a user process requests a syscall for an atomic operation, the operating system passes a negative number as the "syscall number" (rather than the usual positive number to specify the specific syscall, as done in the Linux operating system). The interrupt handler for syscalls checks for a negative value early, and if found, branches to the atomic fast syscall path.

The "interrupt critical section" mode is set on entry to interrupts and system calls, locking out other interrupts so the handler can safely load fault context from special registers. The operating system leaves it set while the OS executes code to check that the user address is in the right portion of the virtual address space, finds the appropriate atomic lock, acquires the lock, performs the atomic operation, releases the lock, and issues a return-from-interrupt instruction. This provides a fast path through the code. For example, no registers need to be saved (e.g., by using caller-saved registers), an instruction stack does not need to be used (either user stack or kernel stack), the fault context does not need to be saved and restored, and the "interrupt critical section" mode does not need to be exited.

However, if a fault occurs, the operating system is prepared to handle the fault. A page fault routine will detect that a fault occurred in the kernel, which normally implies that the kernel stack is already set up and valid in register "sp". However, this is not the case for the fast syscall routine, and the page fault handler is configured to account for this by issuing an extra instruction in the fast syscall path, namely setting the "sp" register to zero. (The operating system saves and restores the user's sp value in a caller-saved register for the normal case.)

When the assembler code that handles exception-handler prolog starts up, the assembler code detects that "sp" is zero, and ignores that the PC is in the kernel and instead performs a "from-scratch" kernel stack setup operation that is used when a fault is initiated from user-space. After the operating system reaches the code that handles the page fault, the operating system recognizes that the fault came from the fast syscall code, unlocks the atomic lock, stores the user's sp value (which it had saved in a caller-saved register) back into the user "sp" slot in the register-save structure on the kernel stack, and continues with the normal page fault. At this point the operating system exits from "interrupt critical section" mode. The page fault handler unlocks the atomic lock because the handler knows which register in which the fast syscall code stores the lock pointer.

If the fault completes successfully the operating system will return to the user-space address of the fast syscall instruction, with the stack pointer properly reset, and re-issue the fast syscall instruction, this time completing successfully. If the fault fails due to a bad address (not mapped in user-space) the kernel will have already set up a signal indication, and the exception-return code will invoke the user's signal handler, or terminate the program if no handler is present.

Low-Overhead Fault Management

Low-overhead fault management is used for futex operations. A similar issue as addressed in the previous aspect exists for futex operations. These are operations that are generated by the kernel directly (e.g., during sys_futex( ) or one of the functions it calls) but on a user address. If the address is bad, the operating system is able to handle it correctly. The operating system sets up the atomic lock pointer as for the fast syscall case, and tries to issue a read/modify/write sequence. In this case, the operating system does not need a special value of "sp" as a sentinel (since the code is already running on a valid kernel stack), and in some implementations the operating system is configured to avoid generating indications for bad addresses, because the futex( ) code is configured to return an "EFAULT" errno to user-space instead.

In the page-fault code the operating system determines that the fault came from the futex code, unlocks the atomic lock (e.g., using the same register convention as the fast syscall code), and updates the saved PC value to point to a special futex "retry" stub, and continues with the normal page fault, after releasing the "interrupt critical section" mode.

If the page fault is successful, the operating system exits from the interrupt handler to the futex "retry" stub, which returns a special value (ERETRY) to the futex calling code, which loops around, re-acquires the futex lock, and retries the operation. If the page fault is unsuccessful, the kernel does a lookup in its exception table, finds the retry stub's PC, and switches it to the futex failure code PC, which returns EFAULT to the caller instead.

Optimistic Low-Overhead Fault Management

Optimistic low-overhead fault management is used for kernel atomic operations. Another type of atomic operation includes kernel atomic operations (e.g., atomic_add( ) in the kernel). Kernel atomic operations can be performed by taking out the atomic lock and performing the appropriate operation, and releasing the lock. Because the memory target is kernel memory, it is unlikely that any fault occurs. However, it is possible that a fault could occur. One example is vmalloc memory, which can cause a fault when one task sets up the vmalloc page in its page table, and another task then tries to reference it. In this case, the page fault handler notices that the page fault has occurred in the vmalloc range of the address space, properly updates the page tables, and returns immediately.

The special atomic-aware management code for page faults can be handled in a special early function call, which is invoked early in the page fault path, if the "interrupt critical section" mode was enabled in the code that caused the interrupt. This special early function call is invoked after the registers have been saved but before the operating system exits the "interrupt critical section mode" that locks out other interrupts. This allows the page fault to handle kernel atomic operations safely in any context, even if they occur during a non-maskable interrupt when it is not safe to take any other recursive interrupts.

Specialized Atomic Operations

The primary atomic operation "tns" is used directly for specialized atomic operations. While the techniques discussed above enable full support for 32-bit atomic operations, if it is possible to restrict the range of values that can be set by the "tns" instruction, the locking can be done purely within the 32-bit word itself, which would improve performance. With this approach, the operating system requires that a predetermined value (e.g., the value "1") be reserved for use by the algorithm. Any other value can be stored at the given address in memory at which the "tns" atomic operation is being performed and atomically manipulated.

To perform an atomic operation on a word in memory, the operating system first locks the word by performing a "tns" operation. In the uncontended case (in which the lock is not currently held by any process), the operating system will set a "1" value into the word, and the target register of the operation will receive the previous value of the word from the memory address of the word. The operating system updates the value as desired (e.g., according to any of a variety of other operations including cmpxchg, exchange, add, etc.) and writes the updated value back to the memory address in a memory operation. Unlike other atomic operations, where the lock word is separate from the value and thus multiple memory operations may need to be serialized using, for example, a fence instruction (causing new memory operations from the same core requested after the fence instruction to be suspended until all previous memory operations requested before the fence instruction have been completed), in this arrangement the operating system does not need to "fence" the memory operation and does not need to perform a separate "load" operation to acquire the initial value, or perform a separate store operation to store the value back in memory.

If the value is contended (already held by a process), however, the "tns" operation will return back a "1" value (or whatever the predetermined reserved value is), indicating that the memory address is currently being updated by another processor. In this case the processor that received the "1" value spins, re-issuing the tns instruction periodically until it retrieves a value other than "1", at which point it can perform the atomic operation.

This kind of atomic operation is well suited for enumerations (where "1" can be omitted from the set of values that the application is manipulating), for example, or other situations where the value is known not to ever take on the value "1", such as pointers.

Alternatively, it is possible to transform the value prior to storing it and after loading it, so that if a "1" value was initially stored it will be transformed to a different value, for example, such that the caller of the algorithm sees valid values in the unsigned range 0 to 0x7fffffff. Alternatively, the operating system can add and subtract two from the value, giving a range of 0 to 0xfffffffe, with "−1" becoming the predetermined reserved value. These approaches make the set of usable values larger. To enable an application to read or write the memory word on which the "tns" operation is being performed directly the application is configured to apply the appropriate transformation when performing the read or write operations.

7 Managing Memory Request Based on Priority

Some techniques relate to Quality of Service (QoS) handling on memory requests within a multicore system.

A memory request is an instruction issued by a processor core that represents a request to access memory at a referenced address (e.g., to write data to or read data from a referenced address). A memory request is handled by the multicore system by sending the request over a connection (e.g., over a memory network dedicated to sending memory requests) to a memory controller that is part of a memory interface, such as a DRAM interface. DRAM interfaces are often performance bottlenecks in some systems.

The memory controllers are configured to optimize the memory requests to increase DRAM bus utilization. One such optimization technique is a first-ready-first-serve policy. If a memory request is "ready" (e.g., a memory request that is ready to be read/written right away), then this memory request is scheduled before other requests that are not yet ready.

However, not all memory requests are the same. In a multicore processor environment, some cores for instance, may have more requests than other cores or some cores may have more important requests that are more latency sensitive than other cores.

Figure 9A:
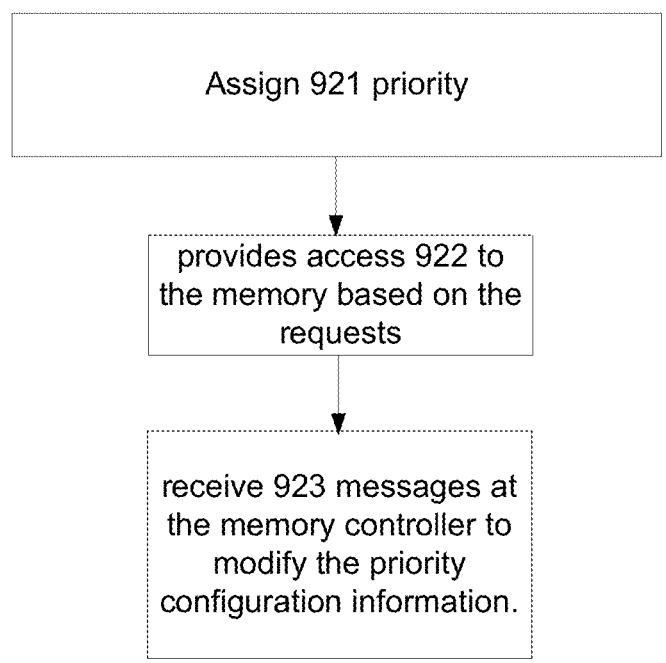
FIG. 9A is a flowchart of a procedure for managing memory requests based on priority.

Referring now to FIG. 9A, an alternative technique for handling memory requests assigns a "priority" 921 to the memory request to handle quality of service for different memory requests. Different priorities get different levels of service. The priority of a given request is assigned based on priority configuration information that defines the priority levels associated with requests having various defined characteristics. The priority configuration information can be stored in any of a variety of locations, and in various forms. One such form is a "priority control list." The technique provides access 922 to the memory based on the requests according to the assigned priority. The priorities are configurable. For example, the memory controller can receive 923 messages to modify the priority configuration information.

A Translation Lookaside Buffer (TLB) can be used to define the priority level of the memory requests. The priority level for requests that access a given memory page are stored in the TLB along with the page translation information. A processor issuing a memory request (e.g., a load or store instruction) accesses TLB for the translation of an address to be accessed, and as the processor accesses the TLB for the translation it also acquires the priority level of the memory request.

In some case, the priority level is derived without using the TLB lookup to obtain the priority level. For example, a memory prefetch request may be scheduled under the control of a separate engine that operates independently of the processor (e.g., a direct memory access (DMA) engine, or circuitry using a state machine), and the memory prefetch request may have a different priority than other memory requests. The engine may not even need to use the TLB to obtain a translation of an address if the engine is working directly with the translated address. In this case, the engine can directly assign the appropriate priority level to the prefetch memory request (e.g., a lower priority than memory requests that are produced by an instruction executed by the processor). In some cases, a memory request may have a different priority depending on which memory controller is the destination for handling the memory request.

The following are examples of different aspects of priority control list used to control assignment of priorities.

Figure 9B:
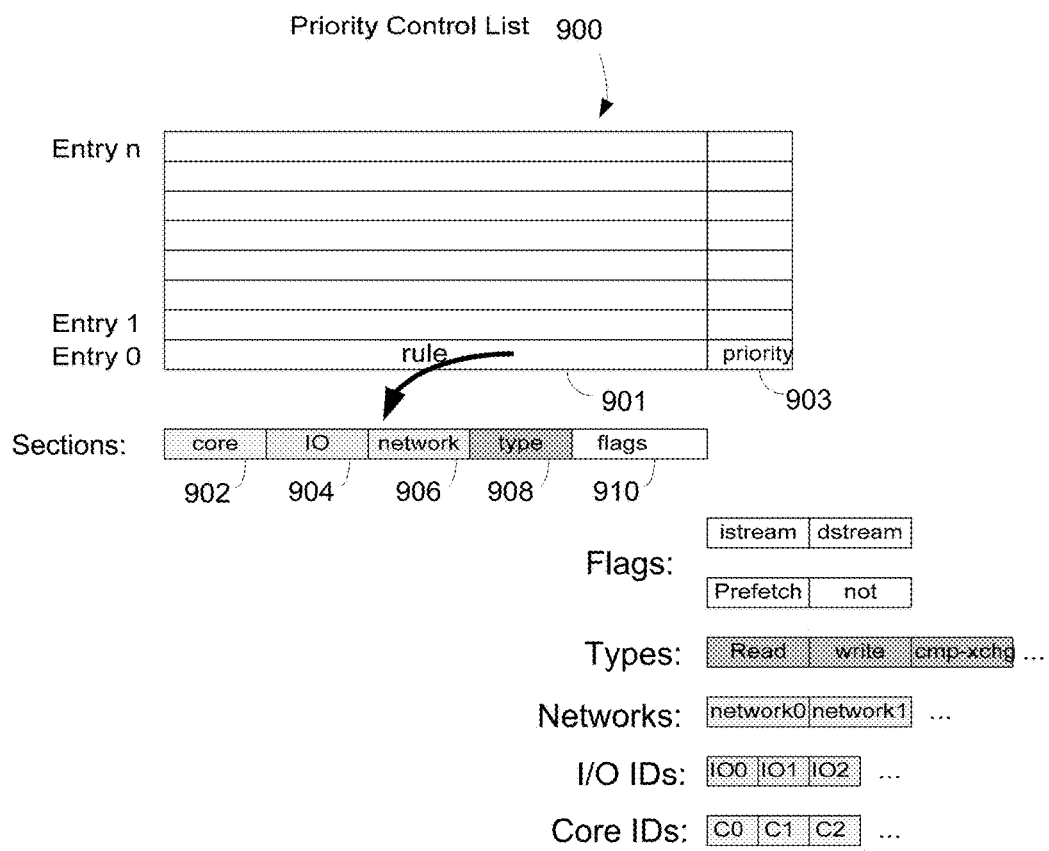
FIG. 9B is a diagram of a priority control list.

Referring to FIG. 9B, a priority control list 900 is shown, which is included in the memory controller to control the priority levels for memory requests to memory coupled the memory controller (e.g., external DRAM). Alternatively, priority control lists can be used to control priority levels for requests to access other types of memory including requests to access a cache or other memory internal to a core. Various factors can be used to determine the priority levels of a memory request. These factors can be programmed in the priority control list. The priority control list allows setting of priorities.

The priority control list is provided as a structure, e.g., a table in memory (e.g., in a register in or accessible to the memory controller) that outputs priority level for a given request. An exemplary priority control list 900 includes entries, which correspond to rules with each entry having multiple sections including for example, core 902, IO 904, network 906, type 908, flags 910 and a priority 903 (typically assigned by the operating system), as described in more detail below. The operating system changes how priorities are set by changing the table values. The priority control list is configurable by the system software for a given application, during initialization or at runtime. The memory controller filters the priority control list and determines the priority level for each memory requests on the fly. Each memory controller can have its own priority control list that can be customized. The priority control list can be implemented to define the priority level, or in more general form to define a property of the memory request (e.g., a property from which a priority level can be derived).

A multicore system such as a multiprocessor containing several processors can have one or several memory controllers that manage access to external memory (e.g., DRAM). In some implementations, priority control lists are included in one or more of the memory controllers to control the priority levels for memory requests. Factors that determine or set the priority levels can be based on which core the request comes from, whether the request is a read or a write request, whether the request is from a TLB, whether the request is from the operating system or from a user process, and whether the request is from a I/O device, and so forth. Requests from a specific core or a specific I/O device can be given a special priority. The priority level can be changed at runtime by the software. A priority level can be changed by a core issuing a special type of memory request to the memory controller. A priority level can also be changed by a core sending a special message to the memory controller.

Various techniques can be used to enable efficient selection of a memory request to be handled. In some implementations, techniques are used to enable selection of a memory request without having to sort through all the pending requests each time a memory request is selected. Some techniques handle new requests coming in. Other techniques enable lower priority requests to get service without having to wait an inordinately long period of time.

A technique to enable the computing system to dynamically update how the priorities are set uses a configuration register located in the memory controller, that is written into by a special memory access instructions issued by any core, to store priority configuration information. The configuration register uses hardware circuitry or software to reconfigure the way priorities are set.

A multicore system may have multiple memory controllers for controlling access to respective external memory modules (e.g., DRAM), and other types of controllers, such as I/O controllers for controlling access to respective I/O interfaces.

Figure 10A:
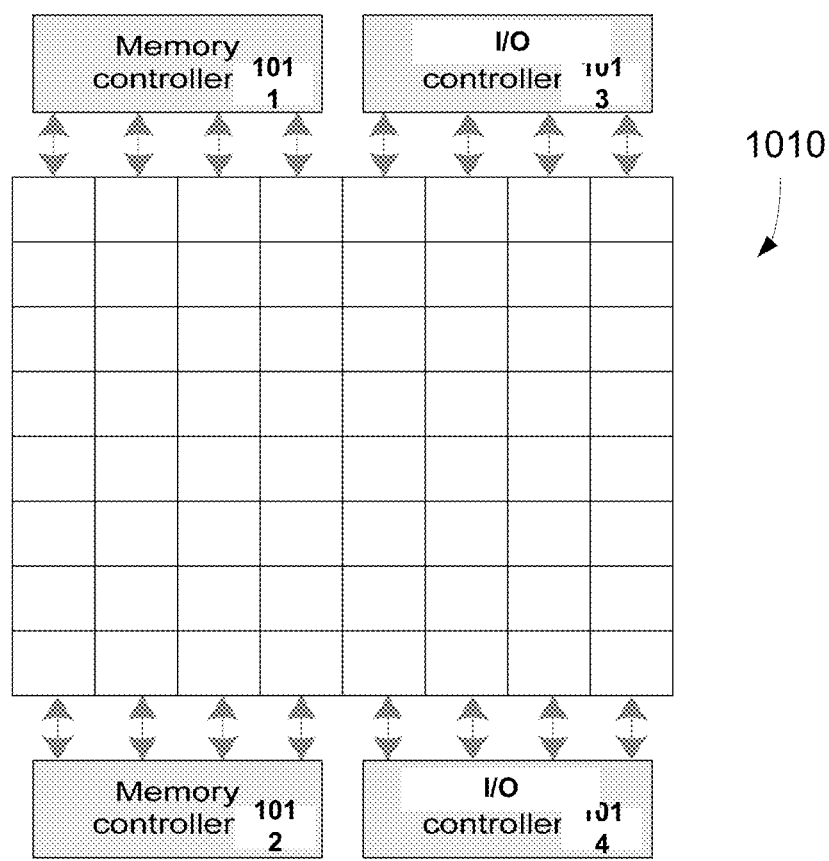
FIGS. 10A-10E are schematic diagrams of a processor array and coupled devices.

FIG. 10A shows an exemplary tiled processor array 1010, in which the cores are tiles that are connected through an on-chip mesh network, with mesh network connections between switches of the tiles. Tiles on the edges of the array 1010 are physically coupled to memory controllers 1011, 1012, and I/O controllers 1013, 1014. The controllers can have network connections to any of the tiles through an on-chip mesh network, as described above, which uses switches in the tiles. A controller may have multiple network connections to the tiles, and multiple physical connections to respective edge tiles, as shown in FIG. 10A. Memory requests to the memory controllers can come from cores (e.g., the tiles in FIG. 10A), or form other connected controllers (e.g., the I/O controllers in FIG. 10A). A memory request can have multiple associated attributes including, for example, one or more of the following attributes.

An attribute that characterizes what device requests the access to the referenced memory address, for example, which core, or which I/O controller.

An attribute that characterizes which of multiple routes the memory request comes from such as, for example, a network connection number to the memory controller that identifies an internal network connection over a particular route.

An attribute that characterizes the request type such as, for example, read, write, or compare-and-exchange, etc.

An attribute that characterizes the memory request address.

An attribute that characterizes the flags that are associated with the request such as, for example, flags that indicate a data stream or an instruction stream, an L2 cache miss or an L3 cache miss, or whether or not the request is a prefetch, etc.

Some or all of these attributes are used to specify the priority level of a memory request in the priority control list, as mentioned above.

Still referring to FIG. 9B, the priority control list 900 is implemented in each memory controller. The priority control list 500 through the entries in the list specifies rules under which the level of priority is assigned for each matched memory request.

The priority control list 900 has plural entries (Entry 0-Entry n). Each entry specifies a "rule" in a rule field. A rule for a given entry is an expression of a set of attributes associated memory request that are used to assign a predetermined priority level specified in a priority field of the given entry to such types of memory requests. As mentioned above, each entry has several sections of the rule field 901, each section identifying a potential attribute.

In this example, a rule field 901 of an entry includes a "core" section 902 identifying a core, and "I/O" section 904 identifying an I/O controller, a "network" section 906 identifying a network connection, a "type" section 908 identifying a type of request, and a "flag" section 910 identifying one or more flags.

In one example, one attribute is specified using multiple bits to cover multiple cases for that attribute. For example, for a prefetch flag, a request can be flagged as any of the following four cases: (1) a prefetch request, or (2) not a prefetch request, or (3) either type of request, or (4) neither type of request. Two bits are used to identify each one of these cases (one bit represents "prefetch," and one bit represents "not prefetch").

If "prefetch"=1 and "not prefetch"=0, then only a prefetch request is a match.

If "prefetch"=1 and "not prefetch"=1, then any request (no matter whether it is a prefetch or not) is a match; in other words, the prefetch flag is a "don't-care." Don't-care flags always result in a match.

If "prefetch"=0 and "not prefetch"=1, then a non-prefetch request is a match.

If "prefetch"=0 and "not prefetch"=0, then any request will not be a match; which can be used, for example, to indicate that this entry of the priority list is not valid or is not defined.

In an example of the core section 902, each core is represented by one bit in the core section 902 of a given rule (e.g., if there are 64 cores, then that section would have 64 bits). If some cores are enabled (e.g., by a bit value of "1"), then any memory request from that enabled group of cores is a match for the core section 902 of the entry for the given rule. An example of a rule that can be used to select a set of cores to be assigned a higher priority than other cores is a rule that assigns cores running in a particular mode (e.g., Low Overhead mode) a higher priority.

An entry is a match for a memory request, if all sections are matches for the memory request. Some sections can be configured to support a "don't-care" value that always matches. For each memory request, the memory controller goes through the rules in the priority control list. If there is a match to an entry for a memory request, then the priority level for that memory request is determined according to the priority field 903 for that entry. If there is no match for a memory request, then a default priority can be assigned to that memory request.

A memory request itself may carry some priority bits, for example, from the TLB (Translation Lookaside buffer) lookup. The memory controller can be configured to determine the priority from two sources, the priority from memory request itself or the matched priority from the priority control list. One example is to choose the higher priority to override.

The priority control list is configurable by the computing system software for a given application. For example, one or more of the following configurations can be used.

All write requests from an I/O controller with a predetermined characteristic (for example, for a high data rate I/O interface) have a special priority level.

All read requests from a core with a predetermined characteristic (for example a core that is in a performance bottleneck) have a special priority level.

All compare-and-exchange requests from an identified group of cores have a special priority level.

The priority control list is configured during the initialization process and can be reconfigured (or replaced by a new rule) at runtime, for example, when a rule may not be used because a certain core is identified as being inactive (e.g., in a sleep mode or is disabled), in which case a new rule is configured avoiding that core.

Each memory controller can have its own priority control list that can be customized by the system software. In one example, the rules in the priority list may not be the same among all memory controllers. For example, memory requests from a group of cores are treated as a high priority level in controller 1011, but may be at a different priority level in controller 1012.

The priority control list can be in a different protection level from (the protection level of) other system resources such as, for example, the TLB. Flexibility can be gained using different protection levels. The protection levels can be configured, for example, as described in U.S. Pat. No. 7,577,820, incorporated herein by reference in its entirety.

In a more general form, the rules in the priority control list can be used to define other properties (other than the priority level) in addition to priority level. That is, if a memory request matches a rule, then one property defined by the rule can have a different meaning than the priority level that is defined by the rule. The priority control list can be used to define multiple properties.

The priority level of the memory request is considered when the memory controller schedules the next memory request (from all pending memory requests). Several techniques can be used including, for example, one or more of the following techniques.

If changing the request order (due to priority) does not introduce wasted cycles on a DRAM bus (e.g., a DRAM page hit request), to the operating system can schedule a high priority request.

If changing the request order (due to priority) will introduce wasted cycles on a DRAM bus (e.g. a DRAM page miss request, or bus turnaround between a read and a write, etc.), other conditions are to be evaluated.

Other considerations that can be used to priority level assignments or selection of requests at different priority levels include one or more of the following.

Enforce ordering for transactions to the same address

Read-first: Favor reads over writes in general (but could be overridden)

Hit-first: Favor DRAM open pages versus DRAM closed pages in general (but could control on how much "favor")

Timeout-request first: no request will be wait forever

Load-balancing on DRAM banks

Load-balancing on network mesh connections

Reduce turnaround between reads and writes

Reduce turnaround between DRAM ranks

Reorder DRAM commands: activation/precharge/read/write/refresh

Balancing traffic from all sources, e.g. one streaming traffic (page hits) from one core or I/O controller can be configured not to blocking traffic from other core or I/O controllers (that are random and all page misses).

Favor one request from core or I/O controller "A" over many requests from core or I/O controller "B".

Favor the first request, if there are many requests from the same core.

8 Memory Controller Load Balancing with Configurable Striping Domains

Load balancing can be used between multiple memory controllers within a multicore system.

The so called "memory wall" a term used to describe the relative limits on memory performance compared to processor performance is a limiting factor in multicore processor applications. To reduce the mismatch between increasing computing power provided by multiple cores and limited memory performance provided by a memory controller, one technique is to use multiple memory controllers within a multicore system. Described are techniques to load balance workloads from multiple cores among multiple memory controllers.

One approach to load balancing of memory controllers is to map certain core(s) to one memory controller. One case includes a group of cores being mapped to one memory controller; and, one case includes one core being mapped to one memory controller. This approach may have any of the following properties. A memory controller is determined for any memory request from a given core. No address bits will be used to select the memory controller. Generally, not all cores have same amount of memory requests at runtime, as such some memory controller may be busy (and fall behind), while other memory controller may be idle (or lack of work load). Some techniques are used to handle non-uniform memory workloads between the cores or between groups of cores.

Another approach is to use certain address bits to select memory controllers. In some implementations, part of the address bits are used to select the memory controllers, and part of the address bits are used to select the address space within the memory controller. Applications may use the address space in different ways. For example, the address bits, which are used to select the memory controllers, may be relatively stable for a period of time, which has an implication on the workload to the memory controllers. Some operating systems support variable page sizes. Different page sizes may change the address patterns on the address bits.

In some cases, memory load balancing may need to be customized. For example, two applications may be running on a multicore system, and it may be desirable for these two applications not to interfere with each other. As such, it may be desirable not to load balance the memory controllers, for example, a specified memory controller can be dedicated for a specified application.

Some multicore systems may have memory controllers not in power of two, for example, three controllers. This property introduces potential complexity on how to select the memory controllers with two address bits. In some cases, each memory controller may have a different amount of memory attached.

A system can be configured to use a "striping domain" in which an address within a memory address space is assigned for access by a corresponding memory controller based on a designated portion of the address. The designated portion is selected to exclude certain bits, such as, for example, one or more highest order bits, and bits that correspond to a cache line associated with the memory address. The striping domains facilitate load balancing. In some implementations of a striping domain, memory traffic is load balanced between the memory controllers within the same striping domain. Techniques using striping domains can have one or more of the following features.

Load balancing using striping domains is introduced where memory workloads are balanced between the memory controllers within the same striping domain.

Striping domains can be configurable by system software for a given application.

Load balancing decisions can be determined by a hash function based on various address bits.

The hash function can be configurable by system software for a given application.

Mesh network extension can be implemented between the memory controllers to improve memory performance when multiple memory controllers are load balanced.

Cores in a multicore chip or a multiple chip system can have access to multiple memory controllers. The system can hash certain address bits of the memory address to determine which memory controller to send the address to. One approach is to choose the hashing bits such that selected ones of the memory controllers have a balanced load (e.g., have more or less the same number of references). Another approach can be used in which one application is assigned one or more memory controllers, while another application is assigned one or more other different memory controllers. Another approach assigns memory controllers in such a way that memory controllers with more memory or with faster memory are more frequently assigned that other memory controllers.

Some memory controllers can be closer to a core than others, so addresses that are issued from a given core can be assigned to a controller close to that core. For example, striping can be done by using a core's number as the hash address. Also memory controllers can be assigned in such a way that the same physical addresses always maps to the same controller.

Different portions of an address may be the same for a sequence of words that are in the same cache line (the portion of the address called the "cache line address"), or for a sequence of words that are in the same memory page (the portion of the address called the "page address"). In some implementations, the system is configured not to pick address bits that are the same for words within the same cache line. Rather the system is configured to pick address bits that are higher order than the cache address. In some implementations the system is configured not pick the highest bits (e.g., because they do not change often). In some implementations, middle bits in an address are used to map the address to a memory controller.

Striping domains can be introduced so that workloads are balanced between the memory controllers within the same striping domain.

Load balancing decisions can be determined by a hash function based on various address bits. The hash function can be configurable.

A system can be configured as in one or more of the following examples. For illustration purpose, four memory controllers are used in some of the following examples.

(1) In a multicore system with multiple memory controllers, it may be desirable to load balance the memory workloads so that all memory controllers could work towards their full potential.

Figure 10B:
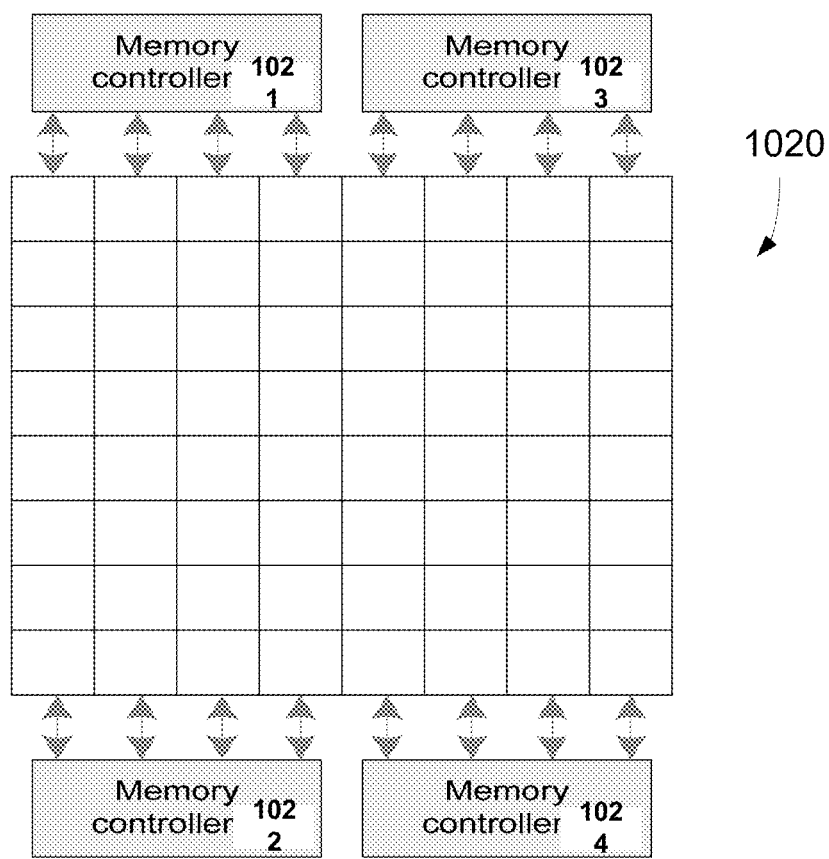

For example, an exemplary tiled processor array 1020, shown in FIG. 10B, has four memory controllers 1021, 1022, 1023, 1024 coupled to different respective sets of tiles (generally, in a multicore system each memory controller may be coupled to one or more cores). The processor array 1020 has an address space that can be partitioned into four "logical memory partitions" (denoted by 0, 1, 2, 3). A mapping function is used to map addresses between the logical memory partitions and physical memory partitions that each correspond to an associated one of the memory controllers 1021, 1022, 1023, 1024. In some cases, there may be more memory controllers than physical memory partitions, and the physical memory partitions are distributed to a subset of the memory controllers with the remaining memory controllers being unused. One of goals for the mapping function is to load balance the physical memory controllers for specific applications.

The memory controllers are connected to the processor array over a mesh network connection. The cores are connected to each other over a mesh network connection in this exemplary tiled processor.

Figure 11:
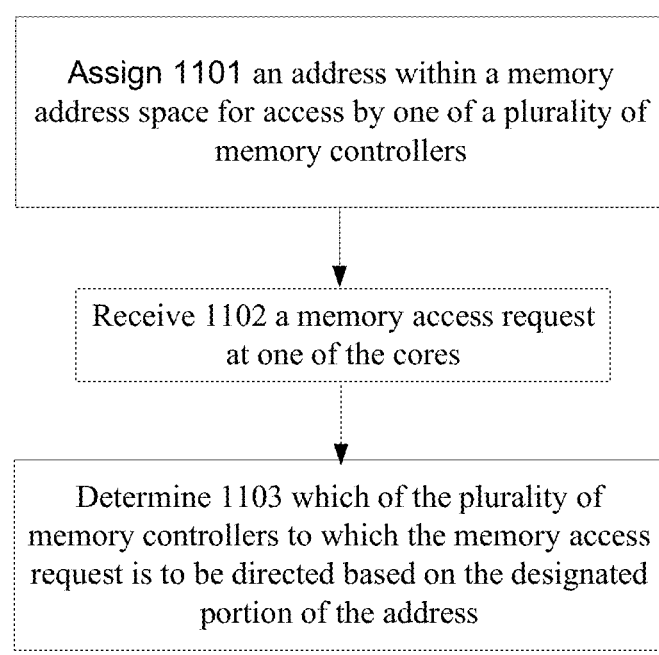
FIG. 11 is a flow chart of a procedure for managing memory access requests in a multicore system.

Referring to FIG. 11, in an exemplary procedure for managing memory access requests in a multicore system such as the processor array 1020, the system is configured by assigning 1101 an address within a memory address space for access by one of a plurality of memory controllers coupled to different respective cores based on a designated portion of the address. The designated portion is selected to exclude one or more highest order bits and bits that correspond to a cache line associated with the memory address. During operation, one of the cores receives 1102 a memory access request to access data stored at the assigned address. In response to the memory access request, the operating system running on the multicore system determines 1103 which of the plurality of memory controllers to which the memory access request is to be directed based on the designated portion of the address.

(2) To access a given virtual memory address of a memory request in a core, circuitry in the core (e.g., including a TLB) translates the virtual memory address in to a physical memory address and determines a logical memory partition that includes that physical memory address, and a corresponding physical memory partition of a memory controller that is able to access that physical memory address within a connected memory module (e.g., DRAM). In a multicore system with four memory controllers, two address bits of the physical memory address can be used to select one of four logical memory partitions, with the two bits denoted as A[x] and A[y]. The bits A[x] and A[y] are hashed (alone, or optionally also using other input such as information stored in a special purpose register and/or additional bits of the physical address) to generate two bits A'[x] and A'[y] that identify one of the four physical memory partitions.

(3) A striping domain is defined so that memory workloads are balanced between the memory controllers within the same striping domain. For example, two memory controllers are in one striping domain for one 10 Gb/s application, while the other two memory controllers are in another striping domain for a different 10 Gb/s application.

(4) Multiple address bits are used as part of the hash function for load balancing memory requests within the same striping domain. For example, two memory requests with the same values for A[x] and A[y] bits, but different values for other address bits, are assigned to different memory controllers.

(5) Address bits above a predetermined operating system page size (e.g., a "huge page size") are used in the hash function. For example, high address bits, noted as A[H0], A[H1], A[H2], etc. For example, H0=24 if the huge page size is 16 M bytes.

(6) Address bits within a predetermined operating system page size (e.g., a "small page size") are used in the hash function. For example, low address bits, noted as A[L0], A[L1], A[L2], etc. For example, L0 can be A[6] if the small page size is 16 K bytes.

(7) Address bits outside a predetermined page size (e.g., a "DRAM page size") are used in the hash function. For example, it may be desirable to keep two memory requests, which are in the same DRAM page, to be on the same memory controller. For example, the address bits above a DRAM page size may be the middle address bits, noted as A[M0], A[M1], A[M2], A[M3], etc. Depending on the DRAM technology and DRAM chip capacity, the DRAM page size can be different. For example, M0=13 if DRAM page size is 8 K bytes.

(8) A hash function is used to generate the mapped A'[x] and mapped A'[y]. One example includes the hash function being defined as the XOR function of the involved address bits, as follows:

$A'[x]=A[x] \wedge (A[H0] \wedge A[H2] \wedge A[Hi]) \wedge (A[L0] \wedge A[L2] \wedge A[Li]) \wedge (A[M0] \wedge A[M2] \wedge A[Mi])$
$A'[y]=A[y] \wedge (A[H1] \wedge A[H3] \wedge A[Hj]) \wedge (A[L1] \wedge A[L3] \wedge A[Lj]) \wedge (A[M1] \wedge A[M3] \wedge A[Mj])$ (9) It may be desirable to have different address bits in A'[x] hash function and A'[y] hash function, so that A'[x] and A'[y] are orthogonal.

(10) Address bits, M0, M2, Mi, H0, H2, Hi, L0, L2, and Li, are selected so that they are not the same as x or y to avoid aliasing. For example, A[x] ^ A[M0] is always 0 if M0=x, no matter whether x=0 or 1.

(11) A hash function can be configurable by a set of configuration registers, noted as SPR_HASH_MODE_X for A'[x] function and SPR_HASH_MODE_Y for A'[y] function. Each bit in the SPR_HASH_MODE_X and SPR_HASH_MODE_Y enables one address bit in the corresponding hash function.

$A'[x]=A[x] \wedge hash\_A[x]$
Where hash_A[x]=
  $(A[I0] \wedge SPR\_HASH\_MODE\_X[I0]) \wedge$
  $(A[I1] \wedge SPR\_HASH\_MODE\_X[I1]) \wedge$
  $(A[I2] \wedge SPR\_HASH\_MODE\_X[I2]) \wedge$
  . . .
  $(A[Ii] \wedge SPR\_HASH\_MODE\_X[Ii])$
$A'[y]=A[y] \wedge hash\_A[y]$,
Where hash_A[y]=
  $(A[J0] \wedge SPR\_HASH\_MODE\_Y[J0]) \wedge$
  $(A[J1] \wedge SPR\_HASH\_MODE\_Y[J1]) \wedge$
  $(A[J2] \wedge SPR\_HASH\_MODE\_Y[J2]) \wedge$
  . . .
  $(A[Jj] \wedge SPR\_HASH\_MODE\_Y[Jj])$

(12) In general, the more address bits that are involved in the hash function, the more randomness A'[x] and A'[y] will have. As such, memory workloads are more evenly distributed. An extreme case is that all address bits that are not A[x] and A[y] can be involved in hash function, but any selected SPR_HASH_MODE_X bits does not overlap with any selected SPR_HASH_MODE_Y bits, to keep A'[x] and A'[y] orthogonal.

(13) SPR_HASH_MODE_X and SPR_HASH_MODE_Y can be customized for a given application during the boot process by system software.

(14) Two striping mode configuration bits, noted as SPR_STRIPING_MODE[1:0], are used to define which striping domain a given logical memory partition belongs to:
  00: no load balancing
  01: load balancing between logical memory partition (0,1) and/or (2,3)
  10: load balancing between logical memory partition (0,2) and/or (1,3)
  11: load balancing between all logical memory partitions (0,1,2,3)

(15) There is one SPR_STRIPING_MODE register for each logical memory partition. They are noted as:
  SPR_STRIPING_MODE_PARTITION0,
  SPR_STRIPING_MODE_PARTITION1,
  SPR_STRIPING_MODE_PARTITION2,
  SPR_STRIPING_MODE_PARTITION3.

(16) The SPR_STRIPING_MODE registers are selected according to the logical memory partition. For each given memory request, A[x] and A[y] are used to determine which SPR_STRIPING_MODE register will be used. For example, the register can be determined as follows.
  A[x]=0, A[y]=0: SPR_STRIPING_MODE_PARTITION0 is used.
  A[x]=0, A[y]=1: SPR_STRIPING_MODE_PARTITION1 is used.
  A[x]=1, A[y]=0: SPR_STRIPING_MODE_PARTITION2 is used.
  A[x]=1, A[y]=1: SPR_STRIPING_MODE_PARTITION3 is used.

(17) The two bits from the selected SPR_STRIPING_MODE[1:0] are noted as S[y] and S[x].

(18) The SPR_STRIPING_MODE_PARTITIONx registers can be customized for a given application by the system software.

(19) Once SPR_HASH_MODE and SPR_STRIPING_MODE are configured, the final mapped A'[x] and A'[y] are determined.

A'[x]=A[x]^(hash_A[x] & S[x])

Where S[y] and S[x] are the selected SPR_STRIPING_MODE[1:0],

Where hash_A[x]=

(A[I0] ^ SPR_HASH_MODE_X[I0]) ^

(A[I1] ^ SPR_HASH_MODE_X[I1]) ^

(A[I2] ^ SPR_HASH_MODE_X[I2]) ^

. . .

(A[Ii] ^ SPR_HASH_MODE_X[Ii])

A'[y]=A[y] ^ (hash_A[y] & S[y])

Where hash_A[y]=

(A[J0] ^ SPR_HASH_MODE_Y[J0]) ^

(A[J1] ^ SPR_HASH_MODE_Y[J1]) ^

(A[J2] ^ SPR_HASH_MODE_Y[J2]) ^

. . .

(A[Jj] ^ SPR_HASH_MODE_Y[Jj])

(20) A mapping function, noted as SPR_CONTROLLER_MAP, is used to map the selected physical memory partition (denoted by 0, 1, 2, 3, respectively) to a memory controller. For example, one mapping is:

SPR_CONTROLLER_MAP[0]=memory controller 1021.

SPR_CONTROLLER_MAP[1]=memory controller 1022.

SPR_CONTROLLER_MAP[2]=memory controller 1023.

SPR_CONTROLLER_MAP[3]=memory controller 1024.

Physical memory partitions 0, 1, 2, 3 can be mapped to memory controllers 1021, 1022, 1023, 1024 in any order.

(21) The SPR_CONTROLLER_MAP register can be customized for a given application by the system software.

(22) The final mapped A'[x] and A'[y] are used to index SPR_CONTROLLER_MAP and determine the selected memory controller.

(23) Address bits other than A[x] and A[y] are used to select the memory address in the address space within each memory controller.

(24) One example is to have four striping domains for four memory controllers (no load balancing).

If load balance between memory controllers is not necessary, each striping domain can be configured to map to one memory controller. The striping mode can be configured as in the following. In this configuration, the mapped A'[x] and A'[y] will always be same as A[x] and A[y], respectively.

SPR_STRIPING_MODE_PARTITION0=2'b00
SPR_STRIPING_MODE_PARTITION1=2'b00
SPR_STRIPING_MODE_PARTITION2=2'b00
SPR_STRIPING_MODE_PARTITION3=2'b00

(25) One example is to have one striping domain for all four memory controllers.

Load balance is done between all memory controllers. The striping mode can be configured as in the following. In this way, mapped A'[x] and A'[y] appear to be randomized based on other address bits defined by SPR_HASH_MODE_X and SPR_HASH_MODE_Y.

SPR_STRIPING_MODE_PARTITION0=2'b11
SPR_STRIPING_MODE_PARTITION1=2'b11
SPR_STRIPING_MODE_PARTITION2=2'b11
SPR_STRIPING_MODE_PARTITION3=2'b11

(26) One example is to have two striping domains for four memory controllers.

Load balance between logical memory partition (0, 1), and load balance between logical memory partition (2,3). For example, two load balance domains for two separate applications. The striping mode can be configured as in the following example.

SPR_STRIPING_MODE_PARTITION0=2'b01
SPR_STRIPING_MODE_PARTITION1=2'b01
SPR_STRIPING_MODE_PARTITION2=2'b01
SPR_STRIPING_MODE_PARTITION3=2'b01

(27) One example is to have three striping domains for four memory controllers.

Load balance between logical memory partition (0,1), and keep logical memory partition 2, and keep logical memory partition 3 (which may or may not exist). The striping mode can be configured as in the following example.

SPR_STRIPING_MODE_PARTITION0=2'b01
SPR_STRIPING_MODE_PARTITION1=2'b01
SPR_STRIPING_MODE_PARTITION2=2'b00
SPR_STRIPING_MODE_PARTITION3=2'b00

(28) Striping domains can be partitioned to work with I/O configurations. For example if one application uses an I/O controller on one side of a tiled processor array, and another application uses an I/O controller on the other side of the tiled processor array, it may be desirable to configure the striping domains accordingly. The controller map can be configured as in the following example.

SPR_CONTROLLER_MAP[0]=memory controller 1021
SPR_CONTROLLER_MAP[1]=memory controller 1024
SPR_CONTROLLER_MAP[2]=memory controller 1023
SPR_CONTROLLER_MAP[3]=memory controller 1022

(29) A striping domain partition has an impact on the mesh network routing. When a striping domain includes two memory controllers on the top side of the processor array, for example, it introduces more horizontal mesh network traffic. When a striping domain includes two memory controllers on the top and bottom side of the processor array, for example, it introduces more vertical mesh network traffic. Striping domain can be configured according to the on-chip routing scheme, for example, X-first dimension ordered routing or Y-first dimension ordered routing.

(30) The number of memory controllers within a multi-core system does not have to be four, and can be any number. For example, the system can use three bits A[x], A[y], A[z] to select up to eight memory controllers. An additional SPR_HASH_MODE_Z register is used to select the hash function for A'[z]. Additional SPR_STRIPING_MODE_PARTITIONx registers are used to determine which striping domain additional logical memory partitions belong to. As such, each SPR_STRIPING_MODE_PARTITION will have an additional bit, for example S[z].

(31) The same amount of memory can be attached to each memory controller within the same striping domain.

(32) If different amount of memory are attached to each memory controller within the same striping domain, some address range limiting function are introduced. For example, if a memory request is for access to an address outside of a specified address range, then A'[x]=A[x] and A'[y]=A[y]; otherwise, the above mentioned methods of load balancing based on configurable striping domains and hash function are applied.

(33) When a core requests access to a referenced memory address, the memory latency from the closest memory controller may be smaller than the memory latency from the other memory controller(s). For example, if a memory request is sourced from a core on top left corner of an array (e.g., an array of tiles), the memory latency may be lower from a top left memory controller than that of a bottom right memory controller, due to fewer hops on the mesh network. When memory workloads are distributed between multiple memory controllers within the same striping domain, the memory latency from each memory controller may not be the same.

Figure 10C:
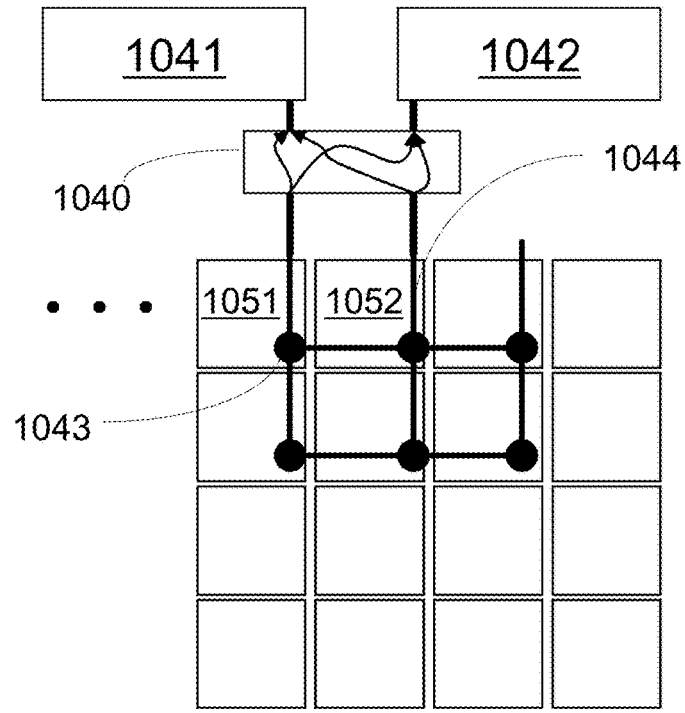

(34) The on-chip mesh network between different processors of a tiled array of processors can be extended to provide additional paths for memory requests from a processor to follow to arrive at a given memory controller. Mesh network extension can be implemented between multiple memory controllers and an edge of the array, or between different memory controllers (e.g., to chain multiple memory controllers together). FIG. 10C shows an example in which a crossbar switch 1040 provides a mesh network extension to couple two memory controllers 1041 and 1042 to two switches 1043 and 1044 of tiles 1051 and 1052 on the edge of a tiled processor array. The mesh network extension is also able to provide a fast connection between two neighboring memory controllers by allowing a memory request or a response to a memory request to be sent between the memory controllers without having to go through a switch of a tile.

Figure 10D:
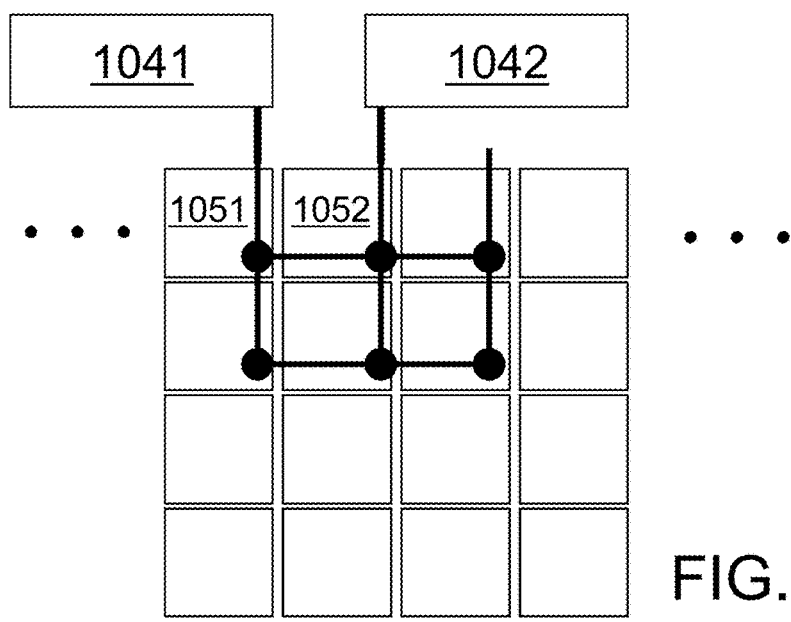

In another example without a mesh network extension, referring to FIG. 10D, tile 1051 has a direct connection to memory controller 1041, and tile 1052 has a direct connection to memory controller 1042. When the processor of tile 1051 has a memory request that is mapped to memory controller 1042, the processor sends the request to the switch of tile 1052 and from tile 1052 the request goes directly to memory controller 1042.

Figure 10E:
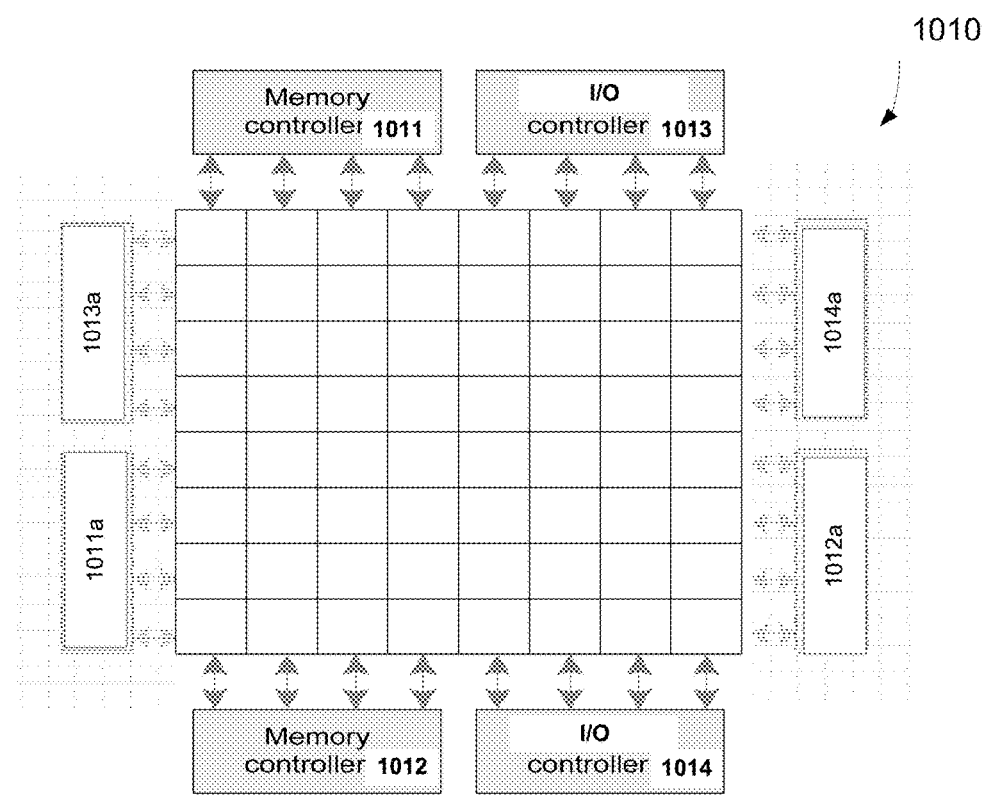

As shown in FIG. 10E, in another example similar to FIG. 10A at least four devices are connected to respective cores on the perimeter of the mesh network on four different sides (here two devices per side), and for at least some of the devices an order of dimensions associated with static routing of packets from the cores is selected before construction of the packets when the static routing sends a packet towards a predetermined one of the four different sides, and an order of dimensions associated with dynamic routing for packets from the cores is selected upon construction of the packets when the dynamic routing does not send a packet towards the predetermined one of the sides.

The mesh network extension 1040 provides similar latency for memory requests sent from tile 1051, no matter whether the memory request is mapped to memory controller 1041 or memory controller 1042. On-chip routing hot spots can be reduced by the mesh network extension 1040.
9 Route Prediction in Packet Switched Networks In packet switched networks, a packet arriving at a switch point participates in a routing procedure that may include a route calculation procedure for determining to which of multiple output ports to send the packet (e.g., based on a destination address) and an arbitration procedure that arbitrates among other contending packets requesting the same output port to determine which packet has access to the port at a particular arbitration point. Some routing procedures have large packet latency that may be undesirable in high performance, latency sensitive applications.

Figure 12:
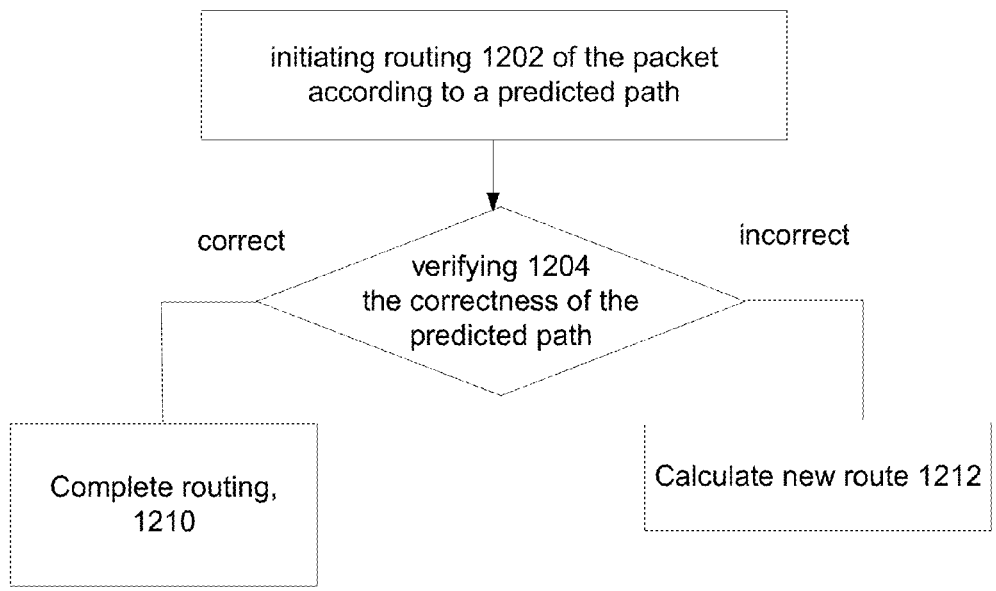
FIG. 12 is a flow chart of a procedure for route prediction.

Referring to FIG. 12, an approach to decrease packet latency includes, at each core in the route, initiating routing 1202 of the packet according to a predicted path concurrently with verifying 1204 the correctness of the predicted path based on route information in the packet (e.g., a destination address). Verifying 1204 the correctness of the predicted path can include calculating an actual path based on the route information and comparing the predicted path to the actual path, or can use a faster procedure that does not include calculating the actual path. The initiating of routing of the packet includes preparing to couple the packet from a switch input port of a switch in a core at which the packet arrives to a predicted switch output port.

The predicted switch output port is selected such that the predicted path is the most likely path for a given routing scheme (e.g., for a dimension ordered routing scheme a straight path through a core is more likely than a path that turns from one dimension to the other, which occurs only once in a given path for dimension ordered routing). In response to results of verifying 1204 the predicted path, the routing of the packet is completed 1210 according to the predicted path if the prediction is correct. However, if the prediction is not correct, then before the packet is allowed to leave the switch, a new route is computed 1212 according to an actual path that is based on the route information in the packet.

For example, each output multiplexer is configured to speculatively select an input port from which to route a packet based on a route prediction that is potentially faster than the route calculation procedure that would be used to select an input port based on the actual route. The prediction can be verified in parallel with initiating the routing of the packet through the output port (e.g., setting up the multiplexer) according to the prediction, and the predicted route for the packet data is invalidated prior to the packet leaving the output port of the switch if the verification procedure indicates that the prediction was incorrect. If the route is invalidated, the packet does not leave the switch until an actual route is computed. The prediction of the route removes latency associated with an actual calculation of the actual route for those packets where the prediction was verified as correct (e.g., calculations in the output port calculation and the arbitration procedure) before sending the data, but can decrease peak network bandwidth due to route mispredictions.

A packet switched, low latency router with high prediction accuracy can be incorporated into the switches of mesh networks, including the networks of the tiled processors described above (e.g., the dynamic networks in a tiled processor). Packets can be speculatively routed to predicted output ports, removing the latency penalty described above. Commonly, the predicted output port is the straight through path, for example, in a dimension ordered routing scheme such as described above.

In some switches, each output port is associated with a multiplexer that selects data to be sent over the link leaving that output port from among multiple different input ports for the links other than the output link (e.g., in the tiled processor example, a multiplexer for the west output port selects from among the north, south, and east input ports). In some implementations, the switches use pipelined switch processing that includes multiple stages of a switching procedure with each stage taking a single pipeline cycle (which may be a single clock cycle or some multiple of a clock cycle). To reduce or avoid the latency penalty of performing arbitration or other routing computations, for the multiplexer at a given output port an input port is predicted in a previous stage or in the same stage in which data from the predicted input port is speculatively routed through the output port of the multiplexer. In parallel with the speculative routing, the actual route computation is performed in order to determine if the route prediction was correct. If the prediction was incorrect, the latency of the packet is increased and bandwidth is lost due to one or more idle pipeline cycles on the output port while the actual route is being determined.

In some implementations, some of the switch elements (e.g., the multiplexer) can include simplified circuitry for the speculatively predicted common case, while the less common cases use more complex circuitry (e.g., a bigger multiplexer). For example, a simplified multiplexer can be used for selecting between the speculatively predicted route and the less common routes (e.g., a 2×1 multiplexer for each output port). A larger multiplexer is then used for selecting among the less common routes since the number of input ports that can go to a given output port may be as large as all the possible input ports at which a packet can be received.

The following is an example of a prediction scheme for "wormhole" routing in which a packet is divided into segments (called flow control digits or "flits") that are sent successively over a given output port, including a first flit called the "head." After a prediction is made for a given packet, each flit is routed according to that prediction. Then a new prediction can be made for the next packet received.

In one scheme, that uses "static prediction," each output port predicts the same direction for each packet by picking a predetermined input port from which to send packet data. For example, a default prediction for the east output port of a switch can be arranged to always predict that the west input port is going to be routed east. The default prediction is used to reset the output multiplexer when the final flit of a packet has been routed through the output multiplexer.

Figure 13A:
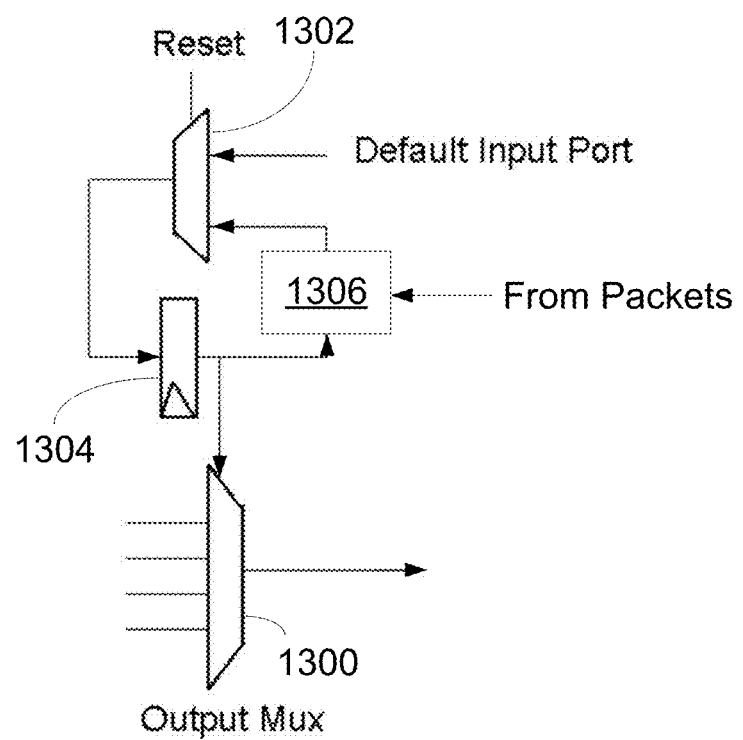
FIGS. 13A and 13B are circuit diagrams of exemplary routing circuitry.

FIG. 13A shows exemplary circuitry for implementing static prediction. An output multiplexer 1300 is configured to select an input port for directing to a given output port in a network switch (for four output ports, there would be a corresponding circuit for each output port). The output multiplexer 1300 has four inputs for selecting among four input ports and one output for directing a selected packet to the given output port. The circuitry also includes a multiplexer 1302 that selects between two inputs. One input is from a statically predicted default input port identifier (e.g., a port number). The control input for the multiplexer 1302 is a "reset" signal, and in response to assertion of the reset signal, the default input port identifier is stored in a register 1304 (e.g., a shift register) to be used as the control input for the output multiplexer 1300 in the next cycle during which the packet from the selected input port is output from the given output port of the switch. The current value stored in the register 1304, which is currently being used to control the multiplexer 1300 and information from the packets are input into an arbiter 1306, which uses that information to compute an alternative control value for the multiplexer 1300 that is selected if the reset signal is not asserted (e.g., if the prediction is determined to not be correct).

Static prediction can also be configured to use buffer information (e.g., information from a first-in, first-out (fifo) input buffer for an input port of a switch). In this scheme, information within the input buffers is used to intelligently guide the route prediction. For example, if the head of packet data stored in the north input buffer contains a header that indicates that the next hop in the actual route should be to the west, but it is blocked because the west output port is reserved, when the west output port is completed, rather than statically picking an input direction to reset to, an input arbiter predicts that the north input buffer is to be routed to the west. When no relevant information is present in the input buffers, then a static/default prediction input is chosen. If the information contained within the input buffers is valid, then the prediction will be accurate.

Other schemes can use other types of prediction heuristics. For example, in schemes that use "dynamic heuristics," rather than defaulting to a static direction when no information is present, the default prediction can be chosen based on past performance of various default input directions.

Figure 13B:
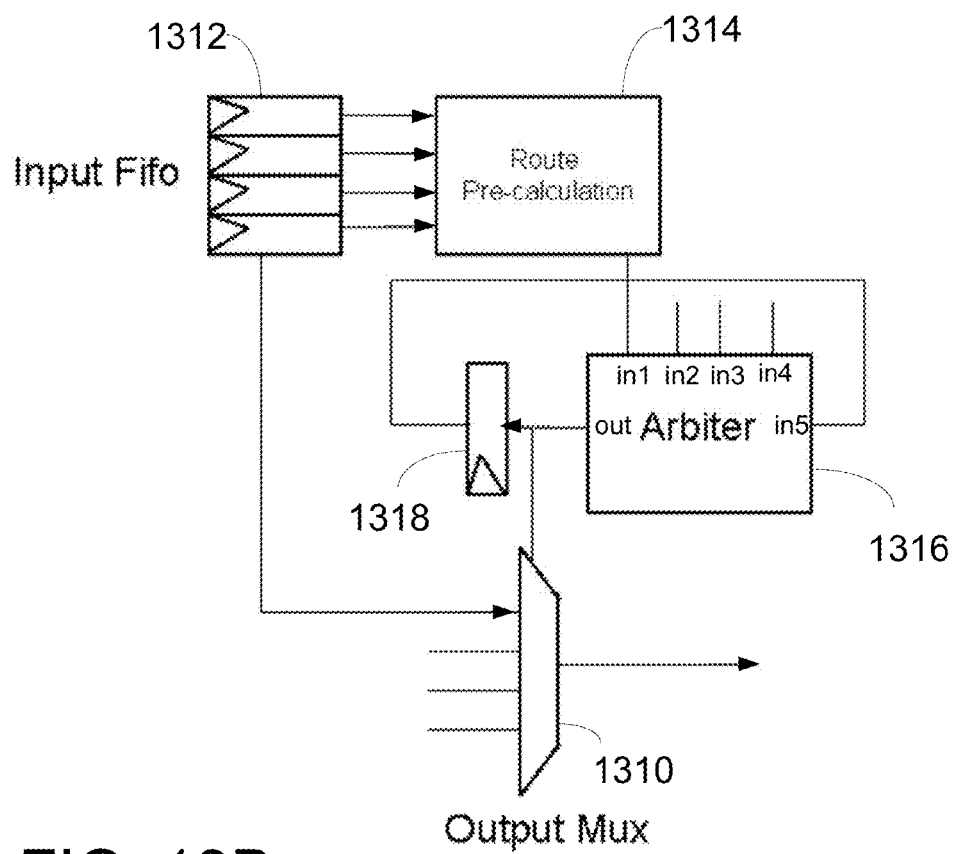

For example, the predicted route can be provided dynamically as a suggested route. FIG. 13B shows exemplary circuitry for optionally using a predicted route as one of multiple possible suggested routes. An output multiplexer 1310 is for selecting an input port for directing to an output port in a network switch. The output multiplexer 1310 has four inputs for selecting among four input ports and one output for directing a selected packet to one output port. The first input of the output multiplexer 1310 is provided by input FIFO 1312, which is an input buffer storing data blocks (e.g., segments of a packet) received at an input port (e.g., the North input port of a tile's switch). A route pre-calculation module 1314 is coupled to the input FIFO 1312 and analyzes the data in the input FIFO 1312 to calculate a suggested route and determine a corresponding control value that can be applied to the output multiplexer 1310 to select the suggested route. The calculated control value is supplied as a suggested route indicator to an arbiter 1316 that arbitrates among multiple suggested route indicators to determine to which of the suggested route indicators will be used to control the output multiplexer 1310. The arbiter in the example of FIG. 13B is shown to have five possible suggested route indicators as input (in1-in5), and one of those (in1) is from the route pre-calculation module 1314 and other inputs (in2-in4) are. The arbiter 1316 has one output (out) that is used to control the output multiplexer 1310. The same output is also sent to a register 1318 and can be offered back to the arbiter in the next switching cycle as another suggested input (in5).

10 Low Latency Dynamic Route Selection

Multicore systems can include a mesh network of elements (e.g., such as the tiled processor described above including one or more dynamic packet switched networks and one or more static networks). The elements in the mesh network include tiles that include processors and non-processor elements such as an I/O device or an offload engine, located on the periphery of the mesh network (e.g., coupled to a core that is on the periphery of an array of cores). Processors in the tiles communicate with the non-processor elements via messages on the packet switched mesh network. Similarly, a non-processor element sends messages to the processors via the packet switched network.

Dimension ordered routing avoids deadlock in the mesh network. In some cases, the non-processor elements send messages at a high rate to a given set of tiles. Due to the asymmetric nature of the communication between the non-processor elements on the edge of the mesh network with the processors in the mesh network, this can result in network congestion at the target group of tiles.

Traffic from multiple ports of one or more non-processor elements may be forced to traverse a small number of links to reach the destination tile as shown in FIG. 14A in which traffic from three ports of an I/O device 1400 traverses one of two links to reach a tile in a group of target tiles 1402, resulting in potential network congestion on those links. The network congestion can result in a flooded network, high latency and poor performance for every element that uses the congested links of the network.

Figure 15:
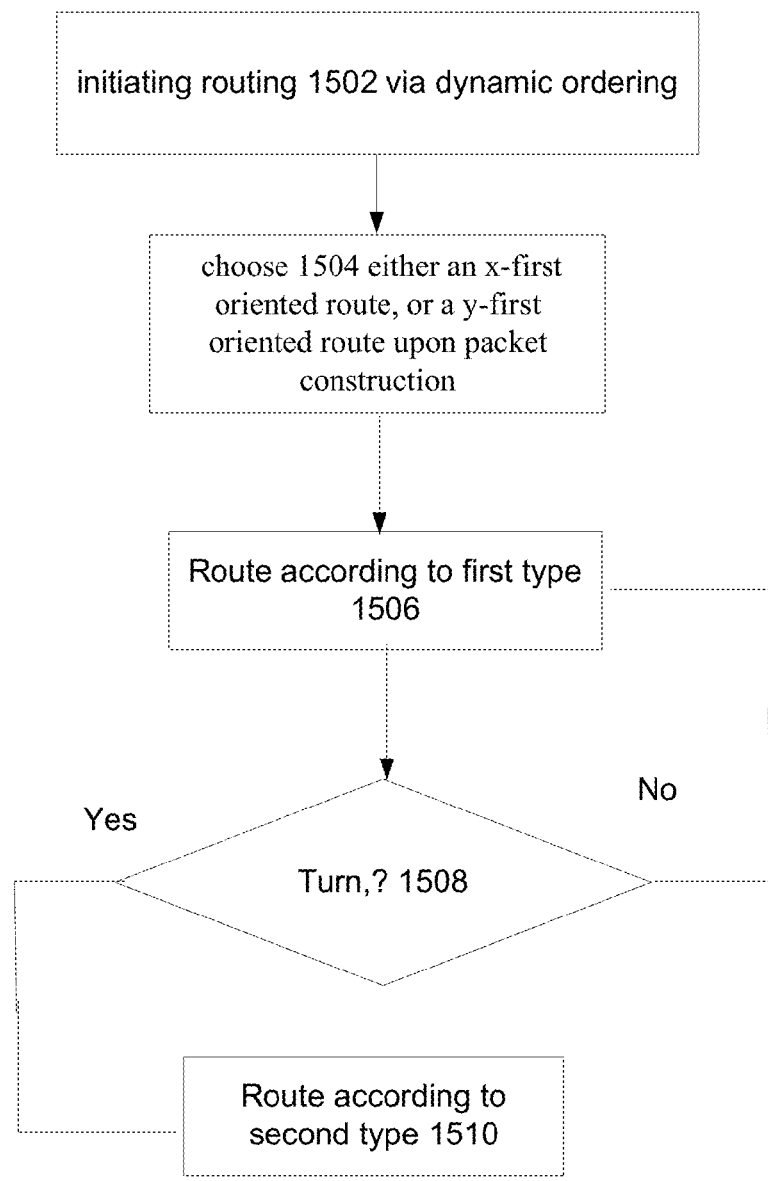
FIG. 15 is a flow chart of a procedure for dynamic route selection.

Referring now to FIG. 15, a dynamic order mechanism 1502 is used to route packets according to a dynamically selected type of route orientation. A "dynamic order" mechanism that more evenly distributes packets from the periphery of the mesh network to elements within the mesh without the need for additional router hardware and without adding additional latency to the packets. The mechanism is provided by dynamically choosing 1504 either an x-first oriented route, or a y-first oriented route upon packet construction. The result is that messages injected from a single element at the edge of the mesh are spread more uniformly throughout the mesh than if they always followed a strict y-first or x-first policy. This policy results in better mesh utilization and a lower probability of congestion, and can be used to mitigate the skin effect, as discussed in U.S. patent application Ser. No. 12/169,436, incorporated herein by reference. Routing of the packet thus proceeds according to the first orientation 1506 until a turn is encountered 1508 thereafter proceeding to route 1510 in the second orientation. FIG. 14B shows the traffic patterns for the same three ports of the I/O device 1400 as in FIG. 14A when both x-first and y-first routes are possible. In this case, the traffic traverses one of five links to reach a tile in the group of target tiles 1402, resulting in less potential network congestion on those links. The network can be configured to randomly choose an x-first or y-first route, by, for example, "coin flipping" (a Bernoulli trial with 50% probability of success), or one of the choices can be favored over the other or can be based on other factors.

In some implementations, the dynamic order mechanism is limited to devices situated only on one half of the mesh network. In some cases, devices can also be connected to elements in the interior regions of the mesh network as well as elements on the periphery of the mesh network. More generally, devices connected to elements in one region of the network use the dynamic order mechanism, and devices connected to elements in another region of the network do not use the dynamic order mechanism. In a rectangular shaped mesh network, the regions can be rectangular shaped regions on either side of a line through the mesh network. The dynamic order mechanism is able to take into consideration that the "turn" case of the hops in a dimension ordered route can take more cycles than the "straight through" case. The dynamic order mechanism lowers probability of network congestion when elements on the periphery of the mesh send messages to elements within the mesh.

When a packet is provided for injection into a mesh, either a y-first route is chosen or an x-first route is chosen. This decision is made based upon one or more of the following criteria:

1) Random: Chose the route randomly, either y-first or x-first.

2) Congestion Based: Use existing a priori knowledge about congestion in the network to determine the route.

3) Destination Based: Use the knowledge of the destination switch point to determine how to route the packet.

Deadlock is generally avoided by constraining the types of possible routes within the network. For example, for two I/O controllers on the left and right side of the mesh network, some implementations of the dynamic order mechanism could possibly deadlock. By limiting the mechanism to only one side of the mesh network, deadlock can be avoided.

The dynamic order mechanism avoids complicated dynamic routing policies, and does not add additional latency to the packet. Traffic is spread more uniformly through the mesh network, resulting in a lower probability of congestion and better overall mesh performance.

11 Condensed Router Headers with Low Latency Output Port Calculation

In packet switched networks of various types (e.g., in single-chip multicore processors, many core processors, tiled processors, or parallel computers built using many processor chips connected by a network, or a cloud computer comprising many computing blades connected by a switching network) the header of the packet specifies the destination for the packet. As a packet arrives at a switch point, the switch point inspects the packet header and determines which direction to route the packet. The amount of time it takes to determine the destination output port is dependent on the encoding format used for the destination. A fully encoded format could include, for example, a destination encoded as a vector of two's complement numbers. In this case, the switch point compares the destination vector to the location within the mesh network of the switch point (e.g., represented as a switch point location vector), and from that, determines which direction to route the packet. While this approach saves valuable header space, it may come at the cost of the increased complexity and latency required to compare the destination vector to the switch point location vector.

An alternative routing scheme uses source relative routing, and relies on the route portion of the header to specify which direction to go at each switch point. The direction to go at each switch point is derived from a sequence of direction fields in the route header, where each direction field specifies the direction to route at a given switch point along the route. As the route portion of the header traverses the network, the direction fields are shifted, so that the first field always specifies what to do at the next switch point. This route format requires minimal hardware support and provides low latency, but may come at the cost of larger packet headers, particularly as the number of cores or processors in a multicore system becomes large. Further, the number of directions can also be large in multidimensional networks and when the direction has to also encode routing into the processor port at the destination.

A source directed packet switched network header format that provides low latency output port calculation with a dense header encoding can be achieved, for example, by using a sequence of symbols such as a bit vector (a vector of Boolean values) where a "1" tells the switch router that the packet is going in a particular predetermined direction (e.g., straight), and a "0" tells the switch point that the packet is going in one of multiple possible directions (e.g., turning left or right) and to use the direction obtained from a direction field of a separate vector of direction fields in the header of the packet. The bit vector is shifted at every switch point. When a direction field is used for a packet turn, the vector of direction fields is also shifted. In the example of a two-dimensional mesh network, this results in an encoding that only encodes directions for turns, not for every switch point along a route.

This technique takes advantage of the topology of dimension ordered networks, and specifically that packets are normally traveling in a straight line on such networks. In systems that include mesh networks using dimension ordered routing, the system encodes the route as a bit vector, where a "1" in the bit position tells the switch point corresponding to that bit position that the packet is going straight through the switch point, and a "0" tells the switch that the packet is turning at the switch point. As the packet traverses the network, the bit vector is shifted at every switch point. A set of direction fields in a direction vector associated with the bit vector is then used to specify the turn directions. This allows the system to only encode the directions for turns, saving valuable header space yet still achieving low output port calculation latency.

Figure 16:
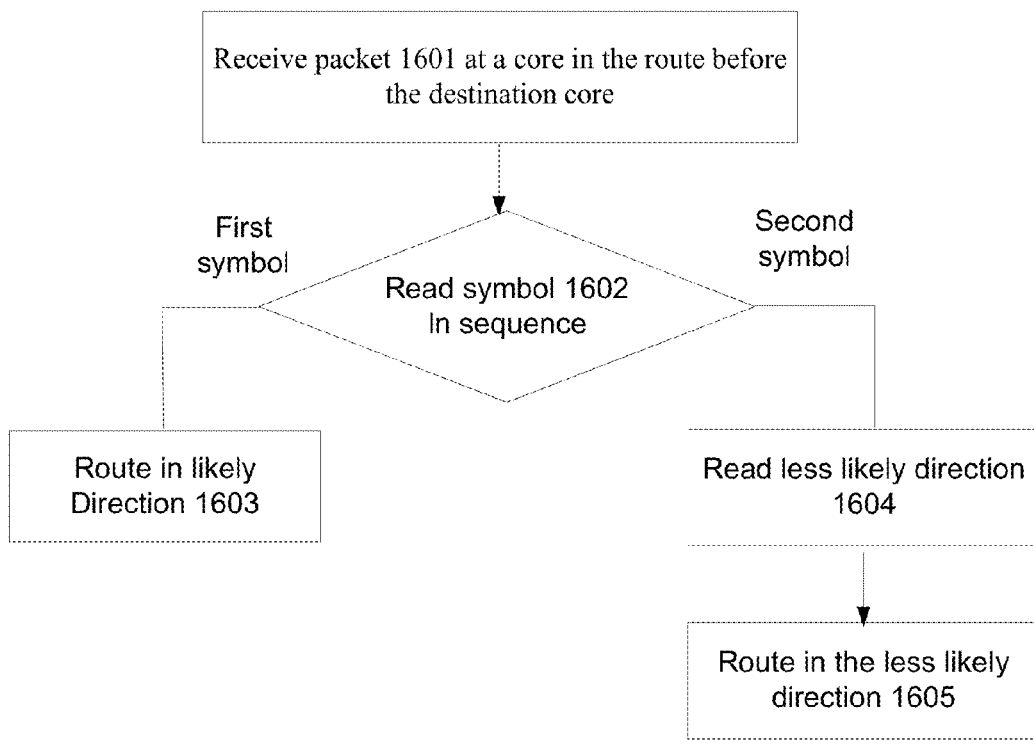
FIG. 16 is a flow chart of a procedure for routing a packet from an origin core to a destination core over a route including multiple cores.

FIG. 16 shows a flow chart for an exemplary procedure for routing a packet from an origin core to a destination core over a route including multiple cores. At each core in the route before the destination core at which the packet is received 1601, the core reads the next symbol 1602 in a sequence of symbols in the header (e.g., the bit vector). The packet is routed to the next core in the route according to which symbol is read. If the first symbol is read (e.g., a "1" in the example above), the core routes the packet in the likely direction 1603. If the second symbol is read (e.g., a "0" in the example above) the core reads 1604 which of multiple less likely directions is to be used (e.g., from the direction vector), and routes the packet 1605 in the direction that is read.

Figure 17:
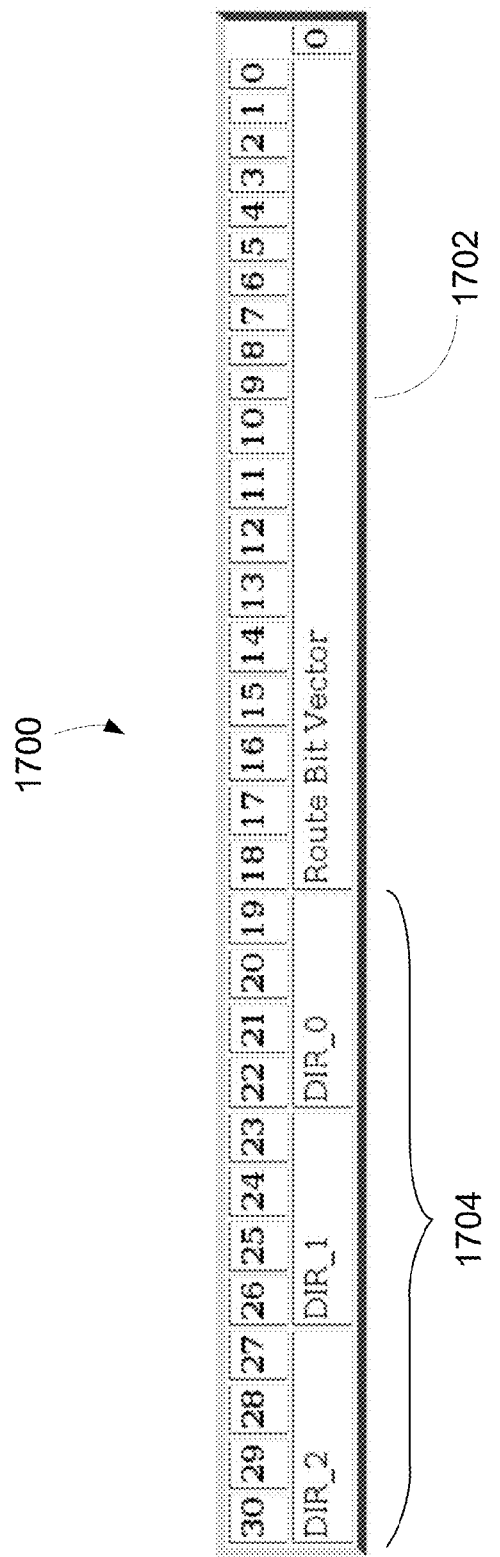
FIG. 17 is a diagram of a portion of a packet header.

FIG. 17 shows an exemplary portion 1700 of a header including a Route Bit Vector section 1702 that has 19 bits (for a route with 19 switch points), and a direction vector 1704 that includes three direction fields (DIR_0, DIR_1, DIR_2) of 4 bits each (for a route with 3 turns) encoding a direction for each "0" value in the bit vector.

Figure 18:
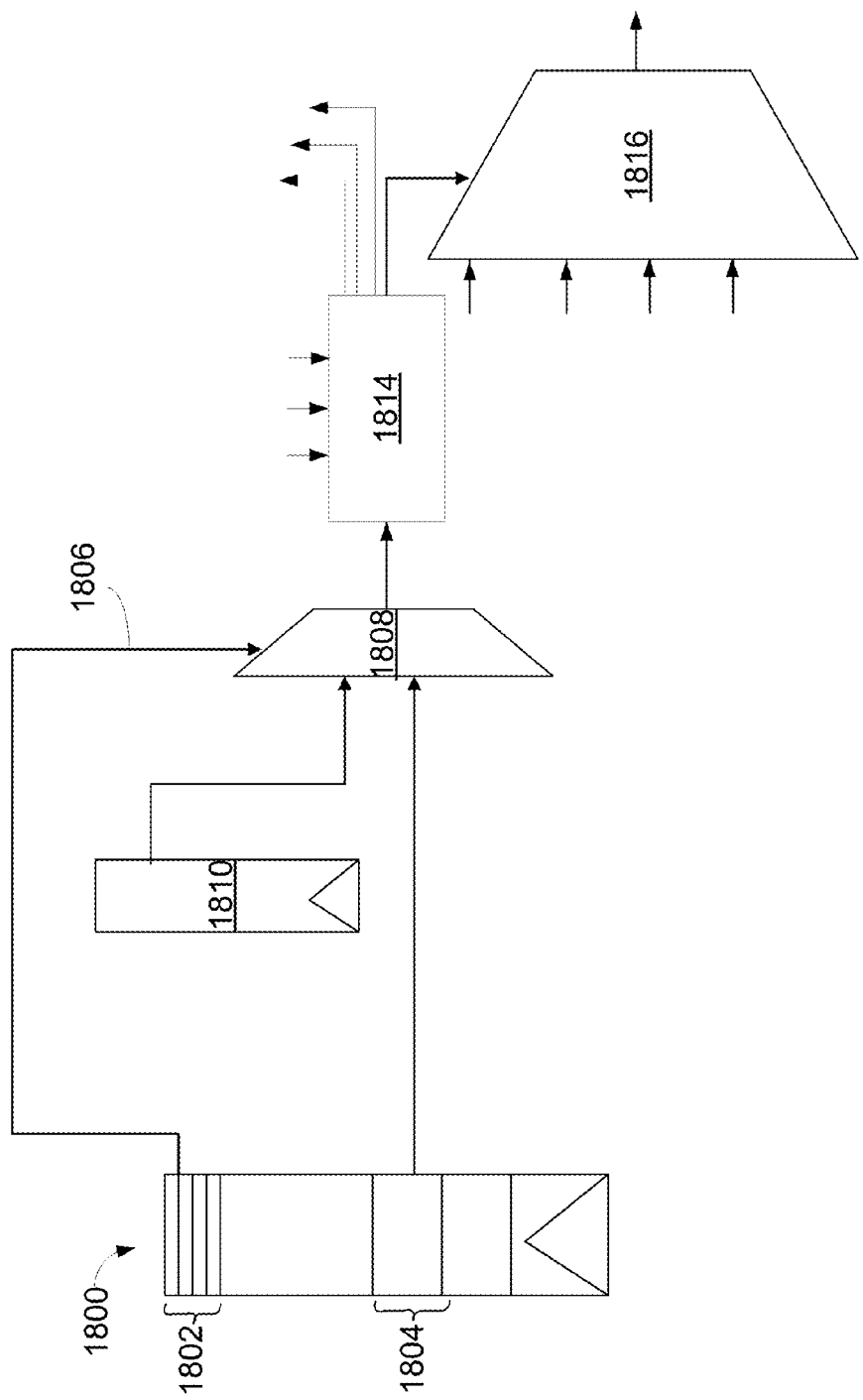
FIG. 18 is a circuit diagram of exemplary routing circuitry.

FIG. 18 shows exemplary circuitry at a switch point for determining a route for a packet based on the condensed route header. A portion of a route header is stored in an input buffer 1800, corresponding to a packet received at a given input port of the switch point. As described above, a bit in the bit vector portion 1802 of the route header is shifted at every switch point, and a direction field 1804 of a direction field vector is shifted after it is used for switching the corresponding packet. The new switched version of the condensed route header is included with the packet as it is routed to the next switch point. The leading bit of the bit vector portion 1802 is read and used as a control input 1806 to a multiplexer 1808, where a "1" selects a particular predetermined direction stored in a register 1810, and a "0" selects one of multiple possible directions (e.g., North, South, East or West, any of which could correspond to a left turn or a right turn, depending on the input direction of the packet) from the leading direction field 1804 of the direction field vector. The selected output direction for the packet received at the given input port, along with the selected output directions for the other input ports (e.g., for three other input ports in 2D mesh network) are provided as inputs to an arbiter 1814. The arbiter 1814 provides control signals for the four output multiplexers, including output multiplexer 1816, for selecting an input port from among the four input ports from which to route a received packet.

12 Managing Cache Access

A multicore system is configured to maintain cache coherence within "coherence neighborhoods." A coherence neighborhood is a set of cores (e.g., tiles in a tiled processor) whose caches are kept coherent with each other. For example, in an 8×8 array of 64 tiles, a first 4×4 set of 16 neighboring tiles is in a first coherent neighborhood (neighborhood A), a second 4×4 set of 16 neighboring tiles are in a second coherent neighborhood (neighborhood B), and the remaining 32 tiles in the array are in a third coherent neighborhood (neighborhood B).

Data accessed by the processors of tiles in a given coherence neighborhood are cached in the tiles of that coherence neighborhood. In this scheme, data cached in one coherence neighborhood are not accessed by processors of other coherence neighborhoods so that the lack of cache coherence between different neighborhoods will not cause data conflicts. Different coherence domains are useful for performing work on independent sets of data that are accessed by processors within a single coherence domain. In some cases, all of the cores in the multicore system are in a single coherence neighborhood, in which case coherence is maintained over all of the cores, which involves some processing overhead. By maintaining coherence over a coherence neighborhood including fewer than all of the tiles, less processing overhead is needed to maintain coherence, which could be beneficial, e.g., when the cost of that extra overhead would not be outweighed by the extra processing power of additional tiles.

Cache coherence within a coherence neighborhood can be maintained in a variety of ways, including by updating or invalidating all of the copies of a cache line in other cores when that cache line is updated in one of the cores, or by ensuring that a given memory line is cached only in one core within the neighborhood. In a "directory based" solution to cache coherence, a directory maintains information called "directory state" (also called "directory information" or "coherence information" or "coherence state" or "coherence directory state") for a given memory line. A directory state for a memory line L identifies which caches have cached that memory line L (e.g., by identifying the core or tile that includes the cache with a cache line storing a copy of the memory line L). When a core attempts to access (write to or read from) a cache line storing the memory line L, it first queries the directory to see if any other caches have the same memory line L cached. A "cache engine" performing this query may have the directory state or may communicate with a remote directory to determine the directory state. If the cache engine identifies other caches with that line cached, then the cache engine will ensure that incoherence will not result (e.g., the cache engine might invalidate or update the cache line in the other caches). The cache engine in a given core handles cache coherence procedures for all the memory lines that use that the given core as their home core. The cache engines of the cores in a coherence neighborhood comprise a distributed cache coherence engine that maintains coherence within that coherence neighborhood.

The directory state can be located in a variety of different locations in different schemes. In some schemes, directory state for a given memory line is stored at the memory controller that controls access to that memory line. In some schemes, directory state for a given memory line is stored in one of the cores. For example, the directory state for memory line L can be stored in the home core for memory line L, whose cache is the home cache for the cache line corresponding to memory line L. The directory state can be stored along with the cache tags of the home cache. The home cache for a given cache line can be found using any of a variety of techniques (e.g., based on the low order bits of the corresponding memory line address, or some specific set of bits in the address, or based on the TLB entry for the memory page that contains the memory line L, or using a mapping table stored in dedicated hardware).

In some cases, a cache engine cannot determine a priori whether a given memory line will have multiple accessors or sharers (multiple caches will be caching that line). In some cases, a cache engine can determine a priori that a given memory line will have only one accessor (e.g., for thread private data, or for the private stack of a thread). In either case, if a given memory line does indeed have a single accessing thread, then access to that memory line will benefit from what we define as a "locality principle." As defined, the locality principle provides that it is preferable to choose the home cache for a given set of cache lines to be close to, or within, the coherence neighborhood of cores that have those memory lines cached in their caches. Adhering to the locality principle avoids the need for an accessing cache engine to communication with another neighborhood to obtain the directory state, rather the directory state will be contained locally, in the same core or neighborhood.

A technique for configuring the system protects the multicore processing power while servicing direct I/O packets coherently. In the event that a DRAM request, for example, is to be issued, the data is returned to the issuing core in the multicore system without any data integrity impact.

The memory request processing performance depends on the bandwidth provided and the latency for completion of the memory request. A tiled processor couples its tiles using multiple 2D mesh networks that provide a relatively large on-chip communication bandwidth for message between tiles. Other network configurations in a multicore system include networks of lower dimension (1D) or higher dimension (3D or N dimensions). The cache coherence configuration of some tiled processors can perform memory operations according to a memory order model with its mesh network.

Some computer applications programmed to run on such multicore systems require low latency for the memory requests and while also requiring relatively high performance for real time I/O transactions.

Memory request latency can be reduced (low latency) by directly managing the distribution of the cache engines in the hardware based on data latency sensitivity, e.g., the ability to apply the locality principle to the data, as well as having the most complicated and time consuming data integrity checking logic located near a core. Part of the management of the engines is accomplished by identifying pages of memory having different localities with respect to associated memory requests. In addition, a real time determination and correction of such cache coherence engine distribution is useful to many real-time systems.

Managing transfer of application data to/from the I/O devices attached to a multicore system is part of maintaining the memory request performance while servicing the packet processing coherently. A core's processing power can become limited and unpredictable due to the cache capacity fluctuations caused, for example, during the handling of a relatively large number of packets moved to and from the home caches. The multicore system can include software management capability to effectively manage or isolate data received from I/O devices, which usually presents different locality during different phases of the packet processing. One consideration of the system performance includes maintaining a balance between the processing power and the handling of streaming data (e.g., from I/O devices).

The latency between a memory controller and a core can have a direct impact on performance, taking into account the tradeoff between latency and bandwidth utilization. Numerous different application requirements that may exist for the system can be considered when configuring the hardware to be monitored and configurable by the software to achieve a balance between latency and bandwidth.

Location of different cache engines and home caches in a multicore processor with respect to different portions of the hardware (e.g., which cores within the mesh network are selected for different cache engines and home caches) is managed in software. The cache engine that performs data integrity check functions, for example, resides in any core that is designated by the software. The home cache locations for different cache blocks are distributed to the caches in different cores according to locality of references to memory addresses within memory requests, such that memory requests from a given core have a home cache that is in the local cache of the given core. The designation of home caches to different cores or groups of cores within the shared cache system is programmed by the core's translation lookaside buffer or by a hardware mapping table that is directly managed using information stored in the core's configuration registers.

The home cache corresponding to a given cache line can reside in any core that is designated by the software or hardware (for example, a mapping table, or a TLB). The home caches for different cache blocks are distributed according to their locality of references to memory addresses within memory requests. Performance counters can be used to track a history of access for a portion of data and, when the history of access (e.g., the value of the counter) meets a predetermined condition, to determine whether the portion of data should be migrated to another cache of another core. The history of access for a given portion of memory can be tracked by monitoring the cache misses for memory requests to access the give portion of memory. If a cache miss for a given cache line or block of cache lines (e.g., a page) is determined to be caused by that cache line or block of cache lines having a home cache location in another core's cache (or another chip's cache), a performance counter is incremented. When the count in the performance counter exceeds a threshold, the home cache for that cache line or block of cache lines is migrated to the cache of the core that does store the cache lines that are missing frequently, as indicated by the performance counter.

Figure 19A:
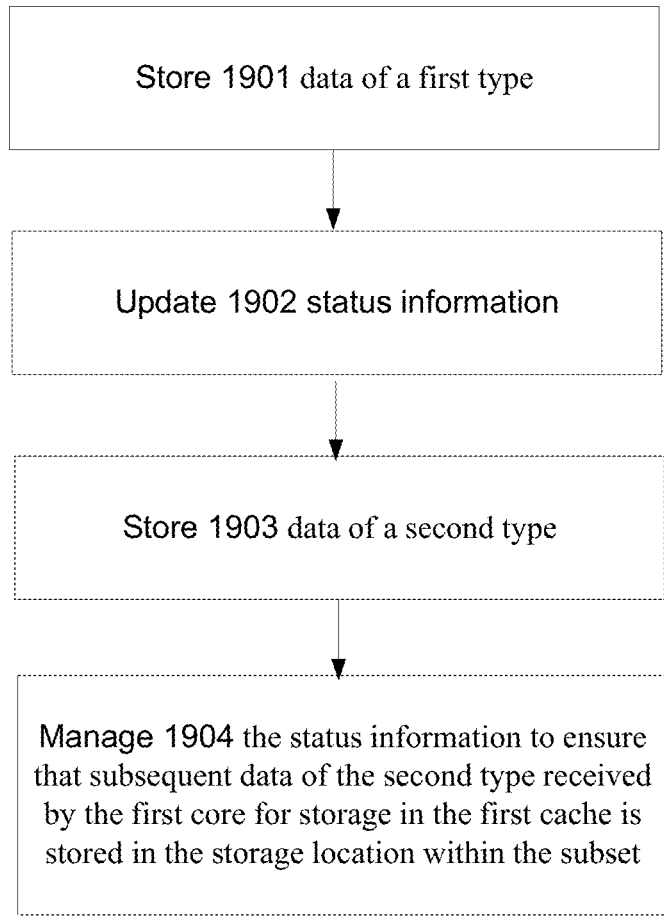
FIG. 19A is a flow chart of a procedure for managing multiple types of data.
Figure 19B:
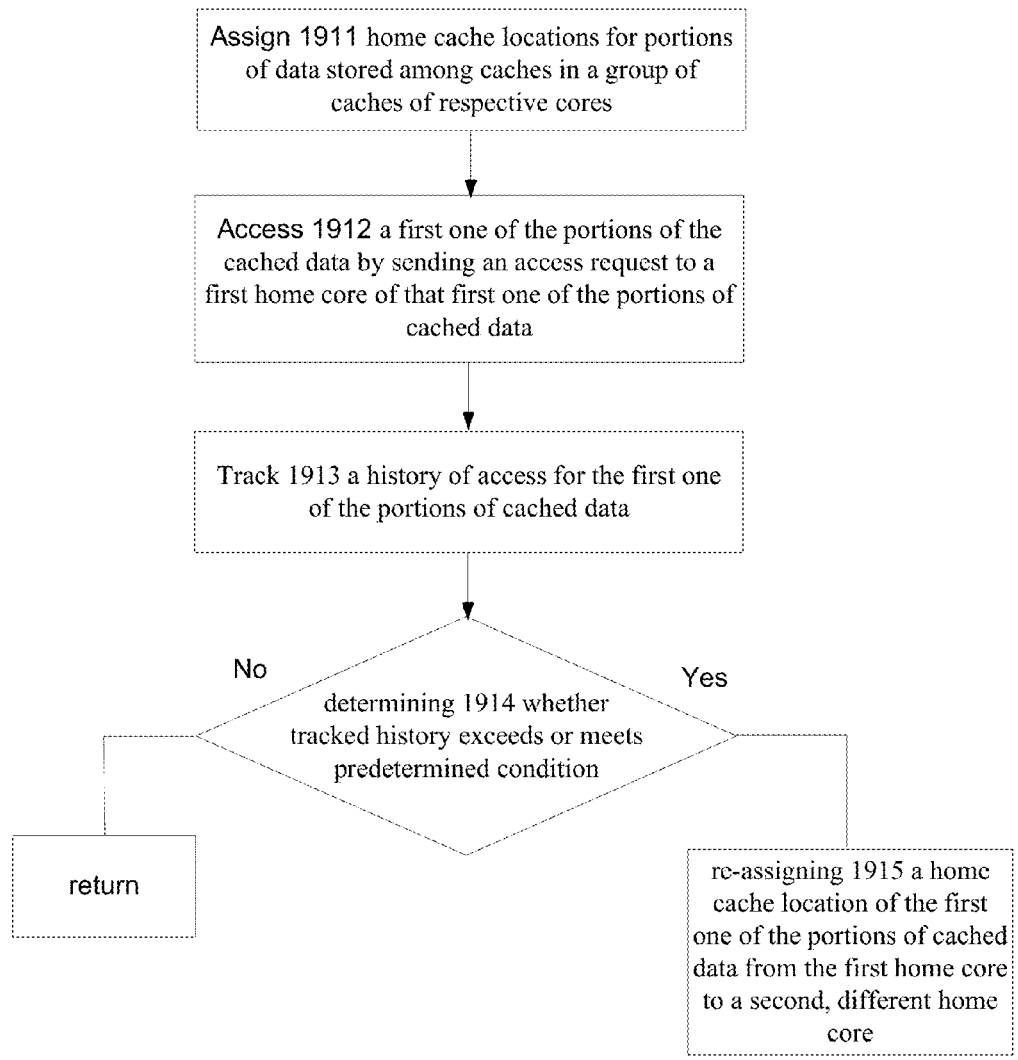
FIG. 19B is a flow chart of a procedure for assigning home cache locations.

FIG. 19B shows a flow chart for a procedure for assigning and re-assigning home cache locations based on performance measured by history of access. Home cache locations are assigned 1911 for portions of data stored among caches in a group of caches of respective cores. A first one of the portions of the cached data is accessed 1912 by sending an access request to a first home core of that first one of the portions of cached data. At the first home core, a history of access for the first one of the portions of cached data is tracked 1913. The first home core determines 1914 whether the tracked history of access for the first one of the portions of cached data exceeds or meets a predetermined condition. A home cache location of the first one of the portions of cached data is re-assigned 1915 from the first home core to a second, different home core when the predetermined condition is met or exceeded. If the predetermined condition is not met or exceeded, then the procedure returns without re-assigning the home cache location.

After a cache line or block of cache lines is migrated, the threshold (or other predetermined condition) is changed such that it is harder to trigger a migration (e.g., by increasing the threshold) to reduce the chance that a given cache line will be repeatedly migrated back and forth between multiple cores that are accessing the given cache line. The migration is performed by updating a mapping table, or updating the TLB that contains the home cache for each page with the cache of the particular core that is the new home cache for the cache lines or cache blocks.

The home cache for a given cache line L can be changed. For example, if tile A is accessing cache line L and needs to send a request to tile B as the home cache of cache line L for coherence checks, it is beneficial for the cache engines to move the home cache for cache line L from tile B to tile A so that further accesses of cache line L from tile A can be local to tile A.

Any number of cores in a multicore processor can be grouped through the mapping hardware described above to share their cache systems to provide "Coherence Neighborhoods" within a larger aggregated shared cache system, as described in more detail below.

A software-enabled hardware monitoring system is included in a multicore processor to provide real-time information for evaluating hardware behavior of the cache engines that manage cache coherence for the Coherence Neighborhoods.

A multicore processor can provide a stream of packets (e.g., from an I/O device) directly into a Coherence Neighborhood. The packet data can either fully use the entire available storage space within shared cache system in a given core of a Coherence Neighborhood, or only a portion of the available storage space (e.g., a particular bank of the cache storage, such as a particular "way" in a set-associative cache, where each "way" corresponds to a predetermined slot in each set of a set-associative cache), depending on the software configuration. A given core in the Coherence Neighborhoods can be configured independently without any impact on the data integrity and maintain its own processing power.

A multicore processor or a multiprocessor comprising multiple multicore chips can receive streamed data (e.g., data in packets received from an I/O device or "I/O data") directly into one or more home caches (e.g., the memory address of the streamed data may map to data in a cache line that is mapped to a given home cache).

One exemplary technique causes all the I/O data to stream into a single way or bank of the home cache.

A configuration register accessible to the processor in the core of the home cache is set so that the configuration register causes the LRU status of a predetermined type of data (e.g., cache lines involved in the I/O data transfer) to not be updated. In an N-way set-associative cache there are multiple sets to which different addresses are mapped. There are also multiple "ways" that each represents a different slot in a given set of the cache in which a cache line can be cached. A cache line whose address maps to a given set can be cached in any of the ways of the given set, and is typically cached in the least recently used way of the given set. Status information for the cache includes a least recently used (LRU) status that indicates which of the multiple ways in a given set stores data has been least recently used by a processor accessing the cache (e.g., least recently read or written).

When the configuration register is set to not update the LRU status for the cache, data that maps to a given set will repeatedly overwrite the cache line that was least recently used at the time the configuration register was set. Even though the cache line will have become the most recently used cache line, the LRU status still indicates that it should be used to cache data (of any type including the predetermined type) until the configuration register value is changed. In this scheme, a large amount of data streaming into the cache will not overwrite data in the other ways, which may contain local data (e.g., a stack or heap of a process running on the core) that would be relatively expensive to overwrite compared with the streaming data, but will be limited to a portion of the cache. Since each set may have a different way that was least recently used at the time the configuration register was set, the portion of the cache used for caching the streaming data may include different ways for different sets.

Referring to FIG. 19A, a flow chart for an exemplary procedure is shown for managing data to allow data of a first type to be cached using an LRU cache policy and for data of a second type (e.g., streaming data) to not update the LRU status as described above. A cache is provided in each of one or more of the cores that includes multiple storage locations. Data of the first type is stored 1901 in a selected storage location of a first cache of a first core that is selected according to status information associated with the first cache. The status information is updated 1902 after the data is stored. Data of the second type is stored 1903 in a storage location within a subset of fewer than all of the storage locations of the first cache (e.g., a single way of a set-associative cache). The controller for the first cache manages the status information to ensure that subsequent data of the second type received by the first core for storage in the first cache is stored in the storage location within the subset.

For servicing the read requests of an I/O device the same configuration register or a different configuration register can be used to cause the status of the cache lines involved in a transfer to not be updated. The same can be done for other streaming data types, such as for example, data accessed (read or written) by a hardware accelerator.

Each cache engine in a Coherence Neighborhood can be configured separately to enable DRAM responses to be directly delivered to the issuing core to reduce the latency in a multicore processor.

The amount of cache that is allocated to a given type of data, such as streaming data, can be subject to a predetermined limit. For example, the cache controller of a core can be configured to use half the cache or use a quarter of the cache or use just one cache line or use some temporary storage location in the core containing the home cache (the home core). When streaming data arrives, the cache can be configured to not write streaming data into the cache, but instead to write into the storage location in the home core and update the coherence information also in that temporary storage location in the home core.

Counters that track local and remote misses can be stored in the TLB on a per page basis.

A given cache engine can be responsible for checking the data integrity that is set by the processor memory model. In some models, a data block, usually 64 bytes aligned to a 64-byte boundary, can only be owned by one engine to avoid ambiguity. A memory request from a core is satisfied only if it passes all the integrity check criteria. In a multicore system, the memory requests are handled by a central cache engine residing at a single core, or cache engines distributed in a dedicated group of cores, or evenly among all cores, or any location selected based on the locality principle.

The integrity check usually sets a constraint on the memory operation latency due the communication between the issuing core and the centralized cache engine. In some systems, a memory request that references a shared block takes several trips between cores to perform invalidation, forward, and update. A multicore system can be configured to avoid such performance degradation using the communication resources on chip. Furthermore, a multicore processor can exploit the locality correction of a cache engine to reduce the memory operation latency. Locality correction can be done by migrating a home cache corresponding to a cache line L to be close to the core or cores that accesses that cache line L frequently.

The multicore system is configured to make certain decisions for given pages of memory using any of the following techniques. The system identifies pages of memory that benefit from having the home cache on the same core as a particular process (e.g., kernel stack, user private-mapped data, page tables, etc.). Linux's per-processor kernel data is also included in the category. The system identifies regions of memory that have the data references striped across multi process units for the load balancing (kernel data, user shared mappings, etc.). The system identifies read-only regions of memory that can cache directly from the memory to improve local access latency and reduce aggregate cache pressure.

The system identifies read-only regions of memory to which the cache engines distribute to create neighborhoods within a larger aggregate shared cache.

The system can also be configured to modify the home cache distribution by either of the following, for example, changing caching of pages allocated from the page allocator (e.g., the Linux page allocator) to preserve an invariant that the current core is the home core when pages are allocated, or changing caching of pages on the fly when other references may exist elsewhere.

Figure 19C:
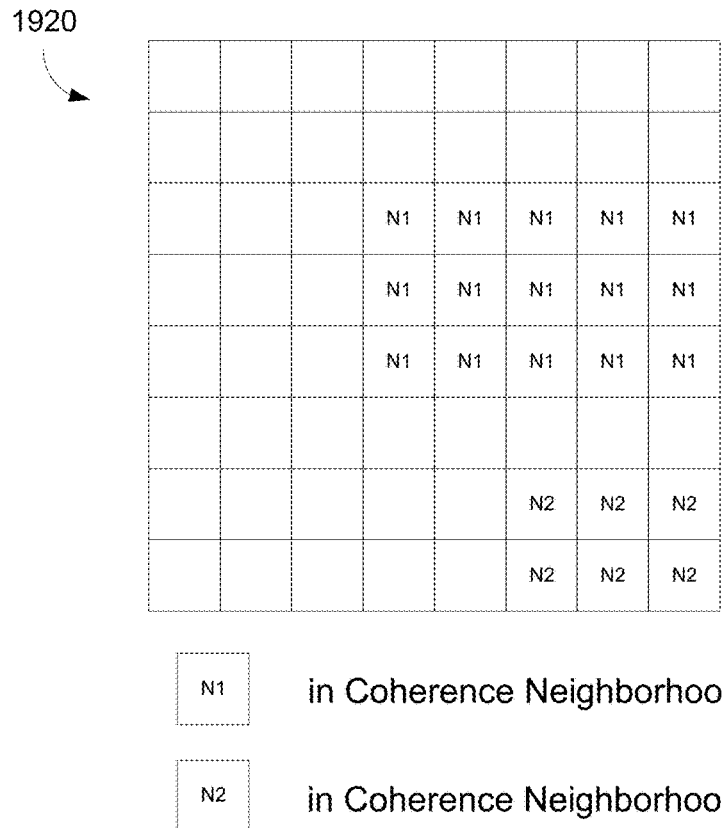
FIG. 19C is a schematic diagram of a multicore system.
Figure 19D:
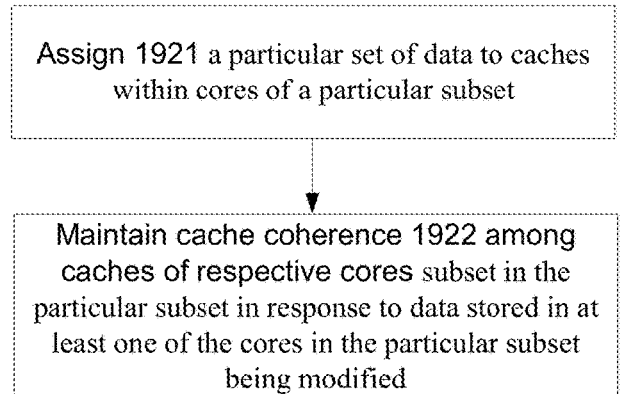
FIG. 19D is a flow chart of a procedure for maintaining cache coherence among neighborhoods.

A multicore processor includes profiling information to exploit the locality of the home cache for memory requests to increase the memory operation performance. The locality information can be directly programmed using the Translation Lookaside Buffer (TLB). For example, at the physical memory address translation lookup, the locality information can be read in the same manner with all other memory attributes associated with the page. All memory requests to the same page can be handled by one cache engine in the home core. The locality information can be programmed using a hardware mapping table. For example, using the physical address as well as all other attributes, an index can be generated to fetch the locality information stored in the content of the table. An N-entry mapping table can be indexed with a hashing result from the physical address. Physical address bits used include both higher and lower bits. The lower bits hashing guarantees a relatively even distribution of data references among home caches even with small pages of memory. The higher bits hashing prevent cache threshing while multiple identical programs are running simultaneously and trying to access the same sets of cache blocks. An N-entry table can populate all memory requests up to N copies for cache engines that share the data integrity checking Using the hardware mapping table, the location of the home caches can be assigned to the same core where the memory requests are issued to improve the local access latency. Alternatively, in a group of one or more cores that are in proximity to one another, a "Coherence Neighborhood," memory requests can be processed locally or sent to a neighboring group through the mesh network for data integrity checking. The "Coherence Neighborhood," can be used to effectively partition the aggregate cache into different domains based on application requirements. Using this technique, multiple applications can fully participate and share the multicore processing power with predictability. FIG. 19C shows a multicore system 1920 in which a first subset of cores is part of a first Coherence Neighborhood (N1), and a second subset of cores is part of a second Coherence Neighborhood (N2). Referring to FIG. 19D, the operating system running on the cores assigns 1921 a particular set of data to caches within cores of a particular subset. The operating system maintains cache coherence 1922 among caches of respective cores in the particular subset in response to data stored in at least one of the cores in the particular subset being modified.

In order to find an efficient distribution of the home caches, performance counters are provided (e.g., using a counter circuit that is accessible to the processor) to track the cache misses for the memory requests. Instruction and data requests that miss the home cache in a given core, indicating that the requested instruction or data does not reside with the home cache are monitored. The profiling information is stored in the processor registers for software access. Software thus modifies the cache coherent distribution to exploit the locality for the performance improvement.

Streaming data such as I/O data mitigates the need for traditional data integrity checks and the flow control managed by the software, as well as maintains the increasing system performance requirement. In the presence of a relatively large amount of streaming data in a multicore system, one or two configuration registers can be used to adjust the processor processing power with predictable memory operation latency.

One register configures the cache capacity that can be used by the incoming I/O data such as packets. If the packets are in a processing phase that requires substantial processing power, or are expected to be shared by different cores to be processed, the configuration register can be programmed to allow full caching ability to speed up the performance. For example, the configuration register is able to indicate which portions (e.g., which cache banks or which cache regions or which ways) of the cache the data might reside in. If, for example, the packets are in a processing phase to be handled coherently and the data integrity is to be maintained, the configuration register is programmed to constrain the data to reside in a portion of a cache system (e.g., the LRU bank of the cache system at the time the configuration register is programmed) with less caching ability. If that portion gets full, then the incoming I/O data overwrites within that portion.

This technique addresses the following situation. Sometimes I/O data is sent into the cache just for temporary storage where that data is not going to be processed by the processor directly connected to that cache. This situation might occur in a system where a cache serves both as a local cache (e.g., L2 cache) and as a distributed L3 cache for another core. In this case, the I/O data might overwrite data that is present in the cache and being operated upon by the local processor of a core. By restricting the I/O data into only one bank (or a few number of banks that is less than the total number of cache banks), the I/O data will overwrite only the I/O data itself once that bank gets full. This limits the amount of useful data (e.g., useful to the local processor) that is evicted from the cache.

This technique of restricting residence to only one cache way or bank can also be used for other streaming data types, where locality of access is not present.

The other register configures the cache capacity for the data that is brought in by the read requests of the I/O devices. If the data does not present any temporal or spatial locality, the core can limit the data caching and reserve most of the cache capacity by programming the register.

Either of the discussed approaches can be implemented by changing the manner in which a LRU policy cache typically behaves. For example, a LRU cache will try to place new data in the least recently used cache line in a set of or in some randomly or otherwise chosen cache line. In one approach, the configuration register prevents the cache from updating the LRU status of that cache line when that cache line is filled by streaming data such as I/O data.

For a memory request that misses all levels of cache systems in a multicore system, a DRAM request is generated by a cache engine. Data is returned from the DRAM controller and delivered to the issuing core. The cache engine does not necessarily reside near the DRAM controller in a multicore system. A configuration register in the cache engines that are in the Coherence Neighborhoods is programmed to have the DRAM duplicate the data and directly return the data to the issuing core as well as to the cache engine. In other words, the memory controller or DRAM controller returns the data both to the home core and to the core that requested the data in the first place. This is beneficial for at least two reasons. First, by sending the data to both places simultaneously, the latency is lower than if the data were sent to the home core first, and then the home core were to send the data to the originally requesting core. Second, it is possible that the DRAM or memory controller is far from the home core, but close to the requesting core. On-chip latency for such memory requests is greatly reduced. Any latency-sensitive applications can trade the large bandwidth on-chip from the software configuration using the technique.

A home cache for a given cache block can be selected, for example, as the cache in which the directory state for the given cache block is stored.

Distributed caching allows the construction of large, highly-associative caches via the combination of multiple, smaller caches each associated with a core in a multicore system. When a load on one core misses in that core's local cache, the core computes a hash based on memory address bits, uses the resulting hash value to look up a core that serves as the home core for that memory cache line, and forwards the request to that home cache. Thus, the hash function plus core number lookup table allows the system to spread cache lines across many home tiles, with each unique cache line address mapping to only one home tile, effectively creating a single, large distributed cache out of several smaller, independent caches.

Some systems use a single hash function and hash-value-to-core-number lookup table. Such a system introduces two potential issues.

First, having a single hash function means that addresses are always hashed across the entire lookup table. This means that all addresses are hashed among the same set of home cores. Some systems, for instances those running multiple client operating systems on distinct sets of cores, may achieve improved performance or quality of service by hashing addresses in different client operating systems across a different set of cores.

Second, because the core number is determined by a lookup table, taking a hash value as the index and producing a core number as the result, the evenness of distribution among cores is limited by the number of table entries. Since hardware lookup tables can be expensive in terms of power, silicon area, and latency, the number of table entries is often small, resulting in a significantly uneven number of table entries per core. For example, a system with 8 table entries, hashing across 3 cores, might end up with 3 table entries for core 0, 3 entries for core 1, and 2 entries for core 2. Assuming even distribution of cache traffic by the hash function, this would cause a first core to get $\frac{3}{8}$ of the traffic, a second core to get $\frac{3}{8}$ of the traffic, and a third core to get $\frac{2}{8}$ of the traffic. Thus, the traffic load on the first two cores would be 50% greater than on the third core.

Exemplary techniques to address these potential issues include the following.

A distributed caching system in which address bits are used to choose one of one or more hash functions can be used. Different hash functions can have the effect of hashing across the same or different ranges within a single hash-value-to-core lookup table, or they can each map to the same or different lookup tables within a set of one or more hash-value-to-core lookup tables. Optionally, in this system, the hash function for a given set of input address bits can be chosen via a page table entries or a translation lookaside buffer (a cache of page table entries). Each page table entry takes a virtual memory address as input and maps it to an output physical address plus a set of values indicating a hash function that should map across a particular lookup table or lookup table sub-range.

A system in which the hash-value-to-core lookup table produces a pair of cores and an integer value as output, instead of just a core number can be used. The home core to which a memory request is forward is chosen by comparing a different hash of memory address bits against the integer value output by the lookup, and using the results of that comparison to choose one or the other of the cores output by the lookup table.

In an exemplary multicore system, each core stores a 128 entry "address mapping table". Each entry has three fields: [tile_coord_A, tile_coord_B, fract]. The 'fract' value is a 7 bit number and represents the proportion of lines that go to tile_coord_A versus tile_coord_b.

When a physical address is presented to the memory system, two hash functions are used: hashT and hashF. Each hash function takes some set of physical address bits as input and produces a 7 bit number as output.

The hashT result value is used to choose one of the 128 entry address mapping table entries. The hashF value is then compared to the 'fract' value in that entry, and used to choose between tile_coord_A and tile_coord_B. If AMT [hashT(address)].fract<=hashF(address), then tile_coord_A is chosen. Otherwise, tile_coord_B is chosen. The system converts virtual addresses to physical addresses via a translation lookaside buffer (TLB) lookup. This produces a TLB entry for each input virtual address. The TLB entry specifies both the physical address to which the virtual address is mapped, as well as a 4-bit 'mask' and 4-bit 'offset' value.

The 'mask' and 'offset' fields can be used to modify the hashT( ) function such that different TLB entries can choose to hash across different portions of the address mapping table. This is accomplished by evaluating hashT_new(address)=(hashT(address) & ((mask<<3)|0b111))+(offset<<3). In other words, the new hash value is the original hash value, masked by a 7-bit value with 'mask' in the high 4 bits and 1 s in the low three bits, and added to a 7-bit value with offset in the high 4 bits and 0 s in the low three bits.

Thus, the mask value allows a TLB entry to indicate that the hash function should hash some number of table entries (16, 32, 64, or 128), and the offset value determines index of the first table entry within that range.

13 Configurable Device Interfaces

A mechanism is provided for defining a device control interface (e.g., for controlling a device such as a peripheral device coupled in a multicore system such as a tiled processor). The mechanism is part of a software program that is executed by the multicore system. The device control interface is modified by configuring one or more cores of the system (e.g., via a software patch) to provide any of a variety of control functions. These control functions are used for communicating with and controlling a device external to the cores. These control functions can have several different purposes, including emulating the behavior of another device, fixing software or hardware defects, or applying optimizations.

Some computing systems are composed of one or more hardware devices, connected by one or more communication networks. For example, a personal computer is often composed of a processor and many other devices including memory and I/O devices such as network and storage devices. A common communication protocol for connecting a device to the computing system is the Peripheral Component Interface (PCI). Other interconnect protocols also exist. The devices in the system communicate with each other via messages on a communication network that supports a given communication protocol. Each device is configured to communicate according to a transaction layer specification, describing how messages are decomposed into parameters such as address, size, and data, and a logical layer specification, describing actions that a particular device will take when the device receives a message with a set of parameters. For example, a network interface card (NIC) might be configured to decode the transaction layer parameters of each incoming message to extract a register number. Based on the logical layer the device would choose from a set of actions to be taken based on the extracted register number such as, for example, starting or stopping packet transmission.

Figure 20:
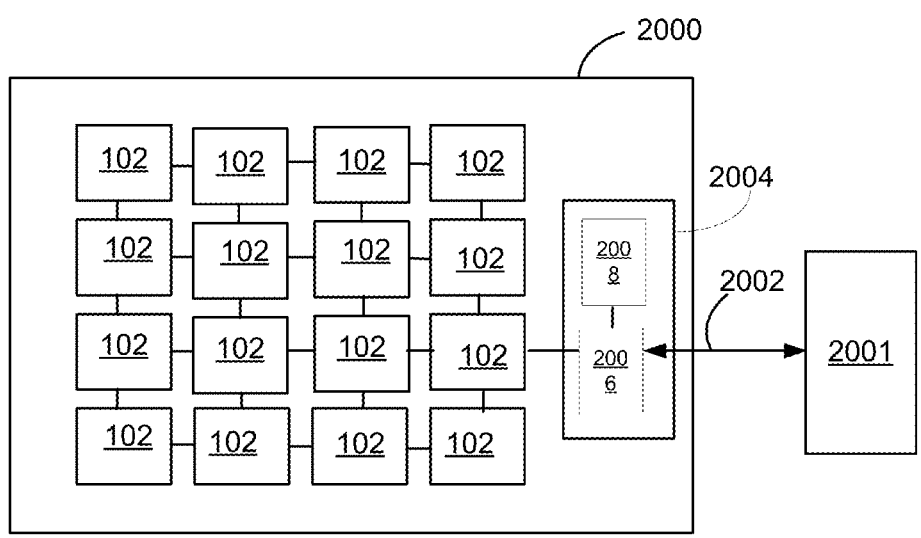
FIG. 20 is a schematic diagram of a configurable device interface.

Referring to FIG. 20, a multicore system 2000 includes multiple cores such as the tiles 102 described above interconnected by a communication network. A portion of the system (e.g., one or more cores) is configured to provide the functions of either the transaction layer, or logical layer, or both layers as a software program running on that portion of the system. In this exemplary system (e.g., a tiled processor), a device 2001 is coupled to the system over a connection 2002 using a communication-network-specific piece of hardware (e.g., a hardware shim 2004 that includes interface circuitry external to the tiles and is coupled to one or more tiles). The hardware shim 2004 is responsible for transmitting and receiving messages on the communication network among the tiles 102 to or from the device 2001 (e.g., a remote device) coupled to the communication network. When a packet is received from the device 2001, the hardware shim 2004 passes the packet to a software routine running on a processor (e.g., the processor of the tile 102 connected to the shim or the processor of a different tile).

The shim 2004 includes circuitry for virtual address translation. Memory coupled to respective cores (e.g., cache memories in the cores) have an address space in which references to virtual memory addresses are made. The shim 2004 provides an interface for coupling the device 2001 to the system 2000 that takes into account these virtual addresses. The shim 2004 includes circuitry 2006 configured to transmit or receive messages on the communication network to or from a coupled device. The shim 2004 also includes circuitry 2008 (e.g., a TLB) configured to translate virtual addresses to physical addresses of the address space in response to receiving messages over the communication network that includes a virtual address.

Mechanisms for passing the packet include, but are not limited to, writing the packet to shared memory, sending a message over an on-chip network to a register-mapped port on a processor (e.g., the processor of a tile of a tiled processor, or the processor of anther type of core of a multicore system), or delivering an interrupt to the processor and having the processor read the packet from a designated location. A software handler including one or more routines running on the processor is responsible for decoding the packet's parameters and performing the actions the logical layer specification dictates should result from an access with those parameters.

Similarly, the software handler can post a packet to the hardware shim via the above mechanisms, and the hardware shim is responsible for transmitting that packet to the device via the communication network. The software handler can define both the transaction and logical layers, or just the logical layer. In some implementations, the software handler provides the functionality of the logical layer, and the hardware shim provides the functionality of the transaction layer including receiving a packet from the communication network and decoding packet's parameters, including address, size, and data, before providing the packet to software handler. Similarly the hardware shim is able to accept commands from the software handler, specifying command parameters such as address, size and data, and is able to encode the commands into packets sent to the device over the communication network.

The software handler includes functions for implementing the logical layer specification including functions that define what the device will do when it receives messages with a given set of transaction layer parameters. The logical layer specification can be configured by the software handler to include functions and parameters similar to those of any of a variety of types of network interfaces. For example, an Ethernet network interface card (NIC) has a logical layer specification that includes stored values (e.g., stored in registers) for specifying when to bring an Ethernet link up or down and stored values for defining the memory location of packet fragments to be sent or received on the Ethernet link. Specifying the logical layer via a software program allows the device's behavior, including but not limited to its control registers, memory transactions, and interrupt behavior, to be modified by loading a new software program.

A software-defined logical layer interface can be modified to provide any of a variety of device interfaces. For example, such a device interface could be reprogrammed as the interface of a network interface card (NIC), a storage device, a graphics device, or any other device. This flexibility allows a single device to be repurposed for any of a variety of uses by reprogramming the device interface, as needed. The flexibility can also be used to improve compatibility with other devices in the system, for example by exporting an interface defined by some other device so that software drivers designed for the other device will work with the new device. A software-defined logical layer also allows a vendor to fix software or hardware errata in the field by loading a new software program that works around the errata.

Virtual to physical address translation can be performed at the hardware shim. This allows software (for example, on one of the tiles, or running in the hardware shim itself) to interact with the hardware shim using virtual address space. Thus, arriving packets can be directed to virtually-addressed buffers and egress packet commands can refer to virtually addressed buffers. Working with virtual addresses has potential advantages such as by performing the virtual to physical translation at the hardware shim, the multicore system provides memory system protection of virtual address space without the overhead of a software "validation" service running on the processor, which is implementing the software defined device interface. From the hardware buffers at the hardware shim, because the virtual to physical translations are known, the packet data can be directly placed into various on chip caches, or into DRAM (both of which use physical addresses). Without the translation stored at the hardware shim, validation software routines would be used for every packet arrival to validate that the device could write into some physical memory. Because the virtual to physical address translations are cached at the hardware shim, the system uses software (or possibly a hardware service) to perform the virtual to physical address translation and protection checks only the first time the virtual addresses is used.

Addresses may be faulted-in as needed thus allowing translations to be updated and installed on the fly. That is, if a virtual address (or a virtually addressed packet buffer) is referenced (either by a processor on a tile or in the hardware shim) and there is no virtual to physical translation stored at the hardware shim, then a fault operation similar to a TLB fault is taken and the translation is filled in. During this processing of the fault, the protection is also checked to make sure that the hardware shim has the authority to write to the page being referenced. The processing of the fault can happen either in software or hardware, either at the hardware shim itself or on a processor. There is also a mechanism for the hardware shim to be able to request servicing (in software or hardware) in one of the tiles on the chip. Such a mechanism can be an interrupt or a message from the hardware shim to one of the tiles. The message or interrupt would also include information as to what type of fault handler has to be run, what the virtual addresses is, and at which shim or I/O device this translation needs to be installed. There are also mechanisms for a tile to be able to update or install virtual to physical translations at the hardware shim.

A DMA command for an I/O device can be used. The hardware shim also allows DMA command, interrupt, and status messaging to be carried over a user network (also called the user dynamic network (UDN)) while freeing the I/O and system network (IDN) from carrying this traffic. This further enhances virtualization support by allowing the user complete control over the I/O device without opening a security hole into the rest of the system. Both address translation and UDN messaging provide a User I/O interface that allows a low latency delivery of packet data directly to the user without intervening software.

Additional aspects of transferring data directly between I/O devices and the caches in a way that is cache coherent are described in U.S. application Ser. No. 11/754,016, incorporated herein by reference. Being able to transfer data directly to caches, for example, enables the ability to avoid going through main memory and thus saves memory bandwidth.

14 Memory-Mapped Data Transfers

A mechanism is provided for transferring data between arbitrary memory addresses on two or more computing devices when the address range of messages between the devices is too small to span the memory size of one or more of those devices.

In various communication protocols (e.g., a protocol according to the PCI standard), messages traveling between devices include a target address, a data size, and zero or more data bytes. A device "A" is configured to transfer data from device A's memory into the memory of a device B. To accomplish this transfer, device A performs a direct memory access (DMA) write transaction, retrieving bytes from its memory and including the bytes in messages traveling across a communication channel provided by a bus or network, for example, between device A and device B, specifying the desired memory address on device B. Similarly, device B can perform a DMA read transaction specifying memory addresses on device A from which to read. In some cases, using write transactions to transfer data is preferred to using read transactions because write transactions may have lower latency or fewer resource requirements than read transactions.

In some system configurations, such as in the example described above, device A is able to specify write packets with addresses anywhere in device B's memory. However, in some system configurations this may not be possible, for example, if device B is only allowed to map a limited portion of its memory onto the communication channel, which is a bus in this example. For example, this might happen in a PCI system if the host processor that sets up bus windows (Base Address Registers in the PCI standard) only supports 32-bit addresses or otherwise requires that device addresses span only a limited portion of the available bus address space. In such a case, it may not be possible to map all of device B's memory onto the bus if device B had more than the 4 GB of memory that fit into a 32-bit address range.

An exemplary data transfer mechanism to overcome such a limitation of device B allows device B to dynamically map portions of its memory address space onto the address space of the bus so that device A can write to those mapped portions of its memory address space. This mechanism can be implemented using write transactions and allow both device A and device B to have many transactions in flight so as to cover the bandwidth-delay product between the devices and maintain high throughput. The mechanism can be used between two peripheral devices in a computer system, for example, or between any types of devices communicating over a network, including both peripheral devices and processors.

Figure 21:
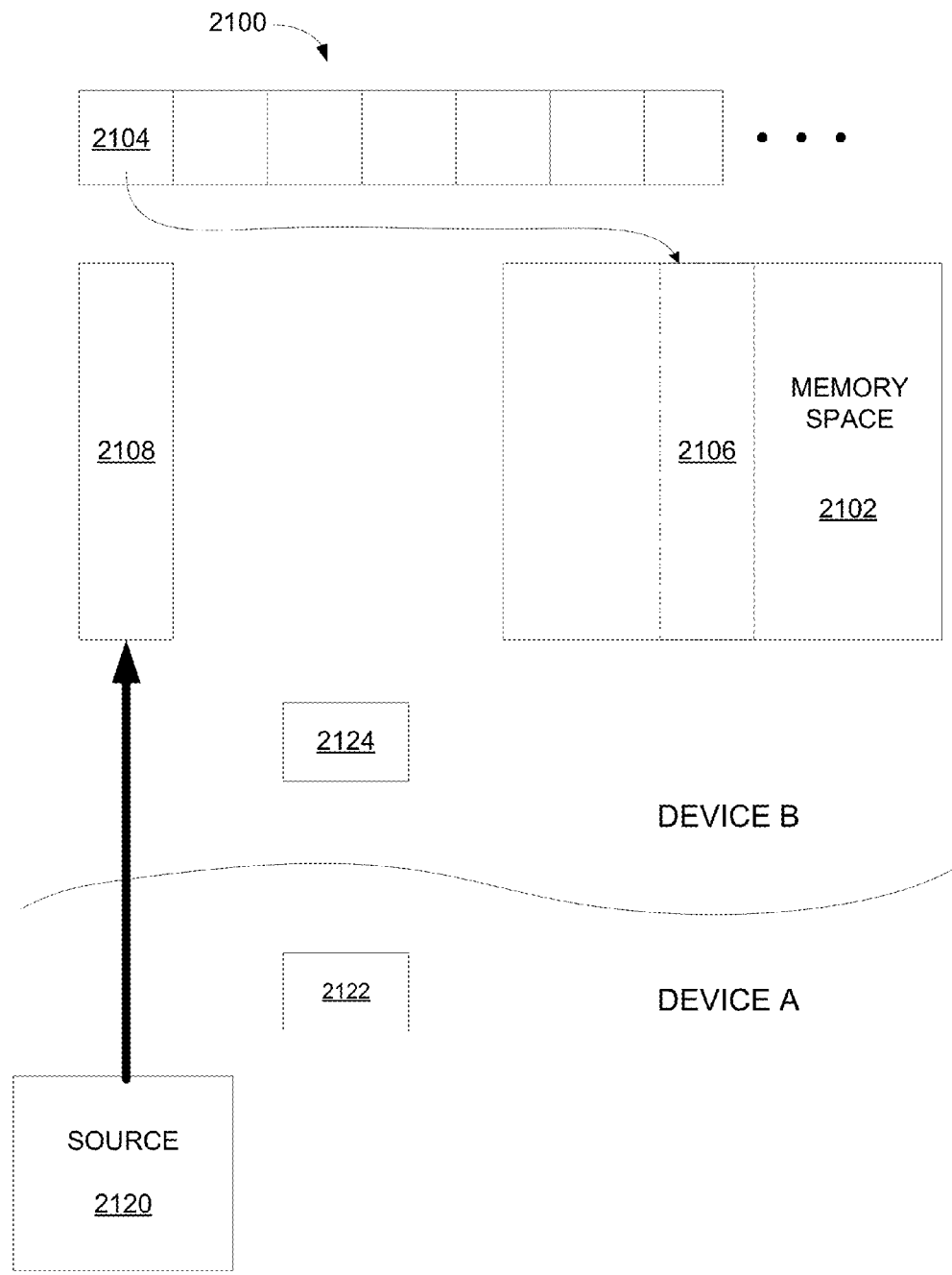
FIG. 21 is a schematic diagram of a data transfer technique.

Referring to the schematic diagram of FIG. 21, an example of the mapped transfer mechanism is as follows. Device B maintains a buffer queue 2100 identifying addresses in its memory address space 2102 that correspond to starting addresses at which data from device A will be written. In this example, an entry 2104 identifies the starting address of a range 2106 of addresses in the memory address space 2102 that is to be mapped to a corresponding range of data values 2108 sent over the bus over which device A and device B communicate. The buffer queue 2100 stores multiple starting addresses corresponding to multiple outstanding data transfer requests from device A. There is a special address within the bus address space that is used by device A as an indicator that a transfer will use the mapped transfer mechanism, called the "data target address". Data from device A to be written into the range 2106 of the memory address space 2102 is written to the "data target address" (which is selected to be within the bus address space). The data does not actually get written into the data target address within the memory address space 2102, but rather this address is used as an indicator to device B that that the actual target address will be whatever starting address is at the head of the buffer queue 2100 (which may be larger than the address values of the bus address space). Whene there is an address at the head of the buffer queue identifying the start of a range of addresses to receive the data values 2108 of a packet to be sent from a source 2120 in device A (e.g., a DMA engine), device B notifies device A that it is ready to receive the packet. This notification is performed, for example, via a write transaction to a credit register 2122 on device A. A notification can be sent once for each starting address pushed into device B's buffer queue 2100, or multiple notifications can be combined into a single write transaction. Device B informs device A that it is ready for one transfer (corresponding to one starting address) or for more than one transfer (corresponding to multiple respective starting addresses in the buffer queue 2100).

When device A is ready to transfer data to device B, device A first waits until it has a received a notification via a write transaction to the credit register 2122 indicating device B is ready. Device A sends the data values 2108 across the bus, targeting the data target address in the bus address space. Whenever data arrive at this bus address (or, optionally, within a range of addresses starting at the data target address), device B stores the incoming data into the memory address space 2102 starting at the starting address indicated at the top of its buffer queue. Eventually, device A will finish providing data in the transfer that targets the data target address in the bus address space. When device A finishes, it performs a write transaction to a transfer complete register 2124 on device B. After this write transaction is performed, device B pops the current starting address off of its buffer queue 2100 and retargets subsequent data transfers that are addressed to the data target address to be stored in the memory address space 2102 starting at the starting address now on top of the buffer queue 2100, so that future transfers will go to a different range of memory addresses on device B. Optionally, an offset can be added to the starting address stored in the buffer queue 2100 to enable changes to the portion of the memory address space 2102 to receive the data without needing to change the starting address stored in the buffer queue 2100. The registers 2122 and 2124 can alternatively be special memory addresses or other circuitry used to indicate when transfers will begin and end.

This data transfer mechanism can potentially substantially reduce the range of bus addresses required to reach memory on device B. Instead of requiring that device B map all of its memory onto the bus, potentially requiring gigabytes of address range, device B can simply map the data target address and the transfer complete address.

This mechanism can be extended to support gather operations on device A and scatter operations on device B as follows. To gather, device A generates DMA write packets with data taken from several different buffers in device A's memory but targeting a contiguous range of addresses in the "data target" region on device B. Device B can support scatter operations by having each entry in its "buffer queue" supply a list of buffers instead of a single buffer. As write packets arrive from device A, device B stores the data into each buffer in turn.

Various features of the techniques described herein can be implemented by modifying versions of the tiled integrated circuits described in U.S. Pat. Nos. 7,461,236 and 7,577,820, and commonly-owned U.S. patent application Ser. Nos. 11/754,118, 11/966,990, and 12/169,436, each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple single-core and/or multi-core processors.

It is to be understood that the foregoing description is intended to illustrate and not to limit the scope of the invention, which is defined by the scope of the appended claims. Various techniques have been described some or all of which apply equally well to a discrete system (not single chip) as well as to single chip systems such as a multicore processor.

Other embodiments are within the scope of the following claims.

What is claimed is:

1. A method for communicating among cores in a computing processor comprising a plurality of cores interconnected by a mesh network, each core comprising a processor and a switch, the method comprising:
   constructing a packet to route from one of the cores or from a device coupled to one of the cores;
   dynamically determining a route for the packet, by selecting for the packet between a first dimension and a second, different dimension, a first oriented route that routes in the first dimension unless a turn is encountered in the route;
   routing the packet from the core or from the device coupled to the one of the cores to a destination over the dynamically determined route over the first selected dimension.

2. The method of claim 1, wherein the packet is routed from the core or the device in the first dimension, until a turn is encountered in the route, with the method further comprising:
   routing the packet from a subsequent one of the cores to the destination core over the second, different dimension.

3. The method of claim 1, wherein the first dimension is selected randomly for packets.

4. The method of claim 1, wherein the first dimension is selected using congestion based information.

5. The method of claim 1, wherein the first dimension is selected using destination based information.

6. The method of claim 1, wherein the cores are divided into a first subset of cores located in a first region of the mesh network, and a second subset of cores are located in a second region of the mesh network that does not overlap with the first region, with the first subset of cores routing based on dynamically determining a route, and the second subset of cores using a routing policy that is static.

7. The method of claim 1, wherein at least four devices are connected to respective cores on the perimeter of the mesh network on four different sides, and at least some of the devices: select an order of dimensions associated with routes for respective packets from the respective cores statically before construction of the packets when the routes send a packet towards a predetermined one of the sides, and select an order of dimensions associated with routes for respective packets from the respective cores dynamically upon construction of the packets when the routes do not send a packet towards the predetermined one of the sides.

8. The method of claim 1, wherein only devices connected to a core on a predetermined one of the sides select an order of dimensions associated with routes for respective packets from the respective cores dynamically upon construction of the packets.

9. The method of claim 8, wherein the selected order of the dimensions associated with the route depends on congestion in the mesh network, wherein congestion in the mesh network is measured based on a count that characterizes activity associated with a port of a switch in the mesh network.

10. The method of claim 9, wherein the count comprises a count of a number of cycles the port has been active.

11. The method of claim 9, wherein the count comprises a count of a number of messages waiting to be routed from the port.

12. The method of claim 9, wherein the count is stored in a register in the core that includes the switch.

13. The method of claim 9, wherein the order is selected to include in the resulting route fewer congested links.

14. The method of claim 1, wherein the selected order of the dimensions associated with the route depends on the location of the destination and on the location of the core or device from which the packet originates.

15. A computer-readable hardware storage device that tangibly stores a computer program for communicating among cores in a multicore processor that comprises a plurality of cores interconnected by a mesh network, each core comprising a processor element and a switch, the computer program comprising instructions for causing the processor to:
- construct a packet to route from one of the cores or from a device coupled to one of the cores;
- dynamically determine a route for the packet, by selecting for the packet between a first dimension and a second, different dimension, a first oriented route that routes in the first dimension unless a turn is encountered in the route;
- route the packet from the core or from the device coupled to the one of the cores to a destination over the dynamically determined route over the first selected dimension.

16. The computer-readable hardware storage device of claim 15, wherein computer program includes instructions to select the first dimension by at least one policy that randomly selects the first dimension for packets or uses congestion based information or using destination based information.

17. The computer-readable hardware storage device of claim 15, wherein computer program includes instructions to select the first dimension based on congestion in the mesh network, with congestion in the mesh network measured based on a count that characterizes activity associated with a port of a switch in the mesh network.

18. A multicore processor, comprising:
- a plurality of cores;
- a mesh network interconnecting the plurality of cores;
- each of one or more of the cores comprising a switch; and
- each of one or more of the cores comprising a processor, the processors configured to:
  - construct a packet to route from one of the cores or from a device coupled to one of the cores;
  - dynamically determine a route for the packet, by selecting for the packet between a first dimension and a second, different dimension, a first oriented route that routes the packet in the first dimension and when a turn is encountered, in a second dimension;
  - route the packet from the core or from the device coupled to the one of the cores to a destination over the dynamically determined route over the first selected dimension; and
  - route the packet in a second selected dimension when a turn is required in the route to the destination.

19. The multicore processor of claim 18, wherein the cores are divided into a first subset of cores located in a first region of the mesh network, and a second subset of cores are located in a second region of the mesh network that does not overlap with the first region, with the first subset of cores routing based on the dynamically determining a route, and the second subset of cores using a routing policy that is static.

20. The multicore processor of claim 18, wherein at least four devices are connected to respective cores on the perimeter of the mesh network on four different sides, and at least some of the devices: select an order of dimensions associated with routes for respective packets from the respective cores statically before construction of the packets when the routes send a packet towards a predetermined one of the sides, and select an order of dimensions associated with routes for respective packets from the respective cores dynamically upon construction of the packets when the routes do not send a packet towards the predetermined one of the sides.

21. The multicore processor of claim 18, wherein only devices connected to a core on a predetermined one of the sides select an order of dimensions associated with routes for respective packets from the respective cores dynamically upon construction of the packets.

22. The computer-readable hardware storage device of claim 15, wherein the instructions constrain the types of possible routes within the network to avoid deadlocks.

23. The method of claim 22, wherein the mesh network has two sides controlled by two I/O controllers, and the instructions limit the dynamically ordering to one of the two sides of the mesh network to avoid deadlock.

24. The multicore processor of claim 18, wherein at least one of the processors are configured to constrain the types of possible routes within the network to avoid deadlocks.

25. The multicore processor of claim 18, wherein the mesh network has two sides controlled by two I/O controllers, and the multicore processor is configured to limit the dynamically ordering to one of the two sides of the mesh network to avoid deadlock.

* * * * *